(12) United States Patent
Schlak

(10) Patent No.: US 9,777,698 B2
(45) Date of Patent: Oct. 3, 2017

(54) MULTIPLE MOTOR GAS TURBINE ENGINE SYSTEM WITH AUXILIARY GAS UTILIZATION

(71) Applicant: Daniel Keith Schlak, Alexandria, VA (US)

(72) Inventor: Daniel Keith Schlak, Alexandria, VA (US)

(73) Assignee: Daniel Keith Schlak, Alexandria, VA (US)

( * ) Notice: Subject to any disclaimer, the term of this patent is extended or adjusted under 35 U.S.C. 154(b) by 699 days.

(21) Appl. No.: 13/998,564

(22) Filed: Nov. 12, 2013

(65) Prior Publication Data

US 2015/0128597 A1    May 14, 2015

(51) Int. Cl.
  *F03B 13/00*    (2006.01)
  *B64D 33/00*    (2006.01)
  (Continued)

(52) U.S. Cl.
  CPC ........... *F03B 13/00* (2013.01); *B60K 5/08* (2013.01); *B64C 27/08* (2013.01); *B64C 27/22* (2013.01); *B64C 27/52* (2013.01); *B64C 29/00* (2013.01); *B64C 29/0016* (2013.01); *B64C 29/0041* (2013.01); *B64C 29/0083* (2013.01); *B64C 29/0091* (2013.01); *B64D 31/00* (2013.01);
  (Continued)

(58) Field of Classification Search
  CPC .... F02D 25/00; Y10S 74/08; Y10T 74/20012; Y10T 477/20; B60K 5/08; B64C 27/22; B64C 27/08; B64C 27/52; B64C 29/00; B64C 29/0016; B64C 29/0041; B64C 29/0083; B64C 29/0091; B64D 31/00; B64D 33/00

USPC ............................................................ 60/719
See application file for complete search history.

(56) References Cited

U.S. PATENT DOCUMENTS 1,493,368 A    5/1924    Mertz
2,636,129 A    4/1953    Agnew
(Continued)

FOREIGN PATENT DOCUMENTS

DE    1601581 A1 *  7/1970    ............... B60K 5/08

OTHER PUBLICATIONS

DE 1601581 English language machine translation.*

*Primary Examiner* — Mark Laurenzi
*Assistant Examiner* — Wesley Harris

(57) ABSTRACT

A vehicle propulsion system comprises at least two motors. Combustion occurs upstream of a first motor, and a second motor is downstream of said first motor. The first motor is a turbine that drives a primary propulsion element to effect propulsion and a compressor to effect compression. The second motor is an expansion device whose incoming gases arrive from said first motor. The first motor and the second motor intercommunicate energy via electrical, electromagnetic, and/or mechanical means. Pressurized gases that result from said compression, combustion, or both are rendered or wastegated for auxiliary usage such as aerial thrust, vertical takeoff and/or vertical landing, near-vertical takeoff and/or near-vertical landing, pneumatic storage for hybrid drive, pneumatic lift and/or drive for towing and/or raising another vehicle, aerial vehicle steering, aerial vehicle pitch stabilization or manipulation, aerial vehicle roll stabilization or manipulation, and/or aerial vehicle yaw stabilization or manipulation.

6 Claims, 22 Drawing Sheets

(51) Int. Cl.
*B64C 29/00* (2006.01)
*F02D 25/00* (2006.01)
*B60K 5/08* (2006.01)
*B64C 27/52* (2006.01)
*B64D 31/00* (2006.01)
*B64C 27/22* (2006.01)
*B64C 27/08* (2006.01)
*F01D 1/06* (2006.01)
*F03D 9/00* (2016.01)
*F02C 3/045* (2006.01)
*F02C 3/05* (2006.01)
*F02C 3/08* (2006.01)
*F02C 3/14* (2006.01)
*F03D 13/20* (2016.01)

(52) U.S. Cl.
CPC .............. *B64D 33/00* (2013.01); *F01D 1/06* (2013.01); *F02C 3/045* (2013.01); *F02C 3/05* (2013.01); *F02C 3/08* (2013.01); *F02C 3/14* (2013.01); *F02D 25/00* (2013.01); *F03D 9/00* (2013.01); *F03D 13/20* (2016.05); *F05B 2220/61* (2013.01); *F05B 2240/917* (2013.01); *F05B 2240/922* (2013.01); *Y02E 10/728* (2013.01); *Y02E 70/10* (2013.01); *Y02T 50/671* (2013.01); *Y10S 74/08* (2013.01); *Y10T 74/20012* (2015.01); *Y10T 477/20* (2015.01)

(56) References Cited

U.S. PATENT DOCUMENTS

| | | | |
|---|---|---|---|
| 3,414,481 | A | 12/1968 | Kelly, Jr. |
| 3,748,867 | A | 7/1973 | Bel Hamri |
| 3,754,147 | A | 8/1973 | Hancock et al. |
| 3,939,356 | A | 2/1976 | Loane |
| 3,953,971 | A | 5/1976 | Parker |
| 4,092,827 | A | 6/1978 | Schneider |
| 4,095,429 | A | 6/1978 | Morey |
| 4,187,686 | A | 2/1980 | Pommier |
| 4,197,713 | A | 4/1980 | Bulang |
| 4,284,899 | A | 8/1981 | Bendiks |
| 4,284,900 | A | 8/1981 | Botts |
| 4,309,006 | A | 1/1982 | Biscomb |
| 4,309,150 | A | 1/1982 | Payne |
| 4,318,275 | A | 3/1982 | Brown et al. |
| 4,341,490 | A | 7/1982 | Keeling |
| 4,351,651 | A | 9/1982 | Courneya |
| 4,391,100 | A | 7/1983 | Smith |
| 4,490,232 | A | 12/1984 | Lapeyre |
| 4,491,739 | A | 1/1985 | Watson |
| 4,757,687 | A | 7/1988 | Nasser |
| 4,760,706 | A | 8/1988 | Nasser |
| 4,842,221 | A | 6/1989 | Beach et al. |
| 4,997,347 | A | 3/1991 | Roos |
| 5,149,446 | A | 9/1992 | Reidy |
| 5,284,628 | A | 2/1994 | Prueitt |
| 5,295,625 | A | 3/1994 | Redford |
| 5,377,485 | A | 1/1995 | Bellamy |
| 6,202,782 | B1* | 3/2001 | Hatanaka ................. B60K 3/04 180/301 |
| 6,306,056 | B1* | 10/2001 | Moore ..................... B60K 5/08 180/65.1 |
| 6,422,016 | B2 | 7/2002 | Alkhamis |
| 6,434,942 | B1 | 8/2002 | Charlton |
| 6,684,648 | B2 | 2/2004 | Faquih |
| 6,861,766 | B2 | 3/2005 | Rembert |
| 7,000,410 | B2 | 2/2006 | Hutchinson |
| 7,129,596 | B2 | 10/2006 | Macedo |
| 7,210,896 | B2 | 5/2007 | Knott |
| 7,317,261 | B2 | 1/2008 | Rolt |
| 7,402,028 | B2 | 7/2008 | Wong |
| 7,786,610 | B2 | 8/2010 | Potter |
| 7,795,748 | B2 | 9/2010 | DeAngeles |
| 7,854,119 | B2 | 12/2010 | Strain |
| 7,895,847 | B2 | 3/2011 | Larsen |
| 7,911,073 | B2 | 3/2011 | Smith |
| 7,948,101 | B2 | 5/2011 | Burtch |
| 8,028,527 | B2 | 10/2011 | Vidmar |
| 8,166,710 | B2 | 5/2012 | Chan et al. |
| 8,247,912 | B2 | 8/2012 | Da Costa Duarte Pardal et al. |
| 8,341,961 | B2 | 1/2013 | Glynn |
| 8,444,081 | B2 | 5/2013 | Grenier |
| 2006/0112709 | A1 | 6/2006 | Boyle |
| 2007/0145748 | A1 | 6/2007 | Pierz |
| 2008/0048453 | A1 | 2/2008 | Amick |
| 2008/0272597 | A1* | 11/2008 | Althaus ................. F01D 19/00 290/52 |
| 2008/0314062 | A1 | 12/2008 | Ritchey |
| 2009/0261590 | A1 | 10/2009 | Aritaka |
| 2010/0244450 | A1 | 9/2010 | Tabe |
| 2010/0295314 | A1 | 11/2010 | Sohn |
| 2010/0326101 | A1 | 12/2010 | Scensey |
| 2011/0187119 | A1 | 8/2011 | McMaster |
| 2011/0192938 | A1 | 8/2011 | DiMarzio et al. |
| 2011/0303141 | A1 | 12/2011 | Franklin |
| 2012/0187693 | A1 | 7/2012 | Houvener et al. |
| 2013/0047655 | A1 | 2/2013 | White |
| 2013/0193266 | A1 | 8/2013 | DiMarzio et al. |

* cited by examiner

| 138 | | 77 | 124 | 132 |
|---|---|---|---|---|
| 140 | High Pressure | a | a | a |
| 141 | Moderate Pressure | b | a | a |
| 142 | Low Pressure | b | b | b |
| 143 | Very Low Pressure | b | b | c |
| 144 | High-Consumer (Non-Hybrid) | a | b | c |
| 145 | Heavy Braking | b | b | c |

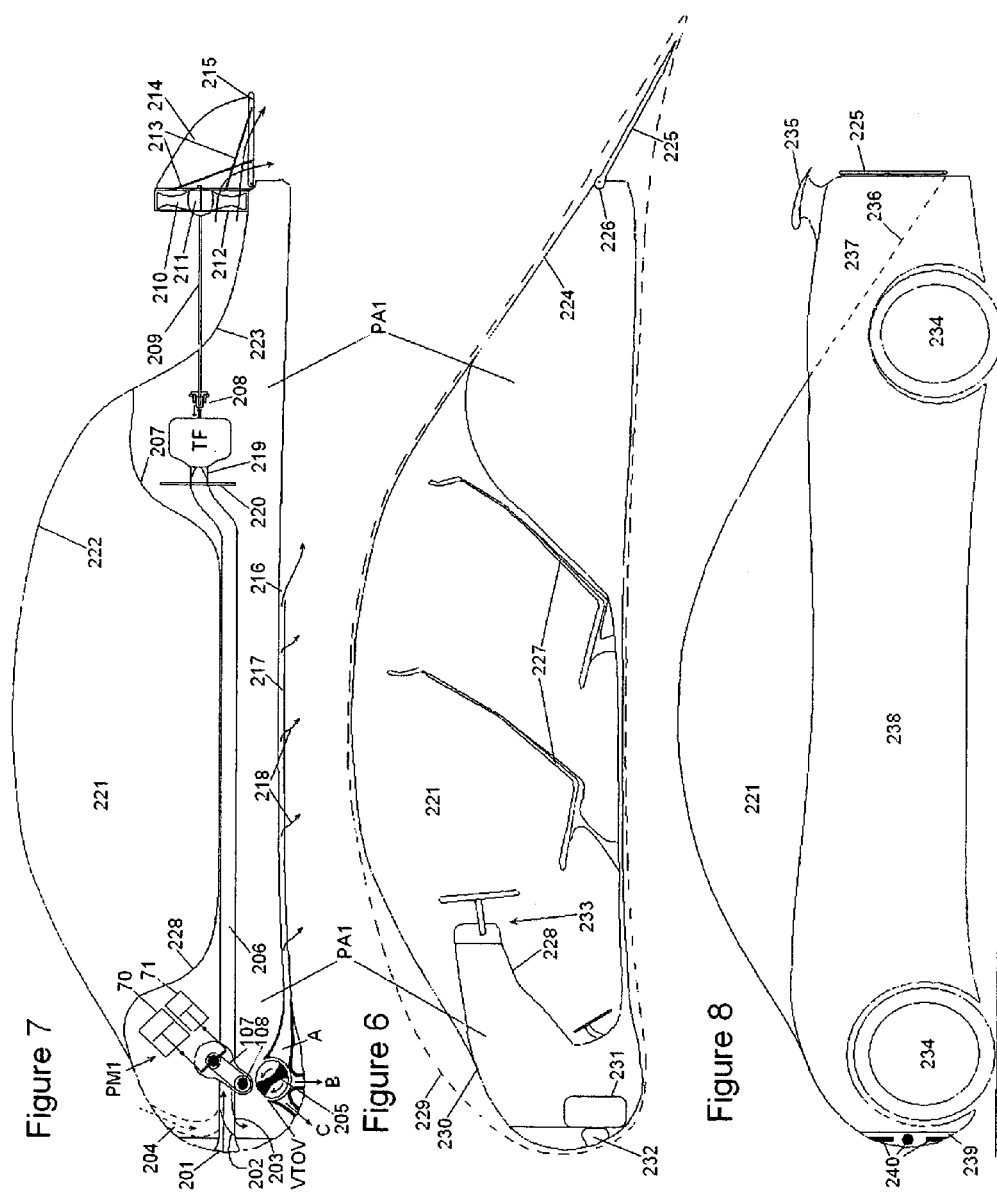

Fig. 11

System Chronology for Hybrid Operation – Method Steps

1 – Start-up (note: PA1 is partially charged prior to start-up due to final step of shutdown)

| Step | Description |
|---|---|
| 1-1 | Depressurize pressure-accumulator PA1 through reversible pump-motor PM1 |
| 1-2 | Route generated electricity from PM1 to conductive coils (i), accelerating TF |
| 1-3 | Open inlet and outlet of TF |
| 1-4 | Commence combustion in combustor C |

2 – Run-up and Hybrid Operation with P>Pmin

| Step | Description |
|---|---|
| 2-1 | Combust until $\omega 1$ (TF rotational velocity 1) and P1 are reached (load can be energized at this time) |
| 2-2 | When P=P1, close inlet and outlet of TF |
| 2-3 | Compressors and turbines self-evacuate with assistance from pump and relieved (open) bias-seals |
| 2-4 | Slowly expand gases in PA1 through PM1 (currently a motor-generator), electrically accelerating TF |
| 2-5 | Deceleration of TF via energization of Load L |
| 2-6 | Acceleration of TF via braking of Load L |
| 2-7 | Successive reiteration of steps 2-5 AND 2-6 until P=Pmin (or insufficient upcoming brakings foreseen) |
| 2-8 | Meanwhile, during quick-stops (brake-force required larger than reverse load capacity of load L):<br>  Reverse PM1 (now a pump), utilizing supplemental brake-force to draw ambient air into PA<br>  (Supplemental braking requirements excessive) Activate service brake |
| 2-9 | WHEN P=Pmin OR $\omega 1 = \omega 1 min$ (or insufficient upcoming brakings foreseen) – GO TO STEP 1-3 |

3 – Shutdown/Parking

| Step | Description |
|---|---|
| 3-1 | Close (if open) inlet and outlet of TF |
| 3-2 | Route electrical energy from TF to PM1 |
| 3-3 | Reverse PM1 to pump ambient air into PA |
| 3-4 | When $\omega 1=0$, close PM1 – resulting in hermetically sealed PA with sufficient charge to begin step 1 |

Figure 12

Transition to High Consumer Mode – Virtual Clutch

4 – Starting from road travel with moderate ω at decision moment (i.e. typical highway lift-off)

| Step | Description |
|---|---|
| 4-1 | Close (if open) PM1, sealing PA1 (vertical take-off valve VTOV already closed) |
| 4-2 | Open (if not already open) inlet and outlet of TF and commence combustion (if not already combusting) |
| 4-3 | While P increases to Pmax, direct all electrical energy from TF to load L, accelerating vehicle |
| 4-4 | When P=Pmax, cease combustion, close inlet and outlet of TF, open fan F inlet and flap panel to idle fan |
| 4-5 | Electrically transfer all kinetic (rotational) energy from TF module 1 (TFM1) to TF module 2 (TFM2) and L |
| 4-6 | When TFM1 and F are rotationally matched (via reduction gearing ratio), slide collar over trunnion |
| 4-7 | Open PM1 to maximum throughput, transfer all energy from PM1 and TFM2 to TFM1 and L (until/unless vehicle velocity is near lift-off velocity, then deactivate L for duration of flight) |
| 4-8 | Open inlet and outlet to TF, commence combustion, positively drive F at lift-off thrust |
| 4-9 | Although PM1 is still at max throughput, P will quickly reach Pmax |
| 4-10 | Selectively open vertical take-off valve VTOV to position A to complement fan thrust and to waste-gate PM1 |
| 4-11 | If advantageous, momentarily (or for duration of lift-off) rotate VTOV partially/fully to position B and vertical take-off flap VTOF partially/fully upright to achieve "pop up" effect |

5 – Starting from road travel with excessive ω at decision moment (i.e. atypical highway lift-off)

| Step | Description |
|---|---|
| 5-1 | Reverse PM1 (now a pump) and slow TF electrically via PM1 and L, charging PA1 and accelerating vehicle |
| 5-2 | When possible, open inlet and outlet of TF without combustion, further charging PA1 and slowing TF |
| 5-3 | When ω falls to predetermined rate, commence combustion |
| 5-4 | GO TO STEP 4-3 |

6 – VTO with moderate ω (i.e. heliopad/driveway lift-off)

| Step | Description |
|---|---|
| 6-1 | Down flap panel, open fan inlet, open inlet and outlet of TF, commence combustion, charging PA1 |
| 6-2 | Direct some electrical energy from TF to reversed PM1 (now a pump), further charging PA1 |
| 6-3 | When P=Pmax, cease combustion, close inlet and outlet of TF, close PM1 |
| 6-4 | Electrically transfer all kinetic (rotational) energy from TF module 1 (TFM1) to TF module 2 (TFM2) and L |
| 6-5 | Service brake applied (connect to front axle, PM1 pistons connect to generator) anytime prior to step 6-7 |
| 6-6 | When TFM1 is completely stopped, slide collar over trunnion, raise VTOFs to near-upright (fan nozzled down) |
| 6-7 | Open inlet and outlet to TF, commence combustion, continue to reverse PM1 via electricity from TF |
| 6-8 | When P=Pvto, quickly cycle VTOV to position C and switch to thrust reverser on front inlet |
| 6-9 | One VTOF has been left horizontal to keep down-thrust just shy of lift-off. It is now raised parallel to the others |

7 – VTO with high ω (i.e. traffic lift-off)

| Step | Description |
|---|---|
| 7-1 | Reverse PM1 (now a pump) and slow TF electrically via PM1, charging PA1 |
| 7-2 | When ω falls to predetermined rate, GO TO STEP 6-1 |

Fig. 13

(Continuation of Figure 12)

8 – Pre-planned or taxi-to-runway flight (since significant fuel is consumed by VTO, this may be common)

| Step | Description |
|---|---|
| 8-1 | Perform steps 1-1 through 2-7 until on straightaway/runway, then perform steps 4-1 through 4-11 |
| 8-2 | With (GPS) knowledge of route (user's home and favorite lift-off), the computer can optimize fuel usage |

9 – Road landing

| Step | Description |
|---|---|
| 9-1 | Obtain altitude and alignment just above roadway, level out and run TF and F at cruise |
| 9-2 | Raise the central VTOF, or two outermost VTOFs, partway, to partially vector the thrust down |
| 9-3 | Simultaneously with 9-2, cycle VTOV to position B. |
| 9-4 | Loss of thrust in 9-2 and 9-3 reduces lift. Vehicle descends onto air cushion created by downward thrust. |
| 9-5 | Several inches above roadway, level VTOFs and retract (toward fan) flap panel. Rear wheels touch down. |
| 9-6 | A moment behind step 9-5, cycle VTOV closed and cease combustion. Front wheels touch down. |
| 9-7 | Slide collar off trunnion, close fan inlet |
| 9-8 | Braking load drives TF to high $\omega$, GO TO STEP 2-5 |
| | (it is uncertain at this time when, whether, and how PM1 should be utilized during this procedure) |

10 – Vertical landing

| Step | Description |
|---|---|
| 10-1 | Obtain approach position, attitude, and altitude |
| 10-2 | Cycle VTOV to position B and all VTOF's to max upright position, vectoring all thrust and exhaust downward |
| 10-3 | Pitch/roll/yaw nozzles PRYNs and TF driven selectively to stabilize speed, lift, pitch, roll, and yaw |
| 10-4 | Vehicle coasts through a deceleration and descent curve to arrive mostly slowed, above and just shy of LZ |
| 10-5 | Cycle VTOV to position C and switch to thrust reverser on front inlet, bring horizontal velocity to zero above LZ |
| 10-6 | Attenuate fuel-in until touchdown |
| 10-7 | Slide collar off trunnion, close VTOV, retract (toward fan) flap panel, close fan inlet |
| 10-8 | GO TO EITHER STEP 2-1 (to taxi or drive) OR STEP 3-1 (to park) |

11 – Other features

| Step | Description |
|---|---|
| 11-1 | With GPS device, system can begin shedding energy a certain distance from one's destination |
| 11-2 | Docking station plug-ins allow vehicle to depart with maximum $\omega$ and P, such that lift-off happens fully fueled |

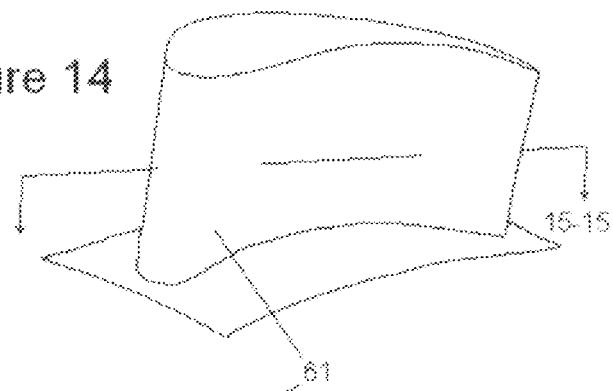
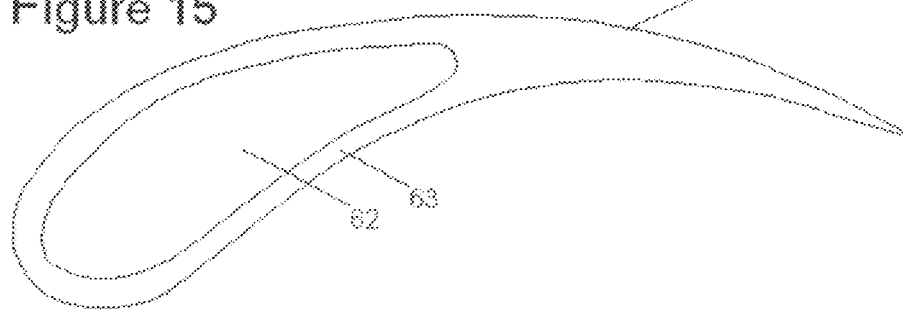
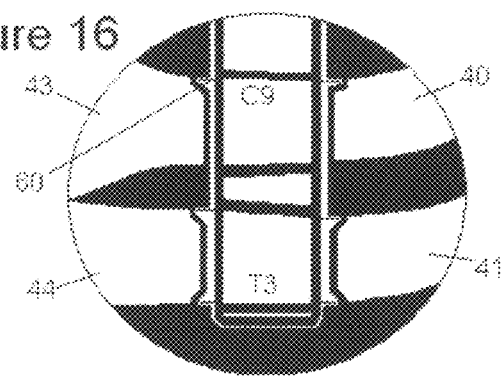

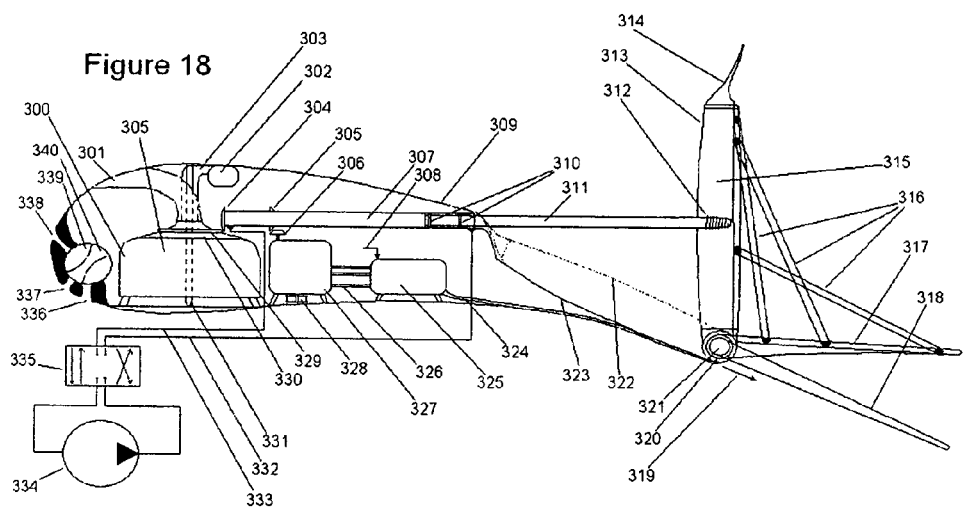
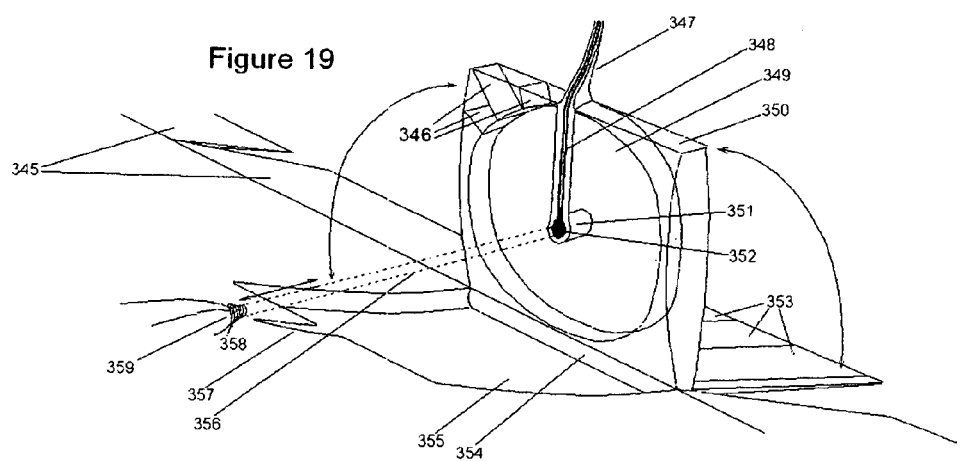

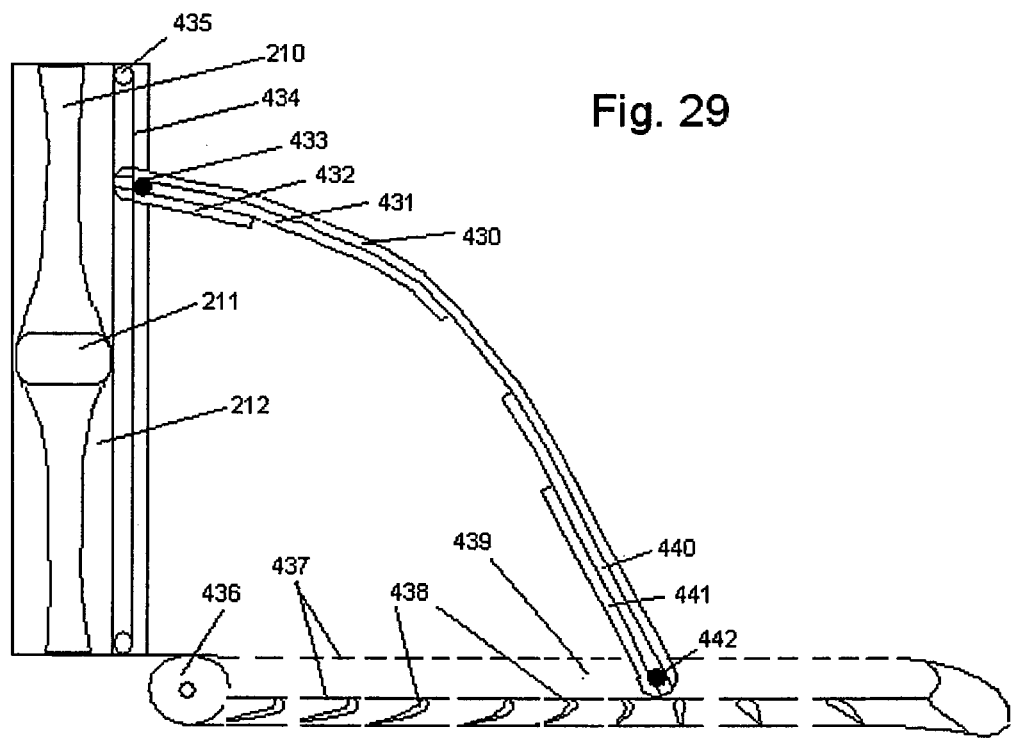
Fig. 29
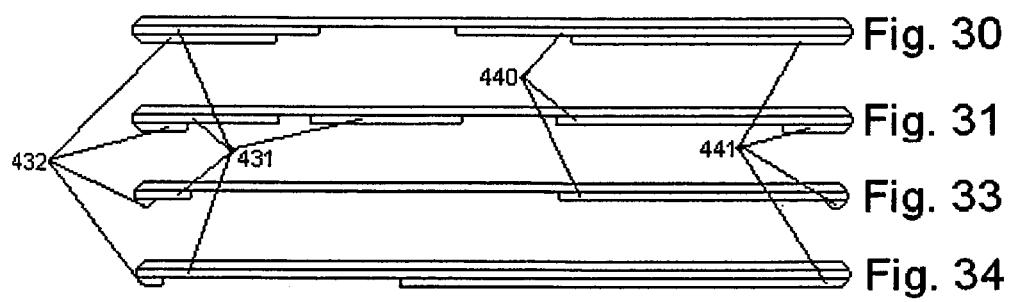
Fig. 30
Fig. 31
Fig. 33
Fig. 34

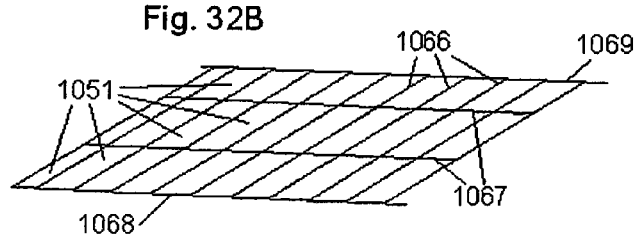
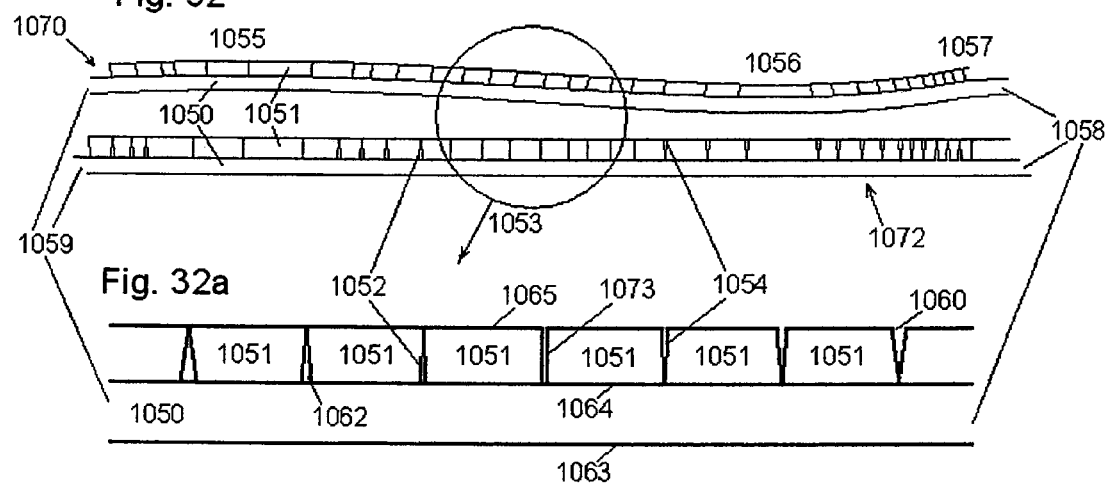

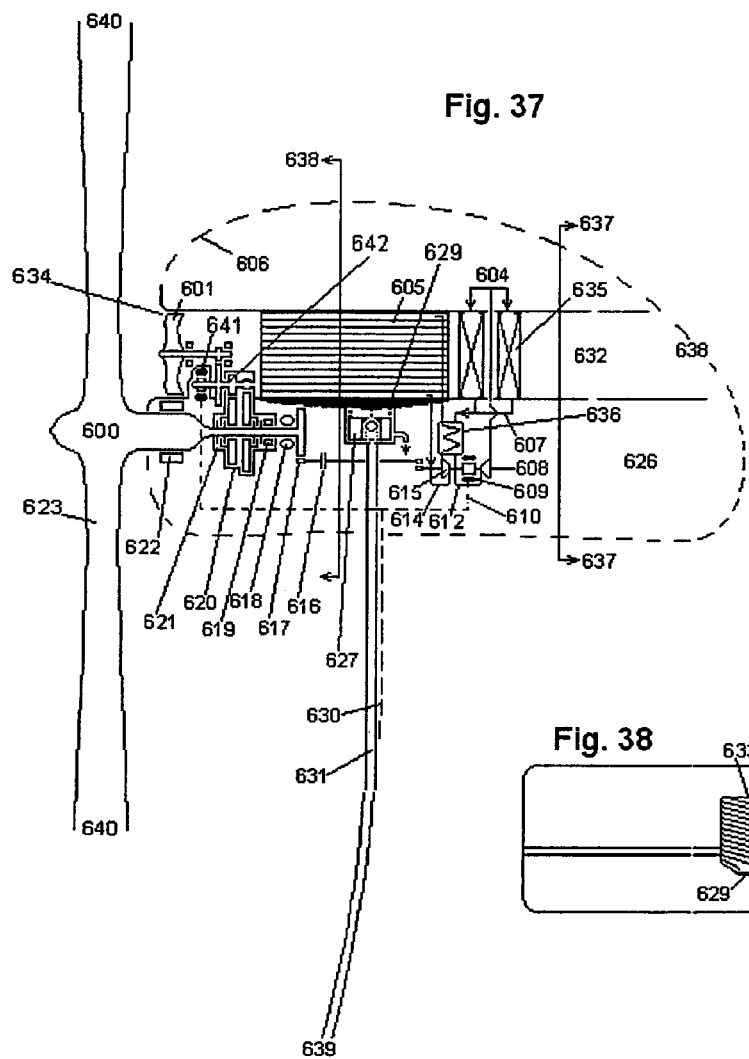
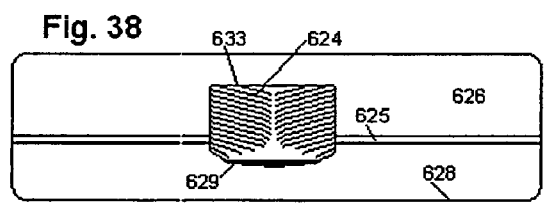
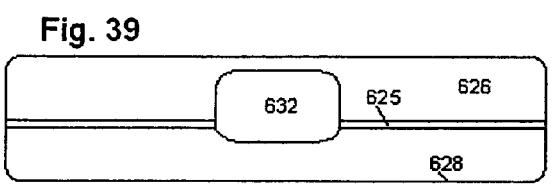

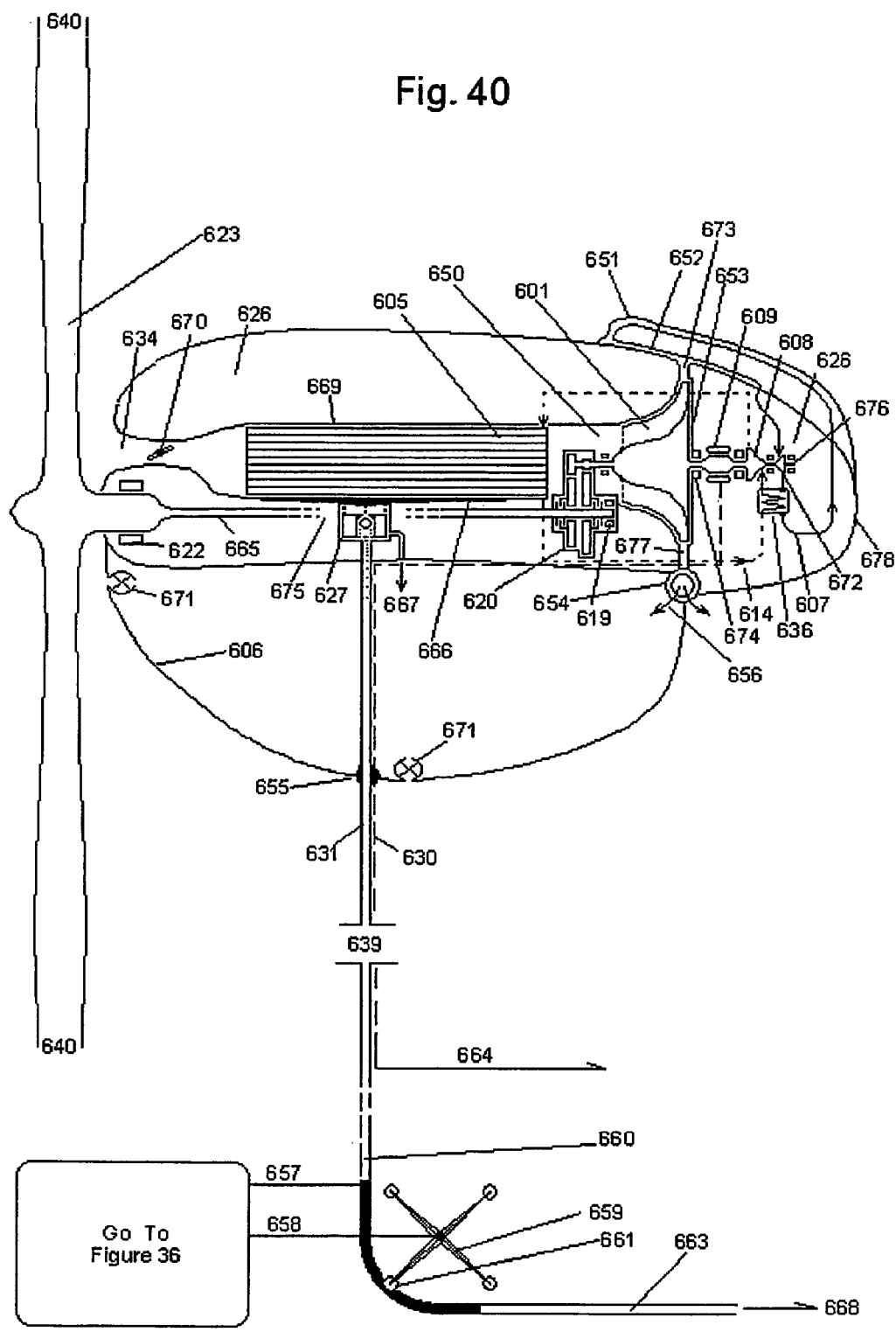

MULTIPLE MOTOR GAS TURBINE ENGINE SYSTEM WITH AUXILIARY GAS UTILIZATION

BACKGROUND SUMMARY

Power plants typically produce peak power within a single prescribed operating range. This range is a design specification and invariably operation outside it is undesired. In instances requiring high power production, performance while underloaded is a secondary consideration and often the inefficiencies associated therewith are written off, as negligible in some instances such as wherein underloaded conditions are only encountered at the beginning and end of a long cycle. In some applications, the upper loading range can be an order of magnitude, or more, higher than the underloaded range. It is the inventor's understanding that the prior art is insufficient in offering a single power plant offering plural optimal operating ranges wherein the ranges are widely disparate in nature and wherein the power plant and the system comprised thereof are adequately small, lightweight, and simple.

Hybrid systems have shown to be, thus far, the most efficient method of operating machinery, particularly vehicles. However, hybrid systems inherently incorporate multiple modules, each with its corresponding mass, volume, and complexity. Flywheels and batteries can be as massive as the prime movers they complement. In an effort to design purely complementary systems, the prime mover is constructed to be as small and light as possible, and the volumetric flow of combustion gases therethrough restricted to as little as possible, for reasons known to practitioners in the art. The maximum output is limited in such cases to the sum of energy stored and energy from the prime mover. Too often this is far insufficient, leaving industry with no non-hybrid choice but to waste considerable energy using a large engine to operate in the underloaded state, or fit a single piece of machinery with two prime movers. The hybrid solutions utilized to obviate these wasteful scenarios are complex and inordinately cumbersome. Although in certain applications theoretical optimizations of energy can be reached, the resulting masses and sizes of the resulting machines are simply out of consideration in many fields of endeavor.

Specifically in dealing with high-power hybrid systems, a not uncommon example is the combination of an energy-storage mechanism with a turbine. Complexity and additional mass and size result from efforts to selectively engage one to the other, and both and/or one to the driven means. Also, considerable energy is wasted in the intermittent starting from standstill of the turbine. The most glaring drawback, however, is the fact that there are necessarily entailed three means; one for energy creation, one for energy storage, and one for energy transmission. In many uses this does not matter much, for the machinery that use the devices are slow, stationary, and/or off-road, such that size is not of issue, and, as mentioned, they are hybrid, such that energy put into acceleration of the superfluous mass is reclaimed during deceleration. However, there is still felt a need in the art for an equivalent system that is lighter, smaller, and faster.

SUMMARY OF THE INVENTION

Disclosed is a power plant incorporating the attributes of a gas turbine engine, flywheel, and generator (hereafter "TF") in an integral unit of remarkable compactness, obviating prior art solutions providing three disparate units, consequently reducing the overall weight and volume of hybrid systems. Also disclosed is machinery or a vehicle for use with the TF comprising a pressurized chamber, or pressure accumulator, and supplemental electrical and pressurized apparatus which cooperate to effect a method typically embodied by:

a) a low-power, hybrid mode characterized by high efficiency; and b) a high-power mode characterized by high torque.

Various (i.e. compressor, turbine) stages of the TF are arrayed with magnetized elements. The elements could represent a core of each rotor blade, being overlaid with a harder, sturdier material, or, if feasible, the blades themselves. Also envisioned are elements in other places attached to the compressor, so long as those places are areas of high velocity near stationary (stator) locations capable of interacting with the elements. Electrical coils are placed within said stationary locations and the electrons within them experience electromotive force due to the magnetic flux caused by passing magnets, creating energy. Conversely, movement of the electrons in the coils due to external electromotive forces causes physical acceleration and deceleration of the magnets.

The utilization of the TF as a flywheel is thus inherent. Intermittent periods of combustion in the combustion chambers accelerate the TF to a first speed and then combustion ceases. The intake and exhaust paths of the TF are hermetically sealed. The TF, via means to be described later, continues to force air toward the combustor, whence it is withdrawn by a small pump, thereby effectively evacuating the TF and allowing it to spin with negligible drag. Electrical energy is drawn out of and into the rotating TF, decelerating it and accelerating it, respectively. Frequency and duration of the periods of combustion will be determined to disallow the rotational inertia of the TF falling below a level known to be minimal for power demands from consumers, and/or for unaided restart of the combustion process (in fact, due to the inherent method, a starter is obviated altogether).

The exhaust passed downstream from the final turbine stage is accumulated in a pressure accumulator, preferably a large one representing the majority of the machine/vehicle not needed to support life. The exhausted air will be so lean (depleted) that it should surround the fuel tanks, motors, etc., such that the machine/vehicle and its constituent parts cannot of themselves combust.

The accumulator will pressurize with exhaust until a certain pressure exists, at which point it is cut off from the TF via the latter's being hermetically sealed. The exhaust slowly expands (to environment) in a small reversible pump/motor or turbine which drives a shaft which turns a small, typical motor/generator. All pressures within the TF will atrophy to less than one atmosphere.

Said small motor/generator, magnets/coils of the TF, motors (i.e. traction motors of a vehicle), and other conceived consumers communicate electricity, via respective transformers, inverters, converters, and so forth, along a DC bus.

In a preferred embodiment, a novel gas turbine power plant is used to complement the nature of the hybrid operation, and consists of an everted flow-path with the turbine stages disposed radially inwardly of the compressor stages. The first compressor stage and second turbine stage are of the centrifugal type, providing the highest possible head over the shortest axial length, and effecting narrow, combined, concentrically paired ducts for the intake and exhaust. In other words, the TF exhausts and intakes from the same end, the exhaust and intake are parallel and concentric, and the combustion is at the other end. By careful placement of all intervening items, the entire system should be capable of fabrication to dimensions not in excess of 2.5 feet in any direction, enabling its placement within a passenger vehicle or other environment where size is restricted. Also, proper material selection should result in a mass not much higher than a typical hybrid vehicle. However, larger, more or less massive versions could be utilized in heavy machinery, large vehicles, water- and air-craft, etc.

One thing should be pointed out concerning the novel power plant geometry. All stages are arranged to, when the main unit is sealed off, force air toward the combustor. With proper placement of bypass valves—specifically inter-stage seals that automatically leak when a pressure-drop across them falls below a threshold—the power-plant, not only efficient in its use of space, evacuates itself much more quickly from a single bleed point (preferably in the combustor) than traditional (linear axial) systems ever could, further reducing the number of moving parts. Again, the TF charges an accumulator, the pressure in the accumulator drives a pump, the pump, TF, and utility motors direct electrical energy away from and toward each other along a DC bus. A heat exchanger directs the initial intake air past the air traveling from the last turbine stage to the accumulator. Further, a recuperator can be advantageously positioned to heat the combustor inlet with a turbine outlet. The recuperator, the heat exchanger, and supplemental heat exchanges inside the accumulator, such as the heating of fuel, should sufficiently cool the exhaust air so that it does not harm the chamber, which is desired since the materials best suited for the accumulator due to their tensile-strength-to-weight ratios decompose at high temperatures.

During sustained high power output all available power is directed to the compressor/turbine module attached to a main drive shaft. In the preferred embodiment, the first turbine stage produces work whose sum is delivered to said shaft after having the work of the axial compressor stages subtracted therefrom. Also, in the preferred embodiment, the second turbine group, of the centrifugal type, drives the first compressor, also of the centrifugal type. This stage has also associated therewith its own corresponding magnets and coils, and as it rotates freely, in a preferred embodiment, of the main module, its power will be fed in the form of electricity to the magnets of the main module, and thereby, to said main shaft. Additionally, the downstream, post-chamber reversible pump/motor or turbine, will no longer expand the accumulated exhaust slowly, but will be run up to a maximum speed, while the transformer associated with its corresponding electrical generator, of the variable type, will have its ratio changed (as would a mechanical transmission, its ratio should always be varied to allow the generator, when the generator drives the TF, an electro-mechanical advantage; likely this could be effected by constantly varying the number of coils connected in series on the toroid) to match the now rapidly turning and highly torqued shaft associated with the generator. In this way the constant stream of exhaust into the chamber can be dealt with and its high pressure utilized for optimal power production. The pump/motor can also be wastegated by another system within the machine. Consequently, this considerable electrical power produced by the reversible pump/motor or turbine will be fed, via the generator and transformer, to said magnetized vanes of the main (axial) compressor, the confluence of it with said EMF from the turbo-charging stage will further torque the main shaft, complementing the physical torque from the first turbine stage, such that, although the turbines and other producers of energy are spread about the overall system, the shaft transmits, selectively or not, all available power to the high-output consumer.

An electrical control system will selectively connect (as well as convert, invert, and/or transform, as needed) each driven and drivable element with the DC bus, via prior-art means. An AC bus is not unforeseen, however due to the inflexibility associated with its embodiment, it would disallow the independence of all the systems, and would therefore be difficult to realize in a dynamic system, without extensive control provisions. For static systems, with masses, volumes, geometries, and electrical components matched for a predetermined energy production, alternating current could be preferred.

However, the advantage of the DC bus is that it obviates transmissions and clutches, and any shafts, axles, gears, levers, housings, collars, and cooling and lubricating systems associated therewith. A control system will actuate small switches and corresponding governors of current, such that the consumers and producers always operate at the most efficient, or demanded, speed and torque. For the TF during flywheel stage, this speed is much higher than is achievable by the fluid reaction on the turbine vanes. The traction motors can decelerate the vehicle (if it is a vehicle the system is being used in) or accelerate it, regardless of speed of the vehicle, and the TF can always be accelerated, despite the fact that it might already be rotating very quickly, as the torque on the main compressor/turbine group will always be proportional to voltage applied, since the incoming electrical energy will always be oscillated with a frequency, and timing, perfectly attuned. The methods for doing this are well known in the electrical arts.

Thus, pursuant to the forgoing, the reversible pump/motor or post-chamber turbine can be embodied by just about any combination of expanders. It is known, particularly from steam turbine and other stationary power-plant application, that the higher the number of turbines and heat exchangers, the better; in other words, the asymptudinal theoretical limit on efficiency can only be approached via a nearly infinite array of turbines and heat exchangers/engines. The enthalpy escaping the combustor requires near-infinite successive mechanisms to extract all kinetic and heat energies, or finite mechanisms and infinite time. Clearly there is a trade-off involved in the field of endeavor of the instant application, weight and volume vs. un-extracted enthalpy. Infinite time is the key to comprehending the initiative of the invention.

Since the instant invention provides for cooling between the exhaust from the TF and the post-chamber expander(s), the material requirements for the latter are eased; not only via the parallel-flow heat exchanger envisioned and described below, but also via a recuperator that is inherent in the geometry of the TF's preferred embodiment, and some residual heat losses. The enthalpy of the exhaust, at the point it arrives to the reversible pump/motor or post-chamber turbine, is disproportionately represented by kinetic (pressure) energy, the heat energy having been mitigated to acceptable levels and no longer deleterious to downstream matter (but if not, additional heat exchangers could be utilized, or even a heat pump, the energy of the latter routed the way, via electricity, of all the other energies of the system, for the temperature of the post-chamber air will only be a problem during high-output, non-intermittent operation). The disproportionately kinetic nature of the enthalpy can be nonetheless rendered, and to what extent it can be rendered is the subject of Appendix I of Nonprovisional application Ser. No. 13/506,962, still pending. This mundane list will be omitted in future applications. It is an enumerative exercise, once the context and the principles of engineering are considered.

Where, in such applications as single-engine aircraft, Coriolis forces must be mitigated to every feasible extent, the turbo-charging stage (compressor group 1) rotates in a direction counter to that of the axial-compressor (compressor group 2) and first turbine stage (turbine group 1). As this increases the demand on any bearings between them, in any application where Coriolis is not of issue, the direction of rotation of all stages in the main TF unit should be identical. However, in any event, the most efficient arrangement, and thereby best mode, although its opposite is not un-considered by any means, involves the turbo-charging stage (even if it comprises axial compressor and axial turbine, even if it these are not concentric, even if it comprises axial compressor and centrifugal turbine or vice versa, even if all are concentric or they are separated greatly by space or not adjacent) and main unit rotatable relative to one another, since (as is the case of concentric dual- and triple-shafts of typical gas turbines) each will desire its own rotation rate to maximize efficiency. The capability of relative rotation is also necessitated by a "virtual clutching" method for engagement of the high-consumer, described below.

Also considered is the possibility that variable rotor vanes could be utilized in lieu of the self-evacuation. For instance, the vanes of the compressors could be completely closed via cascade rings or equivalent structure, such that the lead edge of one abuts the trail edge of another. This, too, would reduce internal drag on the TF to close to negligible. However, it is likely this system would be inordinately complex, and embodied likewise would detract from the robustness and compactness of the system. The speeds at which the TF will experience, and the shocks on it during the sealing and unsealing of the flow path, require as few moving parts (seen in the relative frame of the TF) as possible.

As a side note, one of the advantages of the first compressor and last turbine stages' being of the centrifugal or mixed-flow variety is to absorb the shock of said sealing off the flow path. It is doubtful axial-flow vanes, being cantilevered (perhaps even if ringed around their periphery with a runner, which is also envisioned anyway), could withstand the pressure fluctuations experienced along the first few axial inches of the compression system, without a buffer in the form of vanes of the type of a centrifugal compressor, to protect them.

However, an additional buffer is provided in the preferred embodiment, in the form of the thin walls of an upstream heat exchanger and manfold, which by being of the plate-type and if thinly walled enough will bellow momentarily inwardly at the commencement of evacuation, such that the combination of the variable volume walls of the heat exchanger between the main inlet and the first compressor inlet, and the means, that by which the first two to four atmospheres of head are accrued (i.e. a centrifugal compressor and turbine nearer the seal-off point than intermediary members), being unbreakable, should ensure the compressor rotor vanes do not break, which is crucial since any alloying of the ferritic, neodymium, etc. cores will possibly diminish magnetizability, assuming blade-magnets are utilized.

It is known in the art that the more compressors, and the more turbines, in the system, produce greater efficiency. This efficiency is offset in startup cost and weight, by added material and manufacturing steps. However, it is obvious that any element of the system could be repeated, such as in the event that two compressor stages and two turbine stages are not optimal for the TF. In this case, an extra compressor stage or turbine stage or both could be added, or more of either or more of both. In the embodiment where each stage is a turbine surrounded by a compressor surrounded by a magnetized array, there could be three or four of them, although in this document only two of each are shown.

Philosophically speaking, the perfect vehicle would have the majority of its innate, functional mass spinning in a flywheel state. Thus, a flywheel with the fuel tank within it would be beneficial, and similar in design to the TF, probably not coaxial with it, but even if it were coaxial with the TF, such as part of the motor-generator or another system, etc., although it is not seen how any of this would be cost beneficial at the time of application for patent. However, a spinning fuel tank with a magnetized array attached to its periphery with corresponding coils around it, or attached via a shaft to a TF module, would have automatic value, were the conditions for its implementation realized. It would operate on the dc bus identically to the TF modules. Perhaps the fuel weighs, most of the time, one tenth of the weight of the vehicle. This one-tenth's contribution to regenerative braking would offset its weight, and likely its manufacturability concerns, in energy/horsepower offerings, inherently. Whether this is cost-effective is the subject of another discussion.

As there is a DC bus, so also must the pressure accumulator be seen as a "pressure bus." It is an accumulator, and thus all accumulations thereto and expenditures therefrom, however independent in their utilization, augment or deplete, respectively, the stored pressure energy. For this reason it is not surprising that there are further uses with which it can be associated.

For instance, the shock absorbers, in the event that the machinery is a vehicle, can feed the main chamber via means known by prior U.S patents. Particularly in the embodiment of an automobile, a simple leading arm with a chain- or belt driven wheel receiving motive power from a motor along the arm, while up and down perturbations experience due to contours in the road cause movement against a piston and spring, heightens the hybrid aspects of the foreseen embodiments. Following the teachings of said patents, the initial deflection of the rod will charge the chamber, as will the reaction by the spring to home the rod. The chamber, being ubiquitous, is ready and willing to assume this energy for future use, and the acceleration it later provides will almost negate the deceleration caused by the contour. It is expected that this provision will more than make up for the added cost and weight associated with replacing a typical shock absorber with one of said patents, however they were disused in their own time.

Mode-Change: From Hybrid Operation to High-Consumer Operation

In a preferred embodiment no clutch is required for connecting the main shaft (MS) to the high-consumer drive. When engagement of the high-consumer is desired, the primary TF module (PTFM) is braked electrically, all its energy (the TF system inlet and outlet being closed, combustion ceased, the TF system evacuated) being transferred electrically along the electrical bus (EB) to the secondary TF module secondary turbine/flywheel module, accelerating it. The pressure accumulator PA is depleted of any contents rapidly through the pump/motor (PM1), the electrical energy obtained therefrom also being transferred to the secondary turbine/flywheel module along the DC bus. The secondary turbine/flywheel module now comprises more or less all the stored energy of the overall machine in the form of rotational kinetic (inertial) energy.

When the main shaft MS and high-consumer drive shaft have equivalent rotational velocities (not necessarily zero, as discussed later), a sleeve or collar associated with a differential (or similar torque transfer mechanism) associated with the drive shaft will be forced in a longitudinal direction (relative to the main shaft), to mate with a protrusion structure on the main shaft. In some applications a slot or groove, or a plurality of either, will embrace a trunnion or like, or a plurality thereof, on the main shaft. In other applications, the main shaft will be splined on its outer diameter, and the sleeve/collar machined on its inner diameter to interfit, or vice versa. Other embodiments are foreseen. Countless arrangements are known to those of ordinary skill in the art for engaging a shaft to torque transfer means when their speeds are matched during engagement, and the simplest is of course preferred. The selection of one or the other is not of issue in the instant application. A clutch might be used, with or without the provision of matching the speeds of the shafts, as could any other means known in the art. All that is of essence in this discussion is that in a preferred embodiment the clutching is "virtual." Actual slip between the two shafts would be detrimental, but what is most detrimental is a dissipative effect on the spinning components.

Most advantageously, a simple collar that does not even touch the shaft until engaging it precludes viscosity or frictional resistances to free- or fly- wheeling desired during hybrid operation. The obviation of the clutch by the virtual-clutch method is fundamental to realizing the theoretical efficiency of the proposed invention. An added benefit is that surplus energy from hybrid mode is transferred directly into the high-consumer mode.

Continuing, once the main shaft and torque-transfer leading to the drive shaft are matched in speed at their engagement point, they are positively locked for rotation together. Subsequently, the primary TF module and secondary TF module are electrically connected one to the other and allowed to approach equilibrium via the transfer of energy from the secondary turbine/flywheel module to the primary turbine/flywheel module along the electrical bus. When optimal speeds have been reached for both, combustion commences. The torque generated by the secondary turbine/flywheel module, the latter comprising no drive shaft in the preferred embodiment, continues to transfer to the primary turbine/flywheel module (and thereby to the main shaft) along the DC bus. Likewise for the pump/motor PM1, which should be operated in a manner and at a capacity to optimize the available pressure within the pressure accumulator (PA1), now being continuously charged by the TF system.

In other words, the power available from turbine group 2 is transferred, minus the load required by compressor group 1, via the magnet/coil arrangement, to the DC bus. Meanwhile, the power generated by the pump/motor PM1 (now operating as a motor) is transferred, via its corresponding motor/generator MG1 (now operating as a generator), to the DC bus. The magnet/coil arrangement on the primary turbine/flywheel module consumes all the power from the DC bus, torquing the primary turbine/flywheel module in its drive direction. The amount of power available from the DC bus is subtracted from the load requirement on the main shaft (from the drive shaft), while the load on compressor stage 2 is added thereto, and the resulting power demand is provided by controlling the combustor to impinge combustion gases upon the rotor vanes of turbine stage 1.

The following equation appertains:

$$P_{required\ of\ turbine\ group\ 1} = P_{drive\ shaft} + P_{compressor\ group\ 1} + P_{compressor\ group\ 2} - P_{turbine\ group\ 2} - P_{PM1} \quad [\text{Equation 1}]$$

Optimization of each module, geometrical and operational, can be determined by an iterative approach for each industrial application, for the contribution of $P_{PM1}$ will be a function of the capacity of the PA, while $P_{compressor\ group\ 1}$ and $P_{compressor\ group\ 2}$ will be a function of the desired size of the TF system, $P_{drive\ shaft}$ will be defined by output specifications, etc.

The foregoing distinguishes the high-consumer mode from the hybrid mode, and sets it aside in a view toward design. During hybrid operation, the primary turbine/flywheel module and secondary turbine/flywheel module accelerate and decelerate independently unless one falls to a speed threatening to stall future combustion attempts or fail on an impending increased required EMF to the bus, at which point a quick equilibration between the two may be initiated. All systems communicate with the bus unconcerned with one another, unless the system controller predicts a future problem (e.g. insufficient inertial energy of TF system relative to pressure within the pressure accumulator, in which case the PM1 would increase its capacity, such that PM1 can always, unless commanded otherwise, operate at the slowest possible (and therefore most efficient) rate. The load, also, should be operated solely upon input and output considerations at the load itself.

The independence of all of the units in the hybrid mode allows Equation 1 to be solved for the high-consumer mode first. The result of an iterative operation to determine the make-up of the units to satisfy the high-consumer will, it is hoped, produce a system just as efficient in hybrid operation as any other (standard HEV) would be, especially considering the ratios $P_{turbine\ group\ 2}/P_{compressor\ group\ 1}$ and $P_{turbine\ group\ 1}/P_{compressor\ group\ 2}$ will follow roughly the same curve, vs. throughput, as each other. Discrepancies between the energy available in primary turbine/flywheel module and secondary turbine/flywheel module can always be adjusted by equilibriating them, presuming they do not inherently automatically equilibriate, which they probably will. It is perceived, however, that the specifications of PM1 in hybrid mode will likely take precedence over said of high-consumer mode. In any case, solving for both simultaneously is not beyond currently marketed simulation software.

Solution of Equation 1, and considerations springing therefrom, will be the subject of further research as well as, in the event the results are surprising or entail further structural or operational advancements, the subject of continuation-in-part applications, whereupon no rights are waived and, following this string, considering the system as construed for an automobile would be monstrously different, schematically (on paper), quantifiably (sizing), and qualitatively (material selection), from that of, say, an earth-mover, it is here asserted that, barring truly innovative improvements, these results will be no more than an extrapolation of the novel concepts, as well as the novel assemblage of concepts, put forth in the present application, and therefore obvious to one of ordinary skill in the art.

In any and all areas of application, it is anticipated that all parts should be as light, yet sturdy, as possible, all magnets and conductors as effective as possible, etc., limited only by cost-benefit analysis. If it is decided to run the system on fuel-A, all pre-treatment and exhaust features associated with fuel-A will no doubt be modifications to the present invention suggested by art dealing with fuel-A in other applications. Similarly for fuel-B, etc. The shape and size of the combustors can be selected from any that can be shaped and mounted to complement the system and conform to the geometrical constraints posed by the chosen industrial application. Prior art suggesting modification for respective optimization of various seals, vanes, bearings, circuitry, ducting, shafts, airfoils, fans, motors, generators, pumps, etc. of other known systems are inherently and necessarily suggestive of modifying the seals, vanes, bearings, circuitry, ducting, shafts, air foils, fans, motors, generators, pumps, etc., of the present invention.

Mode-Change: Back to Hybrid Operation

Switching from high-consumer mode back to hybrid mode does not have to be a mirror image of the switch from hybrid mode to high-consumer mode, although it could be. In fact, the preferred manner of achieving said switch is an abrupt decoupling of the collar/sleeve from the MS. Only in special applications would there exist the possibility of recapturing the energy already passed on to the high-consumer. Thus, if the mating action that effected the coupling were reversed without matching the main shaft speed to that of the torque-transfer leading to the drive shaft, the TF system would already be well on its way to its post-run-up speed, and the drive shaft would run itself down with negligible rotational inertia excepting that of whatever load it heretofore had driven. It is foreseen that this will not always be preferred, in which case the "mirror image" might be viable or, if wasteful of time or energy, something between one and the other of the two methods described in this paragraph. As in prior discussions, the end-use will dictate the means, although the best mode is believed by the inventor to have been adequately disclosed, particularly as the "preferred" manner corresponds to the example utilized hereinbelow to discuss the manifestation of the system in exemplary industrial applications. In no way should the examples be limiting.

Industrial Applicability: An Example

It will be obvious to one of ordinary skill in the art that a surplus energy due to stored pressure is constantly available during high-output mode. Each application will find its use for this energy, but nowhere is it more to be availed than in the application of a roadable aircraft. In fact, such an automobile is an excellent example of the potential industrial applicability of the invention.

Thus, a vehicle is disclosed, having an effective cross-section of a modified airfoil. Customs of usage require that the vehicle be inconspicuous, in appearance akin to known automobiles. However, it is proposed, that the power-plant and associated system, housed and modified appropriately, enable a wheeled vehicle similar in appearance to a typical streetcar, to operate as an airplane, capable of takeoff from and landing on road, driveway, heliopad, roof, lawn, and still water. These attributes are derivative fruits of the innate arrangement of the system heretofore described. The inventor has extrapolated from said fruits to purport at least a working, if not perfected, embodiment for realization of such a vessel.

The embodiment's common name is a roadable aircraft. Like in other prior art pursuits, the effective cross-section of the majority of the width is made to encompass all the working modules of the system. Said effective cross-section, that of a modified airfoil, can be destroyed by flaps, louvers, fins, etc., such that, until lift is desired it is nonexistent or negligible. Further desired are the parts not associated with the effective cross-section, those that render the appearance of the vehicle to be not overtly dissimilar to a standard car, and those which convene daily use by a driver. However, the advantages of the concept herein disclosed cannot be overlooked. With a glance at the provided figures, although they should not be seen as limiting, it is clear that the airfoil can be realized, following the methods hereafter detailed, such that once it is provided, given a certain thrust lift is inherent.

Thrust is provided in the preferred embodiment, in the form of an impeller/fan/propeller/etc., rotated within its housing, or with no housing, by the drive shaft, via or not via intervening gears, clutches, etc. from the TF main shaft. Two of the three underlying predicates of sustained flight have been here met, for it follows [from Bernoulli's principle] that given sufficient speed, the airfoil-cross-section will provide adequate lift, and that given the weight and throughput of the disclosed power plant, adequate thrust has been provided to attain said speed. It is a foregone conclusion, since the advent of, say for instance, nozzle-directed air-to-air missiles, that an accelerometer combined with a respectable computer processor, and in the event these are insufficient some marginal attempts at ailerons, hereafter discussed, can use "offset nozzles" to reduce all pitch/roll/yaw stabilization concerns to nil, producing a steady craft if there were a way to embed pressurized cartridges with nozzles on the four corners of the craft—so, serendipitously for us, the entire housing PA1 is a pressure cartridge. What is hereinafter proposed is that nozzles, each in communication with the chamber across a controlled valve, are located at the very front of the vehicle, on each front corner one pointed up one pointed down, and one pointed laterally outward, totaling six, so as to in reaction to an accelerometer and "desired course" models, pre-programmed yet modifiable, enable a computer processor to stabilize the vehicle. It is conceded that this procedure will be involved, but not beyond ordinary skill in the art, for if a missile can be made to hit another, nozzles can surely be set to maintain the sustained flight of an airfoil of considerable MOI about all axes, given thrust and lift requirements have been met.

The following provisions are envisioned:

a) a vertical take-off "VTO" nozzle placed on the nether extent of the vehicle, to provide downward exhaust impingement of the pre-expanded chamber air on a vertically inferior portion of road or air, selectively augmenting lift;

b) a vertical take-off "VTO" panel set in the rear of the vehicle, to complete or destroy air-foil cross-section in a longitudinal sense, augmenting lift in the airfoil sense while hiding, closing, and protecting, in the airfoil-destroying sense, the impeller. The VTO panel comprises minor panels, controllably actuated along a spectrum of opennesses, for deflection of thrust from the impeller downwardly.

The geometries of the power plant, electrical apparatus, motors, and vehicle shown in the figures, should not be seen as limiting, but as the best mode envisioned at the moment by the inventor in its simplest embodiment. No doubt considerable computer modeling will alter the final shape of each item depicted in the drawings, as will subsequent improvements, made either by the inventor or by the industry. The essence of the invention is in the novel combination of heretofore uncombined technologies and parts, as set forth in the claims appended hereto.

In the same vein, it is proposed here with profound emphasis that the roadable aircraft is a secondary consideration of the instant application, the claimed subject matter dealing primarily with the hybrid motor and the industrial applicability of said, and the inventor reserves the right to follow with, a propos of discernible industry demand, continuation, divisional, and continuation-in-part applications concerning the inner workings of the system of the power plant or its workability, the mechanical and/or electrical interrelationships of the terrestrial applicability of the machinery, or the aerodynamics of the vehicle as so far conceived, as befits his interest, none of the matter not within the scope of the claims hindering or compounding the U.S.C. sections 101, 112, 102, and 103 requisites beyond any reasonable objection by the PTO, insofar as the gist of the claimed subject matter has here, or in subsequent paragraphs, been delineated ad nauseum. Whether the TF in effect pertains to one high-user or another and to one low-user or another (high and low corresponding to the two stages of the invention, the first low-power, hybrid output, and the second high-power, non-hybrid or quasi-hybrid output, respectively), the scope of the instant application should not be seen as limiting save insofar as the appended claims delegate.

Since flywheels require high peripheral weight, since generators require. magnets and coils, and since turbine engines require high peripheral speeds, the invention kills all three birds with one stone. Another system using weighted element(s) for the flywheel, separate magnets for the generator, and some non-negligible mass for the rotor blades, is necessarily more massive and voluminous than the instant invention.

The field of endeavor of the instant application is vast, and the examples used to depict advantageous manifestations of the inventive concept should by no means be limiting. For instance, the low-power/high-power combinability applies to, mentioning only a few: earth-movers and other dump trucks, tow trucks, tugboats, tankers, fifth-wheel-hitch-enabled cabs (tractor-trailers), etc., wherein the electrical energy and shaft torque would be directed to a single consumer or set of consumers, through gearing or appropriate circuitry delivered along a single shaft or multiple shafts. For instance, the drive shaft of an idyllic tugboat or tow vehicle would be favorably received by the industry in conjuring 7-10X horsepower from an engine that can run at maximum efficiency at 1-2X, X being a coefficient. Equivalently for unladen earth-movers and tractor trailers or for tow vehicles for earth-movers or tractor trailers. Also propitious seems some form of "universal tool", wherein the vehicle would be a portable PTO (power take-off) shaft connectable to a fleet of unpowered implements. Not among the least likeliest embodiments is the arrangement of the power-plant and chamber proffered as a possible solution to fixed-wing VTO pursuits. It is not foreseen that the invention will be immediately advantageous in typical applications such as terrestrial passenger vehicles, trains, etc. The advantages will, possibly, only make up for the increased material costs by providing, on demand, a non-hybrid mode of high power output capabilities.

One end of the main shaft of the TF is selectively engaged to a high consumer, such as the propeller/fan of an aircraft, a work implement, hydraulic pump, etc. In fact, with proper arrangement and in conjunction with proper body geometries, described in this document, the hybrid system can be utilized in a roadable aircraft. However, it is also foreseen that, with time and given a great deal of perfection, not to mention mass-production, the unit could be viewed as applicable to environs not requiring the high power mode, such as in metro-buses.

On a side note, before proceeding, it is also foreseen that the vehicle embodiments, when parked, could serve as a source of electrical energy. While parked, the reversible pump/motor PM1 can periodically or continuously expand air from inside the pressure accumulator, driving the TF. The DC bus would connect to an electrical socket, accessible from outside the vehicle, and provide a steady stream of electricity from the TF and reversible pump/motor, the TF charging the PA1 during lengthy usages.

Further foreseen is a battery that could be inserted somewhere within the body of the vehicle, or within the cabin, and connected electrically to the DC bus. In the event that the device were to be made to operate as a submersible, the battery would power the fan to act as a propeller, while the offset nozzles, described later, would direct and stabilize the device by discharging air that had been ingested into the pressure accumulator right before a dive. As the pressure accumulator is hermetically sealed, and the cabin will likely be sealed and provided with a life-support system anyway, this could be an attractive luxury in the pleasure machine or defense sectors, offering a truly all purpose vehicle. A car that could drive across/under a river and jump over a wall has a certain appeal, as does an airplane that can land on water and then take its occupants sightseeing at a coral reef. To create all of these capabilities in one machine would be exorbitantly costly, albeit worldly, however it is realistic to imagine packages of features, the most basic being a small car that can perform a typical helicopter route, or a simple hovercraft.

In a further embodiment, particularly in the embodiments of aircraft pursuits, it is the design of the inventor to implement a fuel-feed and gas-feed strategy where less than all of the combustors experience combustion. The rating of every known aircraft engine must be sufficient to run a full lift-off sequence by itself (excepting 3- and 4-engine aircraft, not within the scope of the primary embodiments of the present invention, and especially since an alternative flow scheme has already been provided for multi-TF'd wing-possessing embodiments). This leaves a considerable amount of wasted flow and combustion that is not needed for cruising and especially for descent and approach. In an effort to mitigate this waste, a flow scheme is proposed wherein at least one of the combustion chambers, or its vicinity, is supplied with means, as needed, to preclude surge in the turbine set so that one or two or three or half or most of the combustion chambers experience combustion, while the remaining combustion chambers do not experience combustion.

In an idyllic scenario, for instance during approach, only one or two combustion chambers would experience combustion while the remaining combustion chambers recirculate exhaust or other pressurized gas through the turbine. An inlet should be provided at at least some of the combustion chambers to allow gas to enter them, preferably exhaust gas from within the pressure accumulator PA1. To complement this, a small pump would likely be provided at each designated combustion chamber, or a medium-sized pump could feed them (those designated) through a valve scheme, to supply the combustion chambers not experiencing combustion with gases higher in pressure than a threshold defined by the outlet pressure of the first turbine stage added to the pressure exerted by the centrifugal force of air inside the first turbine stage. Said pump could be driven electrically from the bus or could be magnetically or mechanically driven from the TF.

In this embodiment, one or two or three or several of the sectors would experience a high drive from the combusted sectors, and the remaining sectors would spin without positive drive, meanwhile being charged adequately to flow gases in the same direction as the combusted gases, and insofar as they mingle, the mingling would be for forcing the downstream turbines positively regardless of status. In the latter vein, however, it is foreseen that if the volutes and ducts throughout the turbine set (all turbine stages) are fully partitioned (by stators/diffusers) and continuous at every inter-stage boundary, the combusted air could drive only one or two or several sectors (a sector corresponds to the proportion of a turbine stage that contains the sector-full of gas corresponding to the sector defined by the active combustion chambers) positively while a non-positively-charged sector or sectors delivered air simply from normally charged combustion chambers not experiencing combustion, without surge. The sector would shift, but only relatively, from one stage to another, and the result, if surge is precluded, would still, as in the recirculation attempt, put energy into the system from fuel delivered, at an increased torque over idle, while other flows offer only negligible losses.

This would allow a descent or approach, or even cruise, at less than a typically required GTE minimum consumption. Incentives to do this increase as it will be apparent that towards the end of a flight, the fuel tanks are less than half-full. It is quite possible that the engine could cut down to less than half-power. This does not necessarily mean that it can run on half the amount of fuel, but it is possible this could be realized in the future. The further-downstream pump-motor (PM1) will always turn any extra gases around for energy, even if the energy is just enough to operate the pumps. This, in any of the stated flight concerns, should reduce the fuel consumption so much that the total-flight consumption forecast could be reduced to less than the optimal 4-seater aircraft that in itself is already competitive with highway travel in an SUV, since the travel route will is substantially linear contrasted to the wasteful route along roads.

A new embodiment for the TF is also proposed in this application. It again is a two-compressor stage gas turbine engine with two turbine stages, much in line with the original TF. It is mentioned in passing that the number of compressors and turbines is not of issue here, as more stages of both or either could be added anywhere, not detracting from the scope of the claims. However, this embodiment is meant to take advantage of the prevalence of turbochargers, especially insofar as they are common and inexpensive compared with gas turbine engines. The turbine surrounds the shaft, the compressor surrounds the turbine, and the magnets surround the compressor, all of these being coaxial. Two TF modules are still usually necessary, but not always, to offset Coriolis effects by spinning in opposite directions, and also to provide the virtual clutching effect for connecting the primary TF module with a shaft.

Because the system preferably utilizes mixed-flow and/or centrifugal compressors and mixed-flow and/or centrifugal turbines, the system shares many parts with a turbocharger, the difference being that instead of the outlet going to an internal combustion engine, and the turbine dealing with the exhaust of an internal combustion chamber, the compressor charges a combustor and the combustor drives the turbine. There is no longer any reason to try to embed the magnets in the compressor vanes, as there is adequate room for them on the shroud of the compressor. The result is that each TF module is a disc with a small shaft or stub on each side for retention by bearings and thrust bearings.

This reduces the material and mass for the shafts by at least half. A stationary volute or scroll or duct carries gases between the modules. The biased-open seals must, it is mentioned here as an afterthought, reside on the stationary parts, that is, they are permanently attached to the ducts, scrolls, volutes, intakes, combustors, etc., and only touch the rotating parts when they are pressurized. It is hoped that this embodiment will reduce the cost of the TF to less than half the embodiment from the parent application. The two TF's are, however, interchangeable. It is likely the original TF (from the parent application and included herein for continuity) could become desired in high-performance applications.

On a side note, it is possible that the TF could actually be embodied as a turbocharger for another engine, with our without a direct output. In other words, it would be a turbocharger for an internal combustion engine (an internal combustion engine would replace the combustor and would perform other functions) and could still provide energy storage and electrical drive. It would also be possible to have three TF modules/discs or four or more, as well as to provide an extra compressor either external to the TF or added onto one of the modules, such as on the back (thrust) side of the turbine of the second TF module (second turbine stage). This is known in the art, and would require an extra duct. It would also be feasible to insert yet another compressor outward of the first compressor stage, as part of the second TF module (or the first TF module), or axially upstream of it, with a scroll looped around to the intake of the first compressor stage.

It is stressed here that the new embodiment for the TF, whose moving parts consist of nothing but two disks, is starting to resemble an affordable, realistic device, for testing and a first-run product, as well as for modeling. It would be smaller and lighter than the original TF, and while giving up some compression stages, and the fuel savings associated therewith, would allow more attention (and weight and expense) to be given to the reversible pump/motor PM1, which might now be expanded to have three, five, or even ten turbine or expansion stages. These could be of inferior material and not made to very demanding specifications, to further reduce cost. A lighter TF with extra expansion stages in the pump/motor will significantly increase fuel economy. The new TF will also be considerably smaller than the original. In fact, it could be made very small for use in very small applications, with or without a directly driven shaft.

The inventor is even starting to believe that the TF is exhibiting promise of being competitive as a hybrid electric vehicle or automobile (HEV). In this embodiment, the pressure accumulator PA1 would be a canister or bladder, not the body of the vehicle, and would occupy the space currently taken by batteries or the engine of other HEV's, as well as dead space. It is known in the art to use the interior of structural beams and girders (i.e. in the undercarriage and auto body) of large trucks as pressure accumulators, so this could be utilized as well. The pressure accumulator PA1 could also be placed under the trailer in a tractor trailer, where there are now appearing plastic panels that reduce aerodynamic drag on the trailer and trailer wheels. For large vehicles, though, even a large pressure accumulator could be accommodated just about anywhere. Still, it would be desirable to have the fuel tanks and/or the pump/motor PM1 and/or the TF inside the pressure accumulator, but this is not necessary, of course. Also, it would be beneficial in some applications to have multiple pressure accumulators, connected to each other by ducts, or separately usable by a valve system via separate ducts.

The evacuation pump (that for evacuating the TF for flywheeling) could have a reversing assemblage for in one position pumping gases out of the combustion chambers, and in another position pumping gases into (the chosen of) the combustion chambers. This would reduce the number of pumps, however it would bring in other considerations such as the fluid dynamics in the passageway between the combustion chambers and the pump(s). Also, these pumps would be much more powerful than would be required of the evacuation pump. So, in the embodiments put forth in this application, the pumps will be discussed as distinct. So, although this is not gone into in further detail in this application, it is disclosed in this paragraph that during a non-takeoff phase of an aircraft's flight, fuel delivery to at least one combustion chamber, in a system where the combustion chambers are several and disjunct, is interrupted for fuel economy, and means (pumps, stators, diffusers) are provided to keep the gases coming from the active combustion chambers entrained in the active sectors (corresponding to the active combustion chambers) of each turbine stage, precluding surge.

While on the subject of fuel consumption, the inventor emphasizes that the lean-limit (lambda value) on fuel/air mix will likely be very low, if all of the heat exchange means are utilized as put forth in this application. For instance, the plate-type heat exchanger wherein the intake air is passed along the exhaust will considerably raise the temperature of the intake air. Then, the arrangement of the turbines concentric with the compressors (i.e. mixed-flow type) will have a heat exchange surface between them, and also it is possible to have the blades formed such that the hub-side edge of the compressor blade is unitary with the shroud-side edge of the turbine blade.

Then, there is also the recuperator shown in FIG. 2. These latter features will probably not increase the temperature as much as the plate-type heat exchanger, but the combination of these features with the plate type heat exchanger offer continuous if not infinite advantages, not only reducing the temperature of the gases entering the pressure accumulator, but together they will raise the temperature at the combustor inlet to levels not heretofore encountered in the flight turbine arts. In addition, since the fuel tank(s) will be surrounded by exhaust gas, the fuel will be very hot as well. The result is that after take-off, in an attempt to increase fuel economy, the lean-limit for combustion in the combustion chambers will be much lower than in a typical gas turbine engine, and the fuel-air mix can be lowered in at least one combustion chamber, during low-power phases of operation. It is not unforeseen that this embodiment could be used in conjunction with the combustion-chamber-disabling embodiment put forth in the previous paragraphs. For instance, one combustion chamber could be fed with a moderate fuel-air mix, the combustion chamber opposite to it could be deactivated and fed with recirculation air, and the other combustion chambers could be fed with a lean-limit-encroaching fuel-air mix. Between this last sentence (one combustion chamber fully or moderately active, others less-than active) and the scenario wherein all combustion chambers burn near the lean-limit or all combustion chambers burn near a typical flight air-to-fuel ratio, all conceivable schemes are obvious, as an extrapolation of this paragraph.

Following some research done by the inventor, the last compressor stage and the first turbine stage have been replaced (from the parent application) with mixed-flow devices in FIG. 2A. This simplifies the device, and actually increases the expansion and compression ratios compared with the radial compressor and radial turbine of the parent application. In fact, the complexity appears to be nearly halved, so the manufacturability and cost should be halved as well. In addition, no new-to-the-art devices will now be required to implement these stages now. As for the mixed-flow compressors and turbines, it seems they could easily be cast by a lost-wax casting method, using removable or melt-away cores for the gas passages. Also feasible would be 3-D printing or a similar method. It is doubtful that it would be advantageous to construct shrouds, hubs, blades, etc, especially since the device will be very small. Further removable or melt-away cores or mold-ingresses should be used throughout the assembly to leave voids in the metal (or plastic) to reduce its weight.

It has become evident that by the time an effort at personal turbine use can be effected the only acceptable option for indefinite use can be a green one. In the effort to conjure up a practical green mode of operation the fuel came to mind, and in an effort to utilize the greenest fuel, the concept of non-carbon gas became essential, and in an effort to ascertain a renewable mode of acquisition of such, without being pernicious at least as compared with other fuel sources, the inventor discovered a mode of energy capture he feels is unique in its own right, and for its sharing with the primary embodiment almost all method steps (in fact it is believed that knowledge of the method of the primary embodiment led the inventor to be able to conceptualize the new subject matter) in their own right, albeit entailing some disparate subject matter, the invention is seen as complete only in such extension of such to the complementary embodiment included in this present application.

A disclosed renewable fuel would be a propos, for various, reasons, and the most advantageous fuel would seem to be liquid or compressed hydrogen. This is not to be seen as limiting to the first embodiment, for several known sources, renewable and otherwise, could power the TF of the present invention, and any and every fuel should be seen as applicable to the present invention, but the best fuel for any endeavor does not contain a non-hydrogen atom, and thus cannot produce byproducts, so it with some degree of humility the inventor imposes upon the patience of the office, and public, in continuing this string. What is desired is a powerful, efficient, and green fuel, so, fortunately, the following came to mind. Ironically, a flying vehicle probably will not be the best place for it.

A kite, airfoil, balloon, or dirigible is envisioned. A kite, airfoil, balloon, dirigible, bellows or such means has been extrapolated from the heretofore recited means, however it involves the creation, not usage, of energy, although the overall succession of stages is similar. Attached to a flotation (in air) device, within its vicinity that is, is a condenser that is disposed among passing air, preferably in, on, or by a low-pressure surface of the apparatus; said condenser drips, drops, or drains condensed water (from a cloud or water-dense stratum—or any stratum, in a simplest sense—of atmosphere) through a valve into a vertically disposed tube or channel. The vertically disposed tube is preferably a hollow cable, or harnessed to a vertically disposed element under tension. In any event, the hollow core or element of the cable (hereafter tube) stacks the water to produce a stand-pipe, or otherwise vertical array of water molecules, whose pressure at the bottom of the assembly is $p=\rho gh$, h being the height of the condenser (minus some negligible length to account for intervening apparatus). The kite (or other cable-raising device) maintains the cable taut, up to some critical altitude (say 2000-10,000 ft) and the static water pressure at the bottom of the tube will experience a pressure above or at a fraction of a critical pressure. Said critical pressure can be the amount possible to render significant mechanical energy from a turbine series or sufficient static pressure to electrolyze water into compressed (or liquid) hydrogen and oxygen, or both energy for turbine and pressure for hydrogen production. The hydrogen produced is sent back up the tube to fill an accumulator, balloon, or dirigible (or bladder on a kite) means to draw the cable (and thus means) to a height effective for water capture and pressure control concerns, and to sustain operation of the device. Oxygen ($O_2$) and Hydrogen ($H_2$) production are a substantial portion of the products of the system. Electrical energy, minus electrolysis energy, is also produced.

The hollow core of the cable (hereafter vertical passage) should drain into the interior volume of a static accumulator. The accumulator will be charged to a pressure commensurate with the pressure resulting from the height of the cable/tube, and will be charged by such pressure against an energy storage means, in the shown embodiment in the form of a metal spring.

The output of the accumulator connects to either or both of:

A turbine, which electrically communicates with the electrical bus/means to deliver, receive, or store energy;

A fuel-cell creation device, or other means that utilizes electricity to turn $H_2O$ at high pressure into $H_2$ and $O_2$.

In a most hopeful embodiment, the di-hydrogen gas stored in the hydrogen tank of the fuel-cell creation device will at times be bled into the vertical passage (the standing water pipe that stretches from the accumulator to the desired vapor accumulation altitude) and the H2 bubbles or suspended molecules by virtue of their being less dense than liquid water will travel the entire length of the vertical passage, through the water, and will be diverted by a valve to pressurize, with gaseous H2, an inflatable portion of the kite. This will allow it to be deployed at all desirable levels, as well as allow it to be strung very tightly (the cable holding down the kite, that is) with at-will buoyancy, if the inflatable portion be sufficiently voluminous.

Retrofit of Sky-Condenser for Existing Wind Turbines

Before continuing, it is important to emphasize that in a very advantageous embodiment, the condenser, hollowed tube, motor, etc. of this device could be a retrofit or supplement for existing or otherwise prior art wind turbine systems. For instance, in a typical system comprising turbine, hub, generator, tower/tether means, and base, could be modified to contain a condenser driven from the wind turbine directly or electrically, or by a power grid, and the tower/tether could be replaced or retrofitted with something functionally identical, but with a lumen. The rest of the modifications would be at the base or on the ground, either integral with a prefabricated base/anchor, or a module compatible with a pre-existing base/anchor.

Further Discussion of Sky Condenser

It is also possible to embody the system without a wind turbine. Such as, for example, the condenser could be driven electrically by the water turbine/wheel/motor at the base, or by an electrical grid, or both. The different embodiments will be chosen from one or another of the foregoing based on the location wherein it is used, and its condition. For instance, if a wind farm already exists, it could be retrofitted. If electricity is abundant but water and liquid propellant are scarce, the embodiment with no wind turbine could be preferred. The extent to which this extrapolation could be carried is nearly endless, and further embodiments cannot be dealt with at this time. However, they should be considerably obvious to anyone of ordinary skill in the art.

Aside from the buoyancy issue, the accumulator would be very advantageously located within the reel of the cable (vertical passage) to avoid redundant valves and containers. However, this is not the point of the current application. The cable must be controlled via some means, and the accumulator should be connected to the bottom of it or at a middling height of its coiled radius. Thus it is seemly that there be no additional structure. However, elements shown in the drawings should by all means be seen as separable, when conjoined or concurrent when tangential, etc. The continuance of the discussion is its own burden but the listing of parts can hopefully be foundational insofar as they do properly interact as shown and more theory and variation can be invoked by no more words than the figures. These have been provided and a succinct description is hoped to conclude the best-mode matter, albeit by no means restricting the obvious realm of the overall theory of the invention.

Although a linear axial turbine is shown in the drawings to render power from the high-pressure water in the reservoir, a-most advantageous embodiment would consist of a peristaltic motor or a hydraulic cylinder—specifically, a positive displacement motor for incompressible fluid. Because the power demand will be constant, and following the same theme of the outlet expander dam (PM1), and because water is for all intents and purposes incompressible, a peristaltic motor is the incompressible-fluid equivalent of a piston-cylinder in a gaseous fluid expander, which is possibly preferable to a turbine, for reasons not to be gone into, save those given already.

A peristaltic motor could represent a peristaltic pump, except the rotor would drive a generator as the water pushed the rollers. Of course this has probably never been done for such pressures as are contemplated here. However, it would be small and many times simpler than a linear axle turbine. And if it has been done for these pressures, then half the work has been done already.

In this embodiment of a peristaltic motor or motors, as there will possibly be two or more stages thereof, the accumulator shown need not be so large. In fact, it might be obviated. The area upstream (intake) of the peristaltic motor is still an accumulator, but it need not store much water. It is steady state, a.k.a. hydrostatic. Further, the output shaft of such a peristaltic motor(s) will drive a generator. The arms of the peristaltic motor should, in one embodiment, be as short as possible; in other terms, the radii of the respective rollers respective to their center of rotation should be as small as possible, but the driven generator should probably have a large-diameter rotor, to provide a higher torque-to-weight ratio.

The output shaft of the peristaltic motor could also, in this embodiment, reciprocally drive, via a belt or gearing, the pressure multiplier, obviating the second chamber, second piston, etc. In fact, the pressure multiplier could be a peristaltic pump geared directly via a 2:1, 3:1, 4:1, etc. transmission gear. But this might tie together the rate of hydrogen production and the rate of expansion of the pressurized water too much. Each system should be as robust as possible, and therefore modular. Electrical means are still preferred for the best mode as currently envisioned by the inventor.

However, in a ship/water-craft/vehicle wherein water pressure itself is the majority source of motive power and creation of liquid fuel only leads to requiring a system for utilizing it, the peristaltic motor or Francis wheel or water turbine could drive, directly, the propeller, obviating all in-pod, inboard, or outboard gearing/shafting/transmission and prime mover, as well as deliver, as a final expansion stage, a jetted (narrow exit) beam of thrust for propulsion or steering propulsion. In a way, the propeller drive of the conceived marine vessel could operate much like a dentist's drill. And from such a vantage point, the idea of a turbine comes back as a possible best mode for the direct-drive aspect as well. As in almost any environment, a centrifugal turbine might be best. But this discussion appears on the verge of digressing in this direction. It will instead digress in another.

It should be noted that, as the water vapor density of water decreases as a function of altitude, it may not be optimal to suspend the condenser too high, even though this would create increased pressures. Not only will the cable overly tension itself if made too lengthy, and not only will such enormous pressures be exerted on the inside of the tube that extreme measures might need to be taken to restrain them, but the amount of water available from the air will decrease at extreme altitudes. Therefore, there is a diminishing return as the altitude of the compressor is maximized, and it is likely that the altitude required to produce liquefied hydrogen without a compressor (the inventor's off-hand estimate for this is around 6,000 feet, plus perhaps another 500 feet to offset Stoke's law-related drag from the inner diameter of the tube on the water, which for large inner diameters will be negligible) will be too costly to reach.

To mitigate these diminishing returns, the inventor proposes a pressure multiplier, whereby pressure from the accumulator fills a first chamber and is acted upon by a piston, the piston having an extension comprising at least one additional piston, said at least one additional piston residing in a second chamber, said at least one additional piston being acted upon by other water from the accumulator, this taking place in a second chamber. Water in the first chamber and the second chamber resides on both sides (active and other) of both corresponding pistons, however the water on the active side will be directly connected to the accumulator (and thus at standpipe/base pressure), and the water on the other side of each piston will be purged from the chamber. The trick is that the water on the other side of the piston of the first chamber feeds the electrolysis chamber, while the water on the other side of the piston in the second chamber is connected to a drain at slightly above atmospheric pressure. Thus, the pressure on the active sides of both pistons will apply positively to the water on the other side of the first chamber. In other words, by discarding water from the second chamber, the water in the first chamber is multiplied by the ratio of the [effective area of the second piston plus the effective area of the first piston] to [the effective area of the first piston]; specifically, the pressure of the water entering the electrolysis means follows the equation:

$$P_{out}/P_{acc}=A2+A1/A1=A2/A1+1 \qquad \text{[Equation 2]}$$

Where P is pressure feeding the electrolysis means, $P_{acc}$ is the base pressure, or pressure of water in the accumulator, A2 is the effective area of the second piston, and A1 is the effective area of the first plunger or piston. As will be evident from the embodiment shown described later, the relationship between water discarded and pressure multiplication is linear (specifically, n: n+1) such that if the pressure is required to be doubled, one unit of water must be discarded for each unit pressurized. If the water is desired to be quadrupled, three units of water must be discarded for each unit pressurized.

It is believed by the inventor at the time that the pressure multiplier will reduce the overall cost of the system, as a 5,000 foot cable, being water impermeable to 5×psi and capable of suspending itself from the dirigible/kite/balloon/ etc, would probably cost ten times as much to construct and maintain as a 2,000 foot cable, being water impermeable to 2×psi, not to mention that extremely high systems would have less water vapor available. This even though the longitudinal-strength to radial-strength ratio should be variable along the length of the system, likely in increments/ stages, such that a bottom segment is mostly for water constraint (radial strength), an upper segment is mostly for suspension (tensile strength), and the intervening stages, being assembled at their ends one-to-another via pipe-coupling means and each having a wieldy length and weight, decrease and increase in the respective attributes as one moves upward or downward. However, a continuously variably strength cable, or an isotropic one, or continuous (one long) cable could also be used. It is conceived that in a very large, industrial application (such as island-based ship-refueling depots), it will be very worthwhile to have a large (2-40 cm) inner diameter for the tube, a very strong cable comprised of state-of-the-art materials, and a height targeted at:

a) the exact stratum of highest vapor density; or
    b) the exact height required to realize a base static pressure substantial enough to forego the water-wastage approach; or
    c) a balance/compromise between a and b.

It is hoped that a very large system could be capable of producing several gallons per minute of liquid hydrogen fuel, while a smaller system could provide a village, urban block, or homestead several gallons per hour, plus electrical energy, plus clean freshwater.

It is possible that the best place to utilize this system is on an island in a large ocean, or on a coastal desert, along a shipping route. If a ship were able to refuel four times along its route, the space taken up by the fuel would be reduced by 80%, as would its fuel weight. This not even considering that it would no longer be necessary to pipeline, or even haul, fuel to the ships/ports. And, as has been mentioned, the fuel is renewable and has zero carbon footprint. While this seems too good to be true, we must keep in mind that the start-up cost for such a device is perhaps initially only generously shy of prohibitive. But once manufactured and installed, it will produce fuel, electricity, and clean freshwater for its entire life, almost without recurred cost.

It is also feasible to have the base of the device installed in a ship itself, supplementing or obviating fuel storage. In this event, it might be desirable to have the series of turbines, or other outlet expander dam, be part of a hydrostatic drive for the propeller, obviating or halving the size of the prime mover. There are prior art devices which disclose wind-turbines tethered by a cable to a ship, and none of them seem to be in use. Although unlikely, it is possible that this invention circumvents the drawbacks that doomed these prior art devices. Or perhaps those devices were not doomed, but simply overlooked, such that this invention and they have still some benefit.

Although unproven, it is to be hoped that the present invention provides more total energy than a conventional wind turbine, particularly when combined with a conventional wind turbine, solely because water at a high vapor density stratum is already near its condensation point, evinced by the phenomenon know as a cloud. Solar energy has lifted each atom to very useful heights, and the condenser does hardly more than catalyze its fall back to earth, such as in the formation of a raindrop via a seed. If every raindrop were captured before it fell and stored at 6,500 feet, the result would be a most remarkable, yet believable, hydroelectric facility. Perhaps in light of this, the invention may seem less farfetched. The real question is, how much water can be extracted by a condenser, how quickly, and at what cost. As in the first embodiments of the instant application, the subject of the water extraction rate, the power production rate, and the manufacturing costs will be the subject of further research, and the outcomes (i.e. devices, geometries, computer code, etc.) of such research should be seen as mere extrapolations of the information now at the disposal of the public, unless they be truly surprising or ingenious in their own right, or, being possibly prior art devices, being unobvious for combination with this document, as the US Patent and Trademark deems or does not deem, in due course.

There also seems to be the possibility that, serendipitously or by their being symptoms of the same underlying laws of nature, although this is also not proven or even cared about, the time-average altitude of cloud formation resides near the height that would create adequate base pressure to render the hydrogen directly in a liquid state, or such that if it gasifies it immediately condenses for storage. If so, this would indicate a maximum gain from heavy-duty, high altitude (long cable) system. It should be obvious at this point that if a cloud were to pass directly around the device, energy and fuel production would increase dramatically. And even the air that is not in a cloud, being at the same altitude as the clouds during a cloudy day, is just a few degrees in temperature or pressure from condensing on its own. This aspect sets the stage for locating the device. Such as, in the event there are areas in the world where clouds constantly pass overhead at altitudes near the optimal altitudes discussed above, the output of the device could achieve very beneficial levels, for there is no reason not to put as many of these devices in such a location as possible. This is because the product (liquid hydrogen) is containable and shippable. And it is possible the surplus water could spawn new livable habitats for displaced communities or persons.

It is also possible that further means inside the condenser could be applied to augment the condensation, such as ionization of heat-exchanger fins/plates, seeding, or basically any device known from the prior art to increase the effectiveness of a condenser or rainmaking device. It is further envisioned that the device be maneuverable, via propellers, fans, fins, rudders, pods, flaps, or jets, to get itself out of harm's way or into more vapor. Also put forth is a ballasting system whereby hydrogen gas can push out air, or air push out hydrogen gas, within the balloon/dirigible/bellows/etc. to lower and raise the device, also to get it out of harm's way (lightning, turbulence, etc.) or into more vapor. This could be done in conjunction with reeling and unreeling the cable. And although it is a matter solved a century or more ago, some will fain object that the whole thing is a lightning rod filled with hydrogen. Electrostatic charging devices should be placed in appropriate locales around the system, to ward off lightning strike, and controlled by a controller whose inputs connect to sensors that show electrostatic charge, and can predict a lightning event.

It follows that the remainder of the water system will be represented by a usual municipal water delivery scheme. A water storage tower or any other water storage and pressurizing system commonly known will be obvious to one of ordinary skill in the art. The water exists at high pressure to be utilized optimally and at the discretion of the engineer. The electrical bus has inputs, such as the wind turbine, the liquid turbines, and any fuel combusted by the fuel cell or auxiliary means for power creation, and the outputs are the grid, the condenser, the electrode for electrolysis of the water, and reciprocal means including a flywheel and/or battery and/or other energy storage means, and/or other means. Most of these are known in the art.

Although only hydrogen is mentioned repeatedly throughout the document, the actual components stored from the process, compressed $O_2$ and $H_2$, are really a fuel cell and that seems to be okay, since those are popular at the moment. But now we're toting oxygen around too so it will be best to just use hydrogen in the flying embodiment, because there will be so much compressed oxygen around. Without further explanation, it will be foregone that a fuel cell is created. There is nothing of that art that the inventor can add to. And hydrogen only is spoken of but when necessary, the two can be sold together, or used together, as is known. However, in the event that the oxygen is not needed for fuel, it can be used for oxygen tanks for medical and diving, etc. There seems a hint, but no grounds to get too much into it, that the oxygen could, under the proper temperatures and pressures, be made to react with airborne $CO_2$, probably via a selective catalytic reaction. This would likely entail an additive, such as calcium, which would result in a carbonate compound, such as calcium carbonate, leading to the sequestration of the carbon dioxide molecule in a crystalline monolith or soot pile. Anyway, there is no shortage of uses for compressed oxygen.

BRIEF DESCRIPTION OF THE DRAWINGS

The foregoing discussion will be understood more readily from the following detailed description of the invention, when taken in conjunction with the accompanying drawings.

FIG. 6 is a cross-section taken along line 6-6 of FIG. 9, showing the effective cross-section of the majority of the vehicle of the first embodiment of the invention.

FIG. 7 is a cross-section taken along line 7-7 of FIG. 9, showing the cross-section at the center of the vehicle of the first embodiment of the invention.

FIG. 8 is a cross-section taken along line 8-8 of FIG. 9, showing the cross-section at the sides of the vehicle of the first embodiment of the invention.

FIG. 11 is a table providing the chronology of steps utilized in hybrid operation of the first embodiment.

FIG. 12 is a table providing the chronology of steps utilized in transitioning to high-consumer mode from hybrid mode, and also for transitioning back to hybrid mode, or a parked configuration, from the high-consumer mode.

FIG. 13 is a continuation of FIG. 12.

FIG. 14 is a view of a rotor vane of the axial compressor shown in FIG. 2.

FIG. 15 is a cross-section taken along line 15-15 of FIG. 14, showing the magnetic core of the rotor vane of the axial compressor.

FIG. 16 is a close-up of area A of FIG. 2 showing the bias seals of the turbine flywheel module. The bias seals for FIG. 2A are different, but follow the same gist.

FIG. 18 is a cross-section taken along line 18-18 of FIG. 19, showing the in-wing orientation of the parts in the second embodiment of the invention.

FIG. 19 is a side elevational view from above the wing of the aircraft of the second embodiment of the invention, showing the fan, wing, ailerons, and VTO flaps of the second embodiment of the invention.

FIG. 29 is a side cross-sectional view of the vertical takeoff flaps and the vertical takeoff panel, with the fan and thrust vector nozzles.

FIGS. 30-31 and 33-34 are embodiments of the vertical takeoff flaps and their embodiments for variable rigidity at different points along their extents.

FIGS. 32, 32A, and 32B are a view of the outer skin or shell of the pressure accumulator or vehicle, with provisions for pressure containment and simultaneously formed panels for an ergonomic or aesthetically designed vehicle.

FIG. 37 is a view of the pressurized water system of FIG. 36, but focusing on the upper part of the apparatus and expanding the width to show the fan, fan drive, wind turbine, refrigeration cycle, condenser, and a generalized outline of the dirigible or kite.

FIG. 38 is a cross section taken along reference numeral 638 of FIG. 37, with its center comprising a mechanical embodiment of a condenser.

FIG. 39 is a cross section taken along reference numeral 637 of FIG. 37, with its center the outlet of the condensation stages, where the air from the condensation stages rejoins atmospheric air.

FIG. 40 is a concept diagram, emphasizing alternative embodiments of the various portions of the pressurized water and electricity or liquid fuel or compressed fuel production.

DETAILED DESCRIPTION OF THE PREFERRED EMBODIMENTS

Figure 1:
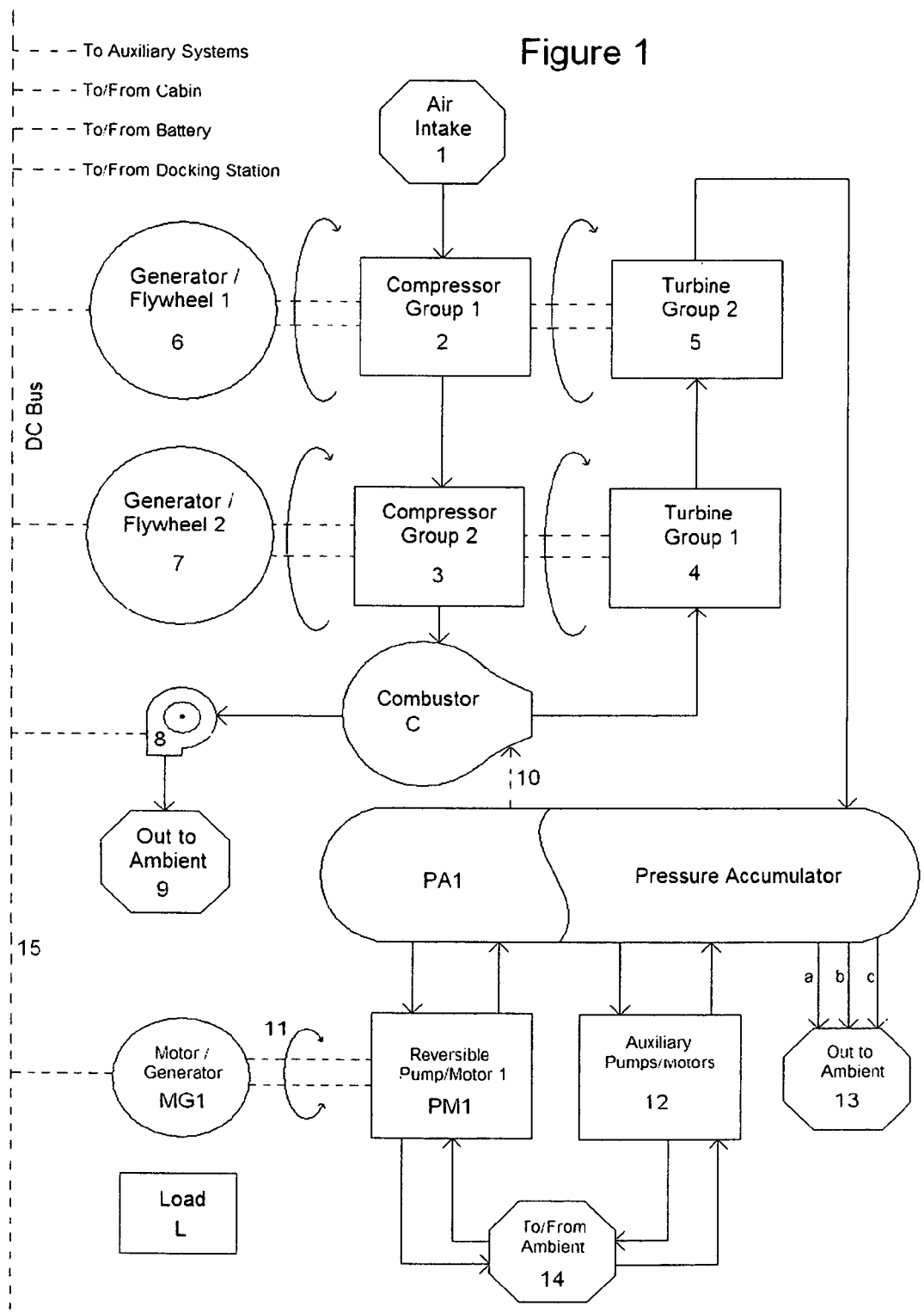
FIG. 1 is a flow diagram for the flow of gases through the various modules used to implement the first embodiment of the present invention.
Figure 2:
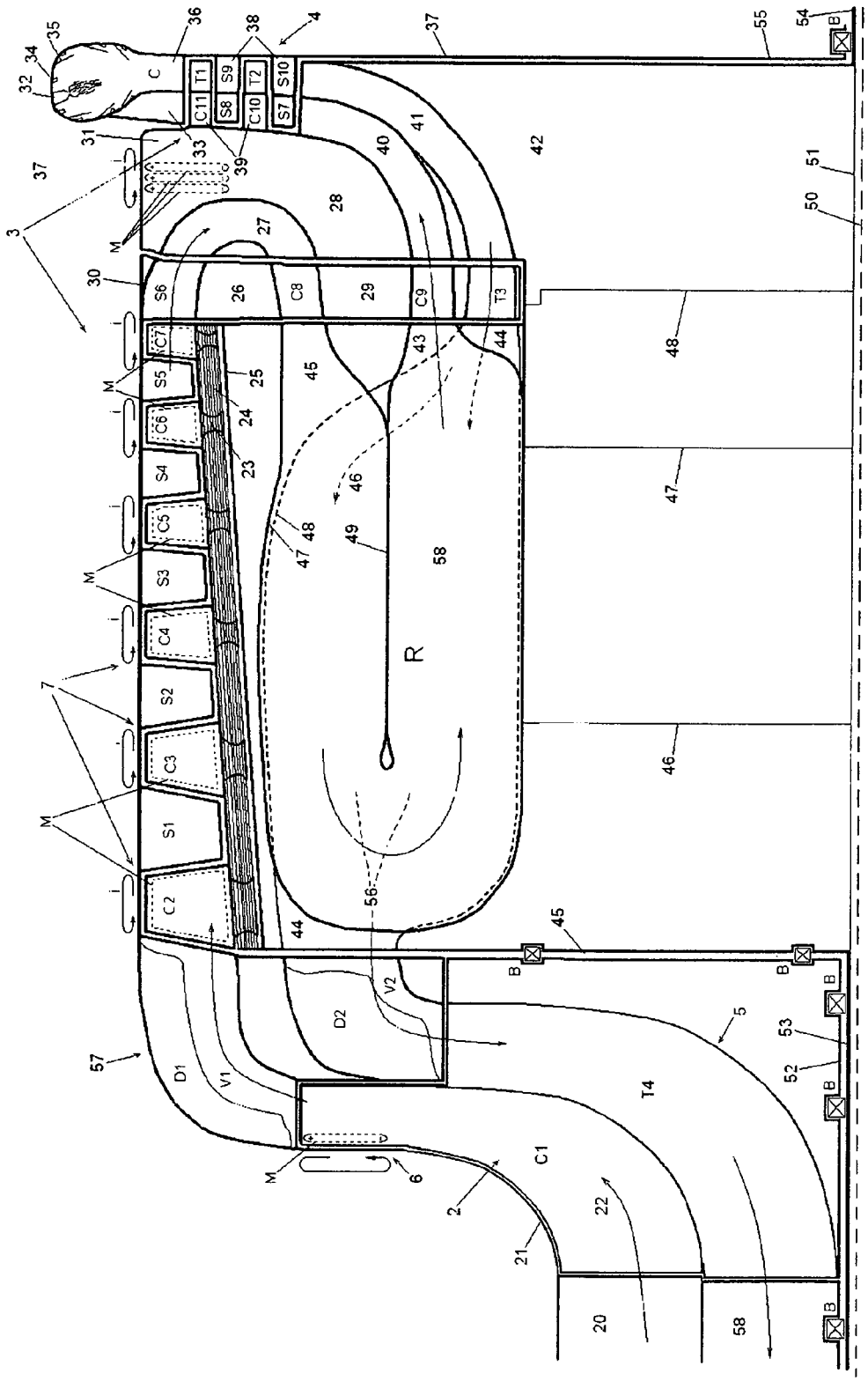
FIG. 2 is a semi-cross-section (cross section of one sector) of the turbine flywheel TF showing the compressor, turbine, stator, generator, and combustion modules.

The following description of FIG. 1 is meant to be understood in conjunction with FIG. 2. The flow chart of FIG. 1 shows the flow of gases through the entire system. Air enters the system from air intake 1 and passes, via a shutter valve (described later) after traversing a heat exchanger (described later) to the first compressor group 2. The air is compressed by first compressor group 2, which is driven by the second turbine group 5 and is integral with the first compressor group 2 and the first generator/flywheel 6. The air passes from the first compressor group 2 to the second compressor group 3, which is driven by the first turbine group 1 and is integral with the second compressor group 3 and the second generator/flywheel 7. In the embodiments of the present application, 2, 5, and 6 are concentrically arranged about a longitudinal axis 50, and 4, 3, and 7 are also concentrically arranged about said longitudinal axis 50. After the second compressor group 3, the compressed air enters a combustor C, which for this discussion can be seen as a typical combustor can but which will later in the application be discussed further a propos of its geometry when applied to the TF. The exhaust from the combustor passes to the first turbine group 4 and then, after traversing a recuperator R (FIG. 2), to the second turbine group 5. The exhaust passing from the second turbine group enters, via a shutter valve (described later), a pressure accumulator PA1.

The pressure accumulator PA1 can be large and in the embodiments of the present application it surrounds the greater part of the TF casing and is confined by the outer walls 1058 (FIG. 32) of a vehicle. The pressure accumulator PA1 communicates with the ambient air outside of the vehicle via a reversible pump/motor PM1 and possibly other pump/motors 12, which when driven by air expanding therethrough are motors, usually driving a motor/generator (in the case of PM1, it drives MG1), and when taking air into the pressure accumulator PA1 to charge it to higher pressures, are driven by the motor/generator and act as pumps. Further escape valves, or outputs a, b, and c of FIG. 1 or outputs A, B, and C of valve 205 (FIG. 7) allow gases within the pressure accumulator to pass directly to the environment, as shown by passageways a, b, and c leading from the pressure accumulator PA1 to outside 13. Shaft 11 depicts the rotational interlock between the reversible pump/motor PM1 and the motor/generator. Motor/generator MG1 is electrically connected to a DC bus 15, which communicates with first and second generator/flywheels 6 and 7 and simultaneously, inherently, first compressor group 2 and second turbine group 5, and second compressor group 3 and first turbine group 4, respectively. The DC bus is further connected to the load L, which could regular electrically driven wheels or could as well be in-wheel electric motors, regardless, the wheels having regenerative breaking reversing the electrical flow back to the bus from the load. The DC bus is also connected to auxiliary systems, the cabin, and possibly (in embodiments not of interest in the present application) a battery and/or docking station. An evacuation pump 8 is connected to the combustor C, preferably near the air inlets or near the burner nozzle, possibly in conjunction with the latter, and when activated causes a negative pressure which removes any air in the combustor. This will be described later.

The air from the evacuation pump also passes out to ambient 9. Reference numeral 10 indicates a further provision, not dealt with in the present application, whereby instead of expanding the gases through PM1, or in addition thereto, the gases in the accumulator are passed through the first and second turbine groups 4, 5, again, without combustion, or parallel to a combustion stage whereby sectors allow parallel flows of compressed exhaust and burning combustion products to ambient or to the pressure accumulator PA1 This provision is not at this time seen as fruitful, but has been included for the sake of full disclosure. This latter implementation might be feasible for sustained acceleration or high-speed drive after depletion of the stored energy, described later, in a necessary break from hybrid drive when there is insufficient stored energy for a desired output.

Turning now fully to FIG. 2, although reference may be made to FIG. 1 throughout the disclosure, the air entering the inlet 20 is shown as airstream 22. After the inlet 20 it enters a centrifugal compressor C1, which in this embodiment makes up the entirety of the first compressor group 2. The air passes outwardly along compressor C1, being thereby pressurized and flung into volute V1, where it may be guided by diffuser D1 and/or stator vanes, swirl vanes, anti-swirl vanes, etc. into the first stage (C2 and S1) of the second compressor group 7. The compressor C1 is attached to, and locked for rotation with the second turbine group 5, namely the fourth turbine stage T4 which is a centrifugal turbine. The compressor itself is, and in this case the vanes between the air passages are, embedded with magnetic elements M near the casing 21 and preferably as far to the radially outer extreme of the compressor as possible. The magnetic elements interact with conductive coils i in or on the casing to create or absorb electrical current. The magnetic elements M plus the conductive coils i make up the first flywheel/generator 6, in that the mass of the magnets plus the combined masses of the compressor and turbine carry a rotational inertia about 50 which resists the voltage acting against its continued rotation during electrical current creation. Further, when an EMF is applied across i, the magnetic elements M are accelerated in a rotational direction depending upon the direction of the current.

As stated, the air passes from the first volute V1 and into the first compressor stage C2 including first stator S1. C2-C7 are axial-compressor rotor vanes and each has a root 23 that sits in and is anchored by, in a preferred embodiment, layers of fiber-reinforced plastic or carbon-fiber-epoxy sheets that have been spun around the rotor wall 25, with the roots temporarily attached, and cured, permanently and durably fastening the compressor vanes C2-C7 to the rotor wall. The strength of this bond is important as the system will rotate at extremely high velocities. The stator vanes S1-S5 are traditional stator vanes and are interspersed with the compressor vanes C2-C7, respectively. In this particular embodiment, which is now considered a concept embodiment, being more expensive than that shown in FIG. 2A, each compressor vane C2-C7 is embedded with a magnetic element M which interacts with conductive coils i in the same way as described in the preceding paragraph. The magnetic elements M, the fiber/resin layers 24, and the bodies of the compressor vanes C2-C7 make up the greater part of the mass of the rotor of the second compressor group, and thus form a flywheel as do corresponding elements of the first compressor group 2, and by much of those items being magnetic, also form a generator. It is here noted that 30 indicates an annular disk with solid, structural elements 26 and 29, and passageways S6, C8 , C9, and T3. The gases exiting the last turbine stage pass through stator S6 and then to a passage, also vaned, to turn and pass through a stator C8, which is here labeled as a compressor stage C8 because the air, being entrained within the body of rotor 28, 25, 42, 45 etc. at this point, will see the stator C8 as a compressive stage C8, and will be further compressed such that when it passes to rotating passage 45, it seems stationary in the relative frame of the rotor as if it had just passed through a single compressor stage. Now arrived at passage 45, said air passes leftward, as seen in FIGS. 2, and 45 becomes a manifold whereby an annular passageway 45 is divided into dozens of sector-shaped passages 47 interspersed with sector-shaped passages 48 which carry exhaust that is downstream of the combustor. This is the recuperator R, whereby the thin walls separating 47 and 48 (the dotted lines for 48 indicate that the cross-section used for FIG. 2 is in the plane of the compressor side sectors 47, which are shown with solid lines) pass heat from the combustor-downstream sectors 48 to the air in the air currently under discussion, raising its temperature and thus, performing work on it and taking work from the turbine side.

The air enters another manifold where it merges back into an annular passageway and enters another stator C9, which for the same reasons given for C8 is treated as a compressor stage. The edges of the entry and exit vanes of 45 and 53 should be bent to an angle to complement such a relationship with the stator vanes C8 and C9, as should the edges of passageways 40, 41, and 44. The air now enters a passageway 40 where it is again flung outwardly (this could be seen as a compressive stage but the air therein is only regaining the energy it lost by being pushed toward the axis 50 in 27 and R to begin with, so this will not be discussed). The air enters a stator S 7 where it is deflected to a proper exit angle to act on C10, which with C11 make up the final two compressor stages 39, separated by another stator S8. By the time the air enters the combustor C through passage 33, it will have been acted upon by approximately 11 compressor stages, one of which is a large centrifugal compressor, such that with the recuperator R the enthalpic rise should be the equivalent of at least a 14-stage axial compressor. It is mentioned in passing that the recuperator and change-of-direction passageways can be done without and the air could simply pass from S6 to 33. The more complicated embodiment has been included for patent purposes for it inherently comprises all the elements of the simpler ones. 31 depicts the outer edge of rotor segment 42. The rotor has been divided up into segments 2, 48, 47, and 46 to show that during manufacture it can be stacked and that it would not be required to perform the impossible, which would be to have the rotor formed whole. In the event that the turning passages 30 and the recuperator R were removed from the concept, these considerations would be less profound. It is also envisioned that annular segment 30 could extend all the way to axis 50 and 42 would be a third compressor/turbine/generator/flywheel rotating independently of 2/5/6 and 3/4/7, but in this case it is uncertain at this time what turbine would drive compressor stages C2-C7.

Continuing with the discussion of the rotor depicted by reference numerals 42, 28, and 31, more magnetic elements are spaced around the periphery near 31 and interact with conductive coils i, as previously described. 28 and 42 are not actually solid, but insofar as the air is concerned, they are. The air enters the combustor at 33 where it passes into the combustion chamber through nozzles 34 and it is ignited by a fuel mix coming from fuel burner nozzle 32. 35 are flame propagation nozzles that contribute to forming the flame and preventing the flame from passing upstream. This is known in the art. The exhaust of the combustor passes through 36 to impinge on first turbine stage T1 which in this embodiment is of a piece with C11, as is S9 with S8, T2 with C10, and S10 with S7. This arrangement is hoped to save space and allow the radial compressor stages and turbine stages to coexist and be advantageously located radially inwardly of the combustor and at the end of the machine. Wall 37, with 21, completes the outer casing of the device. Compressor 3 and turbine 4 should be narrower or smaller than compressor 2 and turbine 5.

Figure 2A:
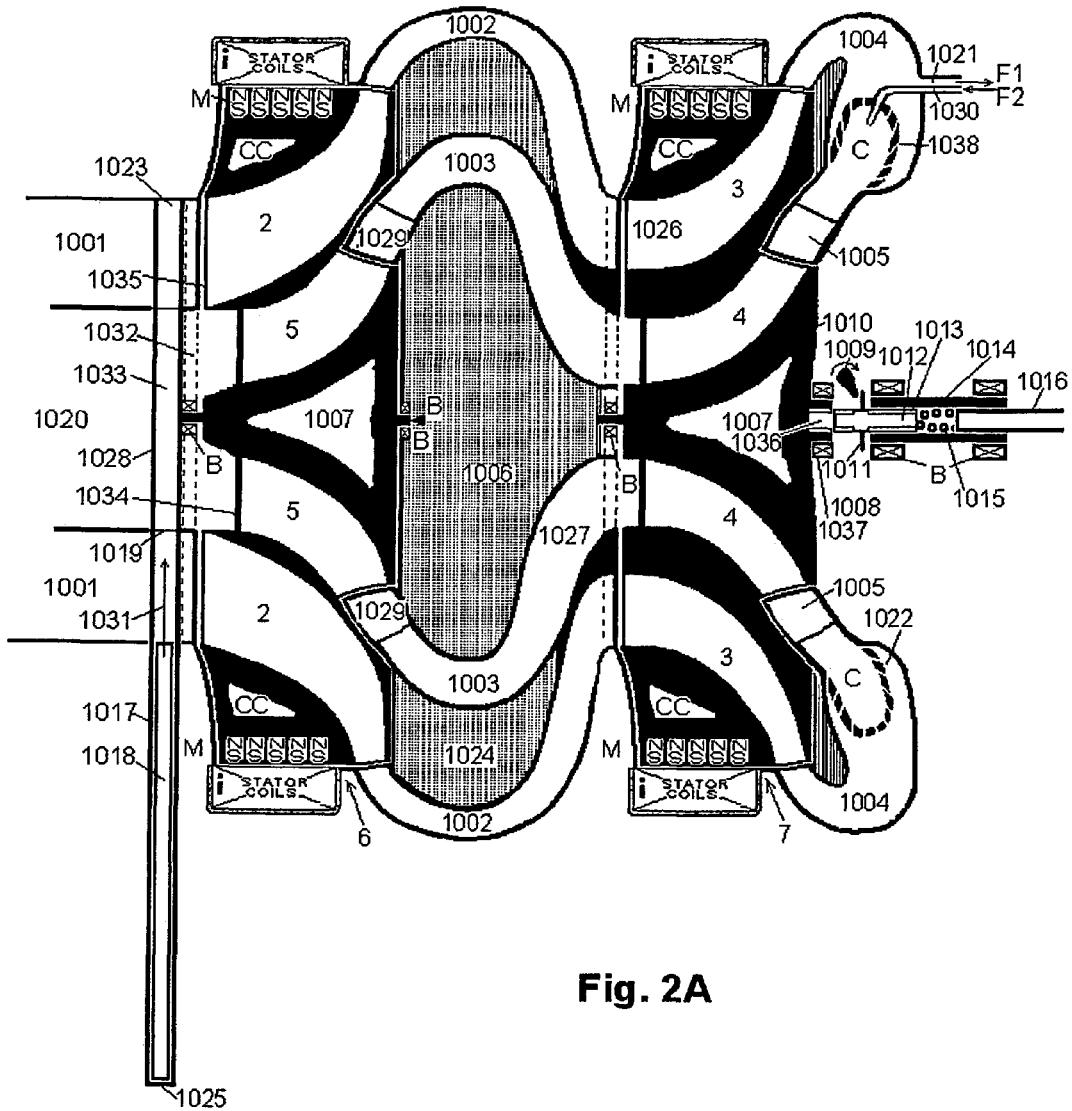
FIG. 2A is a cross-sectional view of a simplified gas turbine engine as per the simplest embodiment put forth herein, moreover a dual turbo-charger embodiment or dual mixed-flow embodiment.

The stators 38 of the first two turbine stages could easily be made to swivel via a simple ring gear to be variable stator vanes, allowing it to change the flow characteristics through the first turbine group 4 to adjust for different altitudes and rates of combustion. The air passes from first turbine group 4 to another passageway 41 which delivers it to another stator T3 which for the same reasons as C8 and C9, is being treated as a turbine stage. Although counterintuitive and hard to understand, the laws of gas turbine engine theory can be used to prove that energy is recovered from the exhaust stream here (as it is provided by C8 and C9), and although it is not the intention of the present application to define this, the inventor sees this as far simpler than describing how it is actually 27, 45, 40, 41, etc. that are absorbing and performing the work. The virtual enthalpic ratio across T3 can be seen as approximately 1.4:1, and the same goes for C8 and C9. From T3 the exhaust enters another manifold 44 which splices with manifold 43 to create the sectored recuperator R described above. Element 49 exists in the compression side 58 of sectors 47 and is used to guide the flow from 45 to 43, bringing it out in an opposite axial direction from how it entered. However, no such element is used in the turbine side sectors 47 because the air from T3 moves more or less axially to arrive at another manifold, also indicated as 44, to be fed into the second volute, V2. It is noted at this time that V1 and V2, as well as any space or substance between them, are part of an annular body 57 that is fixed to the casing 21 and extends radially inwardly therefrom. V1 and V2 would actually be best embodied by annular passages feeding nozzle rings, known in the art, but this was not completely apparent at the time the figure was drawn and disclosed. The proper configuration is shown in FIG. 2A. Their discussion will nonetheless continue.

Like V1, volute V2 can also have a diffuser D2 or some type of swirling or anti-swirling vanes, and is integrally vaned to evince some type of indescribable, despite conceived efforts, stator vane which serves as a volute for the fourth and final turbine stage, T4, which is the sole representative, in the preferred embodiment, of the second turbine group 5. T4 and C1 are locked for rotation with each other and sit on a spindle 52, which nests around shaft 53 which is integral with the rotor 42, 46, etc. at 51. Spindle is separated from the main rotor 42, 53, etc. by bearings B to define a space 45. It is unknown at this time what type of bearings would be most cost-effective, but of course the idyllic embodiment would be levitational-bearings (alternating magnetic fields facing each other creating constant repulsion). 54 defines the output shaft and is integral, in the preferred embodiment, with 42, 53, etc. The overall machine is quite small, so it is not unforeseen that 54 could be cast or forged with 42. The air exiting T4 passes to outlet 58.

In operation, 5 drives 2 and 6, and 4 drives 7 and 3. Any force on 5 will be communicated to 2 and 6, any force on 2 will be communicated to 5 and 6, etc. Any force on 4 will be communicated to 7 and 3, etc. This is why 5, 2, and 6 are shown in FIG. 1 to be on a virtual shaft, although there is no shaft, they are integral. The same goes for 4, 7, and 3. This is why the device is called an integral gas turbine, flywheel, and generator.

It is noted that the geometry of the first compressor stage C1 or first compressor group 2 and turbine stage 4 or second turbine group 5 are shown being neatly nested one within the other. However, it is expected that the ideal geometries for the stages will require each to have its own hub-shroud relationship and blade cross-section characteristics, such that there might be some dead space or mass between them. The drawback would lightly be only on the order of a few hundred cubic centimeters, while the benefits of properly designed compressors and turbines of this type are every day pushing a new ideal. As can be inferred from the drawing, albeit primitive, although the following should not be seen as limiting, the most desirable type of compressor and turbine, and that chosen for this embodiment, is a mixed-flow compressor and a mixed-flow turbine, possibly for both stages. It is becoming increasingly feasible in the industry to achieve expansion/compression ratios of 4:1, particularly in the turbocharger arts.

By the way, T2 and T4 are indeed a turbocharger. But for all intents and purposes they are serving more in the facility of a turbo-compounder and/or the shafted first-compressor-group to last-turbine-group coupling of turbojet and turbofan engines. Again, mixed flow is desirable for its expansion/compression ratio attributes. Compressor stage C1 can be modified, without detriment, such that instead of narrowing axially as the blades approaches their outer-diameter, the shroud and hub would be near-parallel, and the blades will thicken, to make room for the magnets M. The outlet flow considerations of a mixed-flow compressor should leave a considerable amount of leniency in doing so, for the beginning of the volute V1 where the compressor air comes in will likely be a void, guiding means only subtly taking over the flow as the second compressor stage C2 is approached. Thus, the passage encountered by the airflow between each pair of blades would still constrict, as should all compressor stages, however the constriction would be in the tangential, and not the axial dimension. Further, it is possible that the FIG. 2 gives too much radial extent to the compressor C1 and turbine T4 stages. In a true mixed-flow system the compressor outlet and turbine inlet would not have to be so radial. They could be nearer to 65-85 degrees relative to the axis. This would ease the requirements on the volutes V1 and V2, perhaps even obviating them. In this case, only a pair of bent nozzle rings might suffice.

A newly configured, and preferable embodiment of the turbine/flywheel TF is shown in FIG. 2A. In this embodiment the compressors 2 and 3 or compressor groups 2 and 3 are mixed-flow, radial, or axial-flow compressors. The first and second turbines or first and second turbine groups 4 and 5 are mixed-flow, radial, or axial-flow turbines. Nonetheless first compressor 2 or compressor group 2 is disposed radially outwardly of second turbine or turbine group 5. The charged air from first compressor group 2 is passed to annular duct 1002, which accepts it radially or almost radially outwardly, and bends it back inwardly to deliver the charged air to second compressor group 3. In second compressor group 3, the charged air is distributed at high pressure through manifold 1004 to combustor C. At combustor C, fuel from line 1030 is sprayed or otherwise delivered (pre-combustion chamber, etc.) to mix and combust with air from manifold 1004, to enter nozzle ring 1005. Openings 1038 in the combustor allow pressurized air from chamber 1004 into the combustion area, as is known in the art. In nozzle ring 1005 the combusted air is forced into an optimal trajectory for feeding first turbine group 4. Fuel line 1030 is paired with, lashed to, concentric with, or otherwise coextensive with evacuation duct 1021. 1021 is a passage associated with a pump (8 from FIG. 1, not shown here in detail) that positively drives a fluid-reaction or positive-displacement means that forcibly removes gases from the TF at the beginning of a flywheeling or combustion-off strategy. F2 is the direction of fuel entering the combustion chamber C along duct 1030, F1 is the direction of exiting gases during the evacuation for preparation for flywheeling. First turbine group 4 could be a mixed-flow, radial, or axial-flow turbine, and the important thing is that it is integral with the assembly including second compressor group 3. From the first turbine group 4 the exhaust is delivered via passage 1003 to another nozzle ring 1029 and blasted onto second turbine stage 5. 1026 represents the intake of the high compressor. A gap is preferably left by the casting of the high pressure turbine 4, 3, etc. to communicate with the shaft coupler 1012. This is simply meant to be a very simple configuration appeasing best mode requirements, but as it is FIG. 2A does provide a completely simple formula for providing the output shaft 1016 with the drive of the high/output turbine 4. 1036 is a hollow shaft, fluted or otherwise slotted or grooved on its interior for acceptance of intermediate shaft 1012. 1037 represents the bearing, wider than the other bearings, by a factor of 2-10, for accepting the driven end of the high turbine 4 or first turbine group 4. B again in this embodiment represents a bearing, of typical or specialized design, created, designed and manufactured to meet the diameter of sleeve 1015. 1015 is the sleeve of the clutch or virtual clutch, and is splined, grooved, or otherwise slotted or marked to receive an outwardly splined, grooved, or otherwise slotted shaft 1016, that directly or indirectly connects to the driven element, such as a fan. 1014 is the other end of 1015, but only a marked man would provide two reference numerals for a single element, these days. 1012 is the sliding inner shaft, whose outer radius 1013 is splined, fluted, grooved, or otherwise slotted or modified outer radius positively mates with the outer of output shaft 1016. 1015 is a spring, which pushes 1012 toward 1036, for positive engagement therewith. 1009 is a bias and member, to keep 1012 toward the right-hand side of FIG. 2A until drive is desired. 1011 is a plate that cooperates with 1009 to push the drive assembly 1014, 1015, 1011, etc. toward the right-hand side during flywheeling operation by the high compressor 4. 1010 is the cast, solid body of the high turbine 4 or first turbine group 4, the high compressor or second compressor group 3, and the shafts on both side thereof. In trying not to sound complicated, it must be confessed that the rig is complicated, but the parts once fixed create a believable enablement of the claims, and the claims to come in future applications. 1013 also represents the outer fluting on 1012, present on both ends, that near 1036 and that near sleeve 1014 and 1015. Bearings B stabilize the sleeve 1014 for powerful, fast, and uninterrupted driving of shaft 1016. 1009 again is a module, meant to keep the drive decoupled until drive is wanted. The most advantageous part of this arrangement is that nothing drains the spin of the turbines until positive drive is desired. 1008 depicts an ineffable, mysterious space among various seemingly interconnected reference numerals. 1022 represents the opposed side of the combustion means, and 1027 represents the inlet space of the carry-through means connecting the turbine stages or turbine groups. 1006 indicates the matris, space, or support spanning the interior of the stationary segments of the ducts 1002 and 1003, etc. 1024 is a filler, matrix, framework, or space between the space 1003 connecting the turbines and the space 1002 connecting the compressors.

First turbine group 4 drives second compressor group 3 and a set of magnets M spaced thereabout. The magnets are spaced in a 360 degree array about the second compressor group 3, and rotate freely as if the entire turbine (4)/ compressor (3) assembly were a flywheel, as is discussed elsewhere within this disclosure. 1007 represents cavities in the casting of each flywheel, and B represents all the bearings required to keep the TF's (two now) at minimum parasitic losses throughout operation. 1006 is the material, matrix, filler, or cavity, non-moving, that supports the passages 1003 and 1002. 1024 is an also material, filler, framework, or space supporting the passage 1002. M everywhere signifies magnets spaced, shown distinctly as North-South pairs or specifically, in the drawings, NS, which are generally located outwardly about the compressor, and communicating with stator coils i for the aforementioned hybrid operation. Reference numerals CC stand for casting cavities. These will be voids or annular or toroidal or sectored absences of solid matter, or reduced mass fillers, or other lighter or less-massive segments of the spinning machine. Mostly they are cast with inserts in the mould, removable afterwards, and together with other casting cavities, which seem not of importance, are of importance, as in they remove 20-50 pounds from the inner $\frac{2}{3}^{rd}$ of the radius of moment of inertia (MOI) of the prime mover; while only sacrificing a 3% of the stored rotational energy; they represent a 10% or more weight reduction, at least in the prime mover.

The magnets and surrounding metal are the majority of the stored energy and a significant portion of the overall mass of the system. This should be effected in a way so as to not detract from the rigidity of the TF's themselves. By all means, the TF's should spin like a solid hunk of metal. This will require balancing, but such is not the concern of this application. 1028 represents the space for placing barrier 1018 for hermetically sealing the TF. 1033 again represents the slot available to the seal 1018 to isolate the TF's airflow from the atmosphere and from the pressure accumulator. If the shield 1018 is moved in direction 1031, given supplemental apparatus at 1019 and 1032, the exit from second turbine group 5 will circulate back along first compressor group 2 for delivery to the evacuation system. 1034 is the front edge of first compressor group 5 and second compressor group 4. 6 represents the entire first TF, as there are essentially two TF's, although they are treated as one. It was mentioned that the number of TF's could exceed 2 or 3, but in a best embodiment it now seems each should be a TF disk with a compressor outward of a turbine, with magnets outward of the compressor.

1025 is the proximal end of the shield-carrying space 1017, from which the shield can be, conveyed into a fully blocking state, to hermetically isolate the TF or TF's from the pressure accumulator, the environment, or both, by displacing it toward distal end 1023 of the shield-carrying space 1017. 1020 is the compressor intake, after crossing a long heat exchanger for intake air, and 1001 is a turbine outlet for delivering exhaust air to the pressure accumulator after heat exchanging it with the intake air coming into 1020. 7 is the second TF module, comprising magnets M, first turbine stage 4, and second compressor group 3. An outlet portion 1033 of the shield space services to stop the outlet of the second turbine group 5. 1035 represents the intake edge of the vanes of the first compressor group 2.

Figure 3:
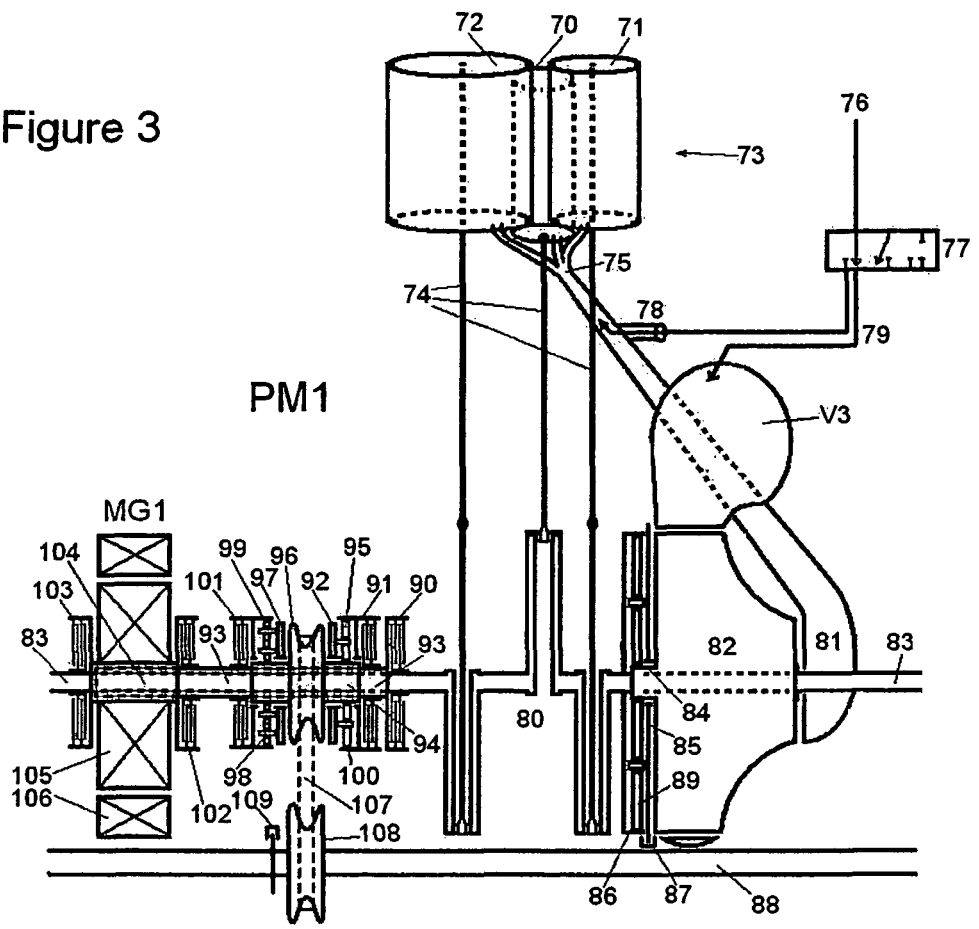
FIG. 3 illustrates an embodiment of the reversible pump-motor PM1, the motor-generator MG, and the transmission between these and the drive axle of a vehicle.
Figures 4, 5:
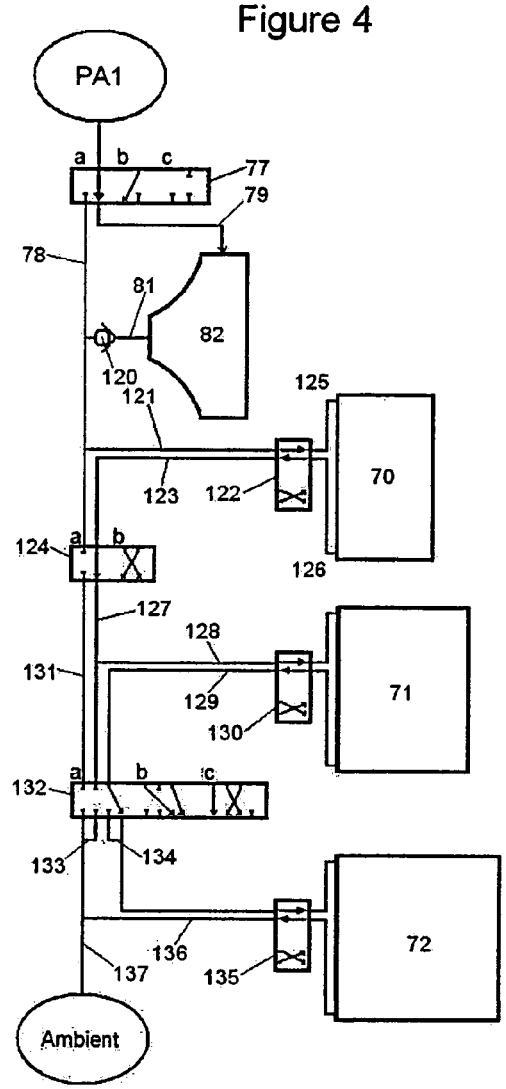
FIG. 4 is a gas flow strategy for selectively changing the mode of expansion through the reversible pump motor.
FIG. 5 is a table explaining the six currently foreseen combinations of valve settings for FIG. 4.

Skip Following Discussion of FIGS. 3-5 for Better Understanding

It is noted that to ease understanding of the invention, one would be well advised to skip the discussions of FIGS. 3-5 and return to them only when a fuller understanding of the overarching concepts has been established. They are not directly claimed in the present application. However, for disclosure and best-mode purposes, as well as to provide basis for being claimed in later applications, it is necessary to describe them now.

FIG. 3 shows pump/motor PM1 and motor/generator MG1. Air enters this system from PA1 via 76 and immediately encounters a three-way, three-position valve that serves to close PM1, send gases to a turbine 82 via path 79, or bypass the turbine and, along path 78, send gases directly to the piston cylinders 70-72 that make up the vital portion 73 of PM1. The air entering the turbine enters through a standard volute V3 and exits at 81. After 81 the air enters a distributor 75 that is actually represented by FIG. 4 and is not simply an entrance manifold. 70-72 become progressively larger and the air is successively expanded, after (or not) being expanded in the turbine, through these three stages, and harnessed for work thereby. The piston rods 74 turn a crankshaft 83 at 80, on which is also disposed the turbine 82 and the mechanism by which the turbine powers the crankshaft. Extending from turbine 82 is a stub which is notched all the way around to make a sun gear 84. Around the sun gear are orbital or planetary gears 89 that engage the teeth of the sun gear and rotate on planet carrier 85 which can be braked by 87. The output of the planetary gears is passed along to the ring gear 86 which is fixed to the crankshaft 83. This type of gear reduction is well known in the art and needs not be defined here, save to state that braking and de-braking the carrier 85 leads to two different step-down ratios, such that the turbine should be able to drive the shaft over two distinct or overlapping ranges of pressurization upstream of the turbine. At these (relatively higher) PA1 pressures, the exhaust from turbine 82 passes to 75. At lower PA1 pressures the turbine becomes useless and 77 is switched to path 78. Regardless of whether the turbine has bee cut in or out at 77, the exhaust now expands in 70, 71, and 71. At relatively higher pressures it may be advantageous to expand the exhaust through 70-72 in succession, and that is why 72 is shown as larger than 71, 71 is shown larger than 70, etc. However, after drawing FIGS. 3 and 4 the inventor, upon weighing both alternatives, believes that the best embodiment for PM1 would be to pass the exhaust through all of the piston-cylinders in parallel and forego the turbine during hybrid operation (described later). Exhaust would simply be valved in on the pressure side of the cylinder at a pressure slightly above the ambient pressure (the outlets of the piston-cylinder arrangement communicate with ambient air). The control of this valving will be of vital importance, for if done properly the pressure drop across the cylinder can be kept as low as possible, and the movement of the piston rods as slow as possible, maximizing the energy rendered.

The driven parts 74 and 86 drive the crankshaft which, on the left end, is surrounded by a sleeve 93 which is further surrounded, at two points, by outer sleeves 94 and 104. Outer sleeve 104 can be clutched to crankshaft 83 by clutch 103, locking the rotor 105 of the motor/generator MG1 for rotation with the crankshaft. Clutch 102 locks 105 for rotation with sleeve 93, which is clutched, via a direction-reversing arrangement, to an output pulley 96, which with belt 107 and axle pulley 108, comprise a continuously variable transmission (CVT) of known type. The outer periphery of sleeve 94 is splined and carries, on each side of output pulley 96, sun gears that cooperate with planetary systems 92 and 97, one of which has a single ring of planet gears and the other has a double ring of planet gears, such that the ring gears 99 and 91 will be driven in opposite directions from each other, inverting the drive relationship between 107 and 83 depending on whether clutch 91 locks 100 for rotation to sleeve 93 or clutch 101 locks 100 for rotation with sleeve 93. Clutch 90 locks the sleeve 93 for rotation with crankshaft 83. It will be apparent to one skilled in the art that the piston rods 74 can drive MG1 without connecting to the CVT, the CVT can drive MG1 (or vice versa) without connecting to the piston rods or the turbine 82, and the piston rods and/or turbine can drive the CVT (or vice versa) without connecting to MG1. 109 is a service brake and will be used when loading the axle 88 via PM1 and MG1 is insufficient for achieving the desired braking force. 106 is the stator coil of the motor/generator MG1 and its polarity will be oscillated and inverted to energize or be energized by the rotor 104.

FIGS. 4 and 5 describe how the air from PA1 can be sent to the expansion modules 70, 71, 72, and 82 in different modes of operation. Theory will be foregone at this point and the parts described. The device works as shown in FIG. 5 and only a description of the parts will be made here. 77 is the same three-way valve from FIG. 3, cutting in or out the turbine 82. A check valve 120 is provided in outlet 81 of turbine 82 to prevent backflow. Before valve 124, line 78 splits off on line 121 to enter the inlet 125 of piston cylinder 70. Switch 122 inverts the relationship between inlet 125 and outlet 126, such that first one side (top) of 70 is the pressure side, and then when the piston has traversed the cylinder, that side (top) becomes the relief side. The return line 123 enters valve 124 in parallel with line 78. Valve 124 switches the feed from lines 78 and 123 to lines 127 and 131 as shown by the arrows associated with a and b. 128, 129, and 130 are exactly the same as 121, 123, and 122, respectively. Valve 132 can only be described by directing a reader to the arrows of a, b, and c and allowing them to be imagined in each of their three settings as relates to lines 133 and 134. These types of valves are known in the art and would unduly encumber the disclosure if an attempt were to be made to describe them. In short, the air arriving from 137 can arrive there after being passed through the cylinders and turbine according to the modes 140-145 in FIG. 5, each being a combination of valve settings which cause series or parallel or hybrid series-parallel flow through the piston-cylinders, depending on the pressure within PA1 and the power output requirements of PM1, as well as external concerns.

Resume Reading Here

Figure 9:
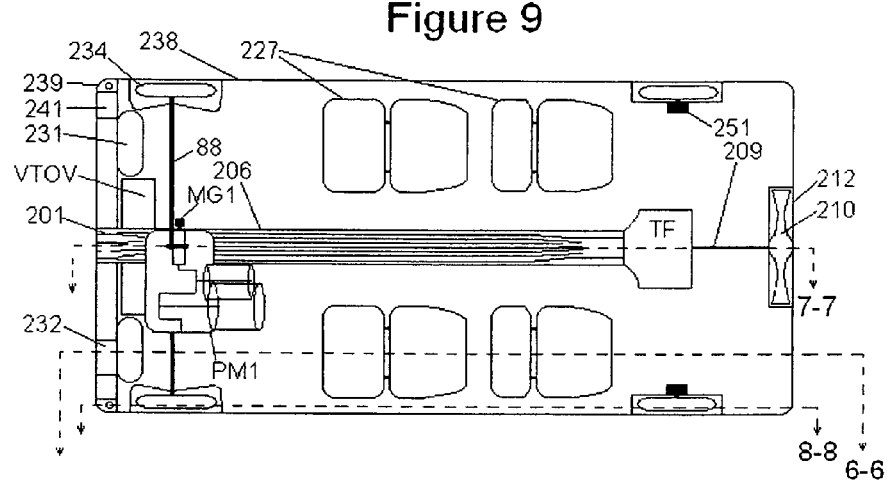
FIG. 9 is a top cross-sectional view of the vehicle of the first embodiment of the invention, providing basis for FIGS. 6-8.

FIGS. 6-8 correspond to FIG. 9, which shows a vehicle according to the first embodiment of the invention as if the top were removed revealing the internals. TF is the turbine/flywheel of FIG. 2, and MG1 and PM1 are the same as those from FIGS. 1 and 3. Turning first to FIG. 9, the body of the vehicle is shown as 238. Seats 227 are provided for passengers in the event that this is a passenger vehicle. An electric motor 251 is provided, now taking the place of the load L, for each of the rear wheels and communicates with the electrical bus of FIG. 1. A cowl 212 encases a fan or propeller 210. Wheels 234 are steering wheels and are connected to the drive axle 88 and, thereby, to PM1 and MG1. Pitch/roll/yaw stabilization nozzle housings 239 are on the front corners of the vehicle, and vertically sweeping radar modules 241 are provided to sense the orientation of obstacles and terrain relative to both front corners of the vehicle. 232 is a camera to provide a dash display of the field of view that the driver cannot see, more or less that below and before the vehicle. 201 is an intake manifold for the turbine/flywheel TF, and 206 is a plate heat exchanger for the TF's exhaust to thermally communicate with its intake. 209 is the drive shaft for the fan and it can directly couple to the output shaft 54 of the TF. Lines 6-6, 7-7, and 8-8 relate to the cross-sectional cutaway FIGS. 6-8, respectively, and show approximately where FIGS. 6-8 pertain across the lateral extent of the vehicle.

Turning to FIG. 6, the dotted line 229 surrounding the vehicle is included to show that the major expanse of the vehicle's body 230 conforms to the shape, as nearly as possible, of an ideal airfoil. The flap 225 folds up, to spoil this shape and cancel lift, and down; ro complete this shape such that, given sufficient thrust and pitch/yaw/roll stabilization, the vehicle will automatically become airborne. PA1 commandeers every cubic inch of the vehicle not needed for personal use. The larger it is, the more gas it can store, the more efficient the system becomes. 224 is the back wall of the vehicle and holds 226, which is the hinge upon which flap 225 pivots. 231 is a fuel tank. 233 is the dash and control module of the vehicle, and 228 is hoped to show the creation of leg-room for occupants of the vehicle. All ergonomic considerations cannot be dealt with in this application, and therefore have been mostly omitted.

FIG. 8 shows what the vehicle of the first embodiment might look like from the side. It does not look like an airfoil because of panel 237, and it is assumed that this will be pleasing to a customer, that his/her car not look outlandish. 225 is shown in its upright configuration, and a spoiler fin 235 shows other aspects that might be added for aesthetic purposes, as well as to offer a moment to expound on other features that might be desirable. Such as, although no one wants wings on their car, it might prove optimal to locate other airfoil-shaped objects around the vehicle to supplement lift and stability. Also, from the spoiler shown a tailfin might be made to pop up, providing a good location to implement a rudder. It is doubtful the vehicle would be stable without a rudder. Dashed line 236 indicates the location of back wall 224 on the other side of panel 237. 238 is meant to be the main body of the cabin, comprising doors, roof, etc. Pitch/yaw/roll stabilization nozzle housings each have three nozzles 140, selectively actuated, allowing bursts of gas to escape PA1 upwardly, downwardly, and laterally outwardly, from each corner of the vehicle. It is believed that with no great amount of computing power, a 6 D.O.F. accelerometer/pyrometer and the proper algorithm, unwarranted pitching, yawing, and rolling can be offset and smooth air travel experienced. In all of FIGS. 6-8, 221 represents the inhabitable space of the interior of the vehicle.

FIG. 7 shows the preferred embodiment for implementing the system of FIG. 1. Air is taken in at the inlet 201 and passes through plate heat exchanger 206 where it experiences thermal exchange with the exhaust from the TF, which is forced down into PA1 by 202 and is shown as arrow 203 coming out of the heat exchanger into the pressure accumulator. From 206 the air enters the TF via a manifold 219, which takes the concentrically arranged inlet and outlet streams from the TF and places them in alternating passages, making heat exchange more efficient and simplifying the device 20, which is a seal, having two positions, and by sliding it up and down the controller can close simultaneously the inlet and outlet of the TF, or simultaneously open them. 70 and 71 are shown to represent the piston-cylinder array 73 of PM1 and 108 is the drive pulley on the drive axle, 107 being the belt of the CVT. 204 is a thrust reverser for the intake air, and can be opened while 201 is closed to take in air vertically instead of horizontally.

A vertical take-of valve VTOV is provided to send air, through bore 205, through outlets A, B, and C. By controlling it, gases from PA1 escape therefrom at high velocities, modifying the thrust vector of the vehicle overall. Passage A sends the gases rearwardly where they escape at 216 and supplement thrust of the fan. 217 is a panel with outlets which can be opened such that air 218 is directed downward, in the event this device is to be used as a hovercraft or hydrofoil. Although this is foreseen, it is not a subject of the present application. Position B directs gases directly downwardly. Position C directs gases downwardly and forwardly, also acting as a thrust reverser to be used with 204 in certain applications.

The right-hand side of FIG. 7 depicts a vertical take-off module comprising manipulable flaps 213, flap panel 215 having tracks for the flaps 213, and the fan casing 212 and hub 211. Airstreams are shown to portray how each of the panels in its different position affects the air through and out of the turbine. Vertical panels 214 pop up from the flap panel 215 when it is fully extended and before the flaps 213 are moved up. These panels 214 serve as outlet guide vanes for the turbine and disallow stream migration and surge when the flaps are in different positions from each other. A rotational shaft-to-shaft coupling 208 allows connection of the TF to the drive shaft 209 to drive the fan. The output shaft 54 of the TF is as short as possible. It possesses trunnions or splines that mate with corresponding female members on the inside of a sleeve or collar that can be slid, in the direction of the arrow shown by 208, over the output shaft, such that the trunnions or splines drive the collar or sleeve, which in turn drives, through reduction gearing similar to that shown in FIG. 3, the drive shaft and thence the fan.

Figure 10:
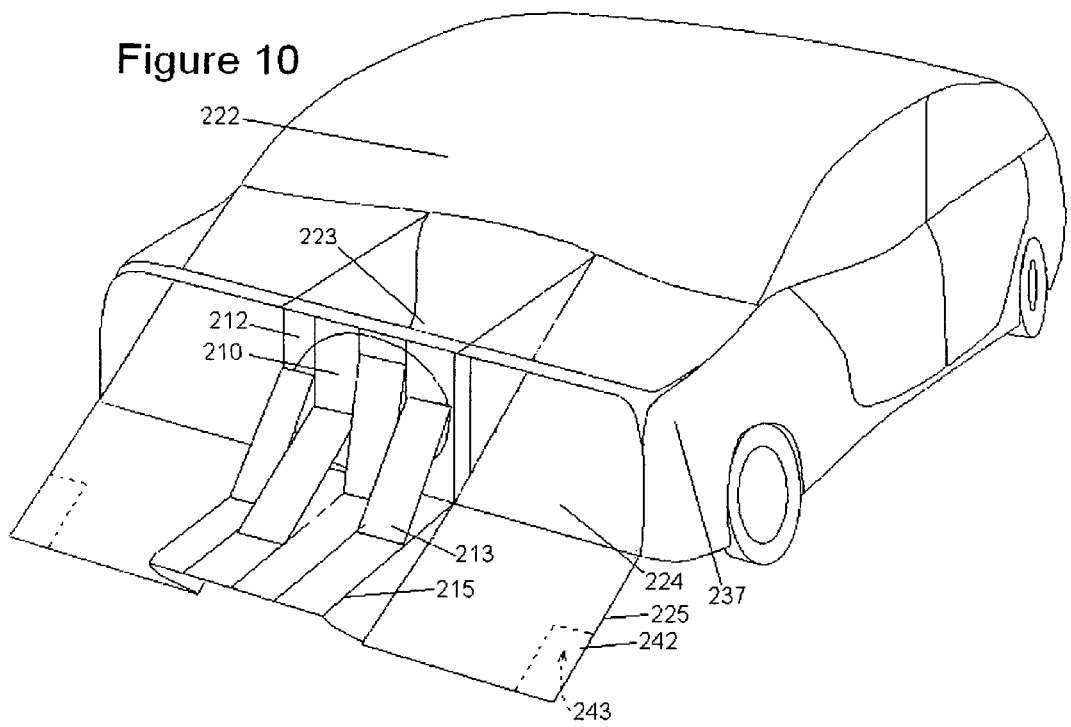
FIG. 10 is a rear elevational view of the vehicle of the first embodiment of the invention.

FIG. 10 shows a rear view of the components of FIGS. 6-9 and will not be explained again except in those reference numerals that were not explained above. Namely, that the flaps 213 can assume any imaginable combination of angles, such as a controller might deem appropriate for vector nozzling the fan thrust. Also, that 223 dips down farther than 224 by the inlet of the fan, but no more than necessary. Also, that ailerons 242 have been considered but it is unknown at this time whether they will be necessary, due to item 239. However, in the event that they were desirable, they would pivot as shown by arrow 243. FIG. 10 has been included to exhibit the extent to which the airfoil shape can be effected while preserving an unobjectionable shape for the overall vehicle.

It has become increasingly apparent, due to the state of the art, that the Toyota Prius C model incorporates the necessary elements for the cross sections at multiple points, such that any cross-sectional model is adequate to show that the underlying physics of the shape of the overall vehicle, in the event that the primary embodiment is of interest, and that moving the hump fore and above the front wheel, and replacing it in that area with a complex-radius curve most suited for flight, to the rear (moving the front module's taken space) to the rear. This completes the airfoil shape, bringing to a point the rear before air moves along the flap, and easily offers the front a perfect airfoil aspect/profile, because without the engine compartment a Prius C's body would curve directly under the wheel in a two-radius or three-radius curve, to fulfill the shape shown in figure six, inclusive of the fore wheels, and also including headlights above the slope, and the pitch/roll/yaw nozzles placed in whatever space is left after the headlights and the front wheels. Insofar as this embodiment is continued, the average hybrid automobile could be modified such that its front 14 inches were applied to the rear, in a tapered rear end, combining with the flap to complete the virtual airfoil shape without foiling the idyllic model. This will not be gone into at length here, because it is believed that automobile manufactures are proceeding with all the arts necessary to perfect the shape. Very aerodynamic vehicles are available for learning of the cross-sectional potential of the best machine, and are as follows: Ferarri, McLaren, and Lotus models, Toyota Prius models, Flying Wing models, the wing cross-sections of extremely large airliners, typical airfoil models, minivans, Boeing wing cross-sections, Douglas wing cross-sections; and anything that one of ordinary skill in the art could go out and draw given the essentials now extant. The very important thing is that the cross-sectional shape of the flying car is just shy of disclosed in the world and the ways of getting there are a blend of the vehicles and manufacturing methods at large among the manufacturers, and the principles shown in this patent document. The very very important thing is that we can expand the use of the vehicle, primarily by truncating its front and extending its back to a point, widening it in the transverse (side-to-side not longitudinal) direction, and filling it with the innards heretofore delineated, that allows the surprising result that the object can fly or perform myriad ancillary uses, likely for the price of a luxury car, helicopter, or tow-truck, once fuel concerns are subtracted, given a user's typical route, or what a user would route given the chance.

FIG. 11 is exactly what its title says. This is how the system will operate from origin to destination, in normal day-to-day ground travel. The steps have been listed here for disclosure purposes. It is noted with emphasis that the last step of the method charges the PA1 and seals it off, such that when an operator starts the vehicle again, the first can be performed.

1.) Start-Up:
Depressurize pressure-accumulator PA1 through reversible pump-motor PM1.
Route generated electricity from PM1 to conductive coils (i), accelerating TF.
Open inlet and outlet of TF.
Commence combustion in combustor C.

2.) Run-up and Hybrid Operation with P>Pmin:
Combust until ω1 (TF rotational velocity 1) and P1 are reached (load can be energized at this time) When P=P1, close inlet and outlet of TF.
Compressors and turbines self-evacuate with assistance from pump and relieved (open) bias-seals.
Slowly expand gases in PA1 through PM1 (currently a motor-generator), electrically accelerating TF.
Deceleration of TF via energization of Load L.
Acceleration of TF via braking of Load L.
Successive reiteration of steps 2-5 and 2-6 until P=Pmin (or insufficient upcoming brakings foreseen).
Meanwhile, during quick-stops (brake-force required larger than reverse load capacity of load L):
Reverse PM1 (now a pump), utilizing supplemental brake-force to draw ambient air into PA (Supplemental braking requirements excessive) Activate service brake.
When P=Pmin OR ω1=ω1 min (or insufficient upcoming brakings foreseen)- go to step 1-3.

3.) Shutdown/Parking:
Close (if open) inlet and outlet of TF.
Route electrical energy from TF to PM1.
Reverse PM1 to pump ambient air into PA.
When ω1=0, close PM1—resulting in hermetically sealed PA with sufficient charge to begin step 1.

FIGS. 12 and 13 get a little more involved, but again there is no need to explain an explanation. The best way to understand the first embodiment is to mentally trace these steps (above and below) and although these are special cases of usage, they fulfill the inventor's obligations of best mode, enablement, and industrial applicability. Each routine, as in scenarios 1-3 above, is best described by its heading.

4.) Starting from Road Travel with Moderate w at Decision Moment (i.e. Typical Highway Lift-Off):
Close (if open) PM1, sealing PA1 (vertical take-off valve VTOV already closed).
Open (if not already open) inlet and outlet of TF and commence combustion (if not already combusting).
While P increases to Pmax, direct all electrical energy from TF to load L, accelerating vehicle.
When P=Pmax, cease combustion, close inlet and outlet of TF, open fan F inlet and flap panel to idle fan.
Electrically transfer all kinetic (rotational) energy from TF module 1 (TFM1) to TF module 2 (TFM2) and L.
When TFM1 and F are rotationally matched (via reduction gearing ratio), slide collar over trunnion.
Open PM1 to maximum throughput, transfer all energy from PM1 and TFM2 to TFM1 and L (until/unless vehicle velocity is near lift-off velocity, then deactivate L for duration of flight)
Open inlet and outlet to TF, commence combustion, positively drive F at lift-off thrust
Although PM1 is still at max throughput, P will quickly reach Pmax).
Selectively open vertical take-off valve VTOV to position A to complement fan thrust and to waste-gate PM1.
If advantageous, momentarily (or for duration of lift-off) rotate VTOV partially/fully to position B and vertical take-off flap VTOF partially/fully upright to achieve "pop up" effect.

5.) Starting from Road Travel with Excessive ω at Decision Moment (i.e. Atypical Highway Lift-Off):
Reverse PM1 (now a pump) and slow TF electrically via PM1 and L, charging PA1 and accelerating vehicle.
When possible, open inlet and outlet of TF without combustion, further charging PA1 and slowing TF.
When ω falls to predetermined rate, commence combustion; Go to step 4-3.

6.) VTO with Moderate ω (i.e. Heliopad/Driveway Lift-Off):
Down flap panel, open fan inlet, open inlet and outlet of TF, commence combustion, charging PA1.
Direct some electrical energy from TF to reversed PM1 (now a pump), further charging PA1.
When P=Pmax, cease combustion, close inlet and outlet of TF, close PM1.
Electrically transfer all kinetic (rotational) energy from TF module 1 (TFM1) to TF module 2 (TFM2) and L.
Service brake applied (connect to front axle, PM1 pistons connect to generator) anytime prior to step 6-7.
When TFM1 is completely stopped, slide collar over trunnion, raise VTOFs to near-upright (fan nozzled down).
Open inlet and outlet to TF, commence combustion, continue to reverse PM1 via electricity from TF.
When P=Pvto, quickly cycle VTOV to position C and switch to thrust reverser on front inlet.
One VTOF has been left horizontal to keep down-thrust just shy of lift-off. It is now raised parallel to the others.

7.) VTO with High ω (i.e. Traffic Lift-Off):
Reverse PM1 (now a pump) and slow TF electrically via PM1, charging PA1.
When ω falls to predetermined rate, go to step 6-1.

8.) Pre-Planned or Taxi-to-Runway Flight (Since Significant Fuel is Consumed by VTO, this May be Common):
Perform steps 1-1 through 2-7 until on straightaway/runway, then perform steps 4-1 through 4-11.
With (GPS) knowledge of route (user's home and favorite lift-off), the computer can optimize fuel usage.

9.) Road Landing:
Obtain altitude and alignment just above roadway, level out and run TF and F at cruise.

Raise the central VTOF, or two outermost VTOFs, partway, to partially vector the thrust down
Simultaneously with 9-2, cycle VTOV to position B.
Loss of thrust in 9-2 and 9-3 reduces lift. Vehicle descends onto air cushion created by downward thrust.
Several inches above roadway, level VTOFs and retract (toward fan) flap panel. Rear wheels touch down.
A moment behind step 9-5, cycle VTOV closed and cease combustion. Front wheels touch down.
Slide collar off trunnion, close fan inlet.
Braking load drives TF to high w, go to step 2-5.
(it is uncertain at this time when, whether, and how PM1 should be utilized during this procedure)
10.) Vertical Landing:
Obtain approach position, attitude, and altitude.
Cycle VTOV to position B and all VTOF's to max upright position, vectoring all thrust and exhaust downward.
Pitch/roll/yaw nozzles PRYNs and TF driven selectively to stabilize speed, lift, pitch, roll, and yaw
Vehicle coasts through a deceleration and descent curve to arrive mostly slowed, above and just shy of LZ.
Cycle VTOV to position C and switch to thrust reverser on front inlet, bring horizontal velocity to zero above LZ.
Attenuate fuel-in until touchdown.
Slide collar off trunnion, close VTOV, retract (toward fan) flap panel, close fan inlet.
Go to either step 2-1 (to taxi or drive) or step 3-1 (to park).
11.) Other Features:
With GPS device, system can begin shedding energy a certain distance from one's destination.
Docking station plug-ins allow vehicle to depart with maximum w and P, such that lift-off happens fully fueled.

Although the method is extremely complicated, it is believed by the inventor that with the capabilities of modern computers, a simple device with very few moving parts and a complicated control method is preferable to an inordinately complicated device (think vertically thrusting fan geared to main drive shaft) with a simple control method. Some compromise must be made in pursuing vertical take-off and landing, and the inventor believes he has not put forth more requirements on the controller than a modern lap-top computer could handle.

Continuing now to some essential attributes of the TF that were not mentioned earlier. FIG. 14 shows a typical axial-flow compressor vane. It is believed that no special shape will be needed for implementing the TF, however, as shown in FIG. 15, the inventor believes the preferred embodiment and best mode at this time are represented by a magnetic core 62 encased in the vane 63. U.S. Pat. No. 5,179,872 to Pernice provides for a magneto rotor having magnetic elements in pockets and the method of Pernice seems to be the best mode for achieving a workable model of FIG. 15. 62 would be an alloy of 33%-64% Nd/Fe (neodymium/iron) encased in, sintered in, or otherwise retained in aluminum vane 63. It is likely that the vast majority of TF will be of aluminum. As for the conductive coils in the casing of the TF, there are many ways to do this, and such is not the subject of the invention. What is important is that it be modified from encompassing the magneto or dynamo, as is usual in the art, and the loops tightened and multiplied to account for so many magnets. It goes without saying that in every aspect of this embodiment, the lightest materials are preferable.

FIG. 16 shows a feature necessary for sealing air passages from nearby air passages within the TF. When combustion is stopped, typical seals would create friction, slowing the rotors and being a detriment to the flywheeling thereof. Therefore seals 60 (they are all over FIG. 2 but not shown, as they are small) are strategically place such that when combustion ceases and the pressures inside the system diminish, the seals disengage from their land. They would be biased away from the land like a Belleville washer spring and the high pressures during combustion would close them. This requires that an analysis be made of the pressures throughout the system, such that the seal always face the right direction. Once properly placed, it is inherent that once combustion ceases, the seals would open and, all gases would migrate from areas of high pressure to areas of low pressure, and almost all flow in radial passages should be outward. That way, the entire system can be evacuated by draining the combustor with evacuation pump 8.

Figure 17:
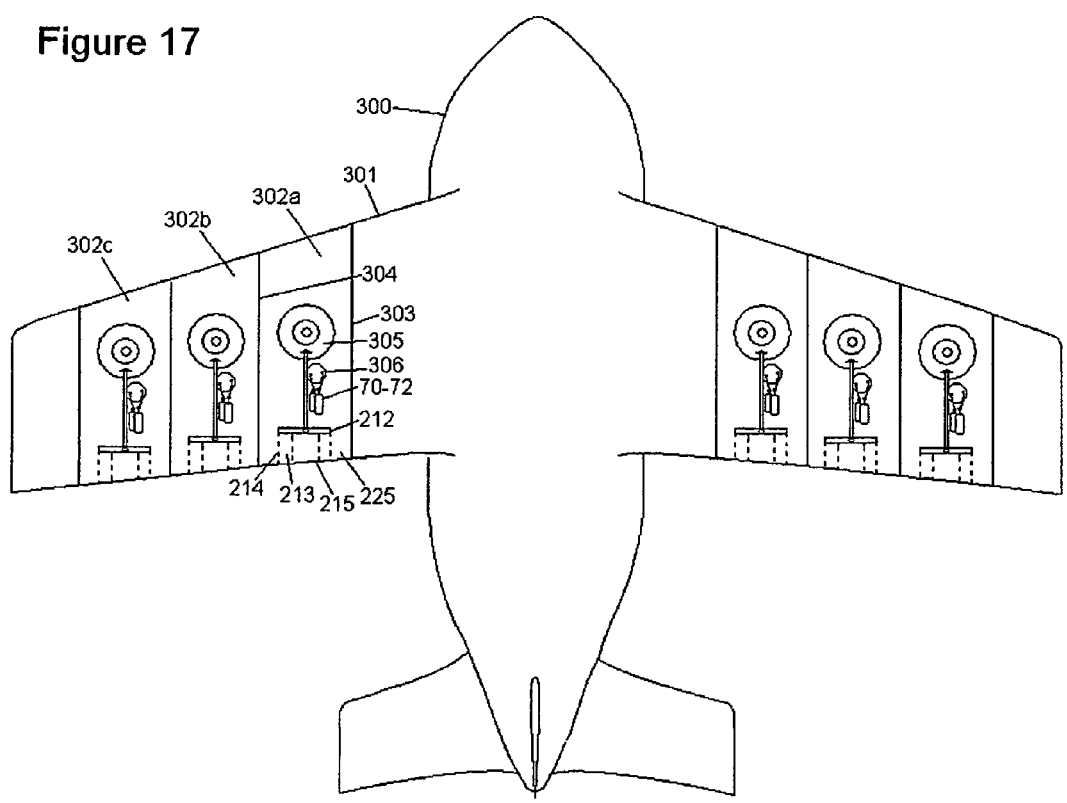
FIG. 17 is a top or bottom view of a VTOL aircraft of a second embodiment of the invention.

FIG. 17 shows the environment within which could be implemented through a second embodiment of the invention. The method is different and there are no magnets, but much of the rest of the system is the same. The concepts of the first invention have been extrapolated and modified to create an airplane capable of vertical take-off and landing. Aircraft 300 has within its wings 301 compartments 302a-c (and 302d-f in the other wing, not labeled). The compartments or chambers are separated by walls 303, 304 which might or might not have an opening for unobstructed migration of air between compartments. Gas turbine engine 305 is no longer called a TF and will be treated like any other gas turbine engine. Again, 70-72 are piston-cylinders that drive, like in PM1, a drive arrangement 306. Flaps and ailerons and panels 213-215 correspond to those in the first embodiment.

FIG. 18 is a cross-section taken along the wing 301 of the aircraft 300. Intake 301 passes air to the gas turbine engine 305. For simplicity, the gas turbine engine of FIG. 2 will be assumed to be within the housing of 305, except now it sits upright on a vertical shaft 331 (this was the embodiment originally designed for embodiment 1, as evinced by the provisional application, but the bevel-gears and entailing mass were thought to be of diminishing returns, however it would spin like a top). An outlet 303 leads either to a simple outlet diffuser 302 which results in the exhaust pressurizing the wing, like the pressure accumulator of the first embodiment. At 308 air enters a series of piston-cylinders 325 either in series or parallel, as explained before, and with an outlet at 324. The piston rods 326 turn a crank within 327 which turns bevel gear which drives bevel gear 305 which is fixed for rotation on the main shaft 307. Main shaft 307 is also driven by a bevel gear 304 which is driven by a toothed annular strip 329 on top of the first compressor stage. The vertical take-off nozzle 339 passes air selectively from inside the wing, through bore 340 to outlets 336, 337, and 338. These correspond to positions A-C of the first embodiment. A hydraulic pump 334 drives through a reversing valve 335, a hydraulic system that drives inner shaft 311 telescopically inside outer shaft 307. The inner shaft 311 has seals 310 which allow it to act like a piston inside the outer shaft 307. The inner shaft is threaded and knobbed at the end, the threads being shown at 312. The fan cowl 315 has an implement 314 atop it for cooperating with the inner shaft 311 to open and close the fan. Dashed line 322 shows the fan cowling in its dropped position. This is a non-use position for the fan. VTO flaps 316 and flap panel 317, as well as ailerons 318, perform as described in the prior embodiment. 319 is the exhaust from the piston-cylinders. 320 is the hinge for the ailerons and 321 is the hinge for the flap panel.

FIG. 18 begins to make sense when viewed in conjunction with FIG. 19. FIG. 19 shows the top of the wing, the niche 355 for accepting the cowling in the non-use position, the hinge 354 for the cowling, the fan 349, and flaps 353 in their non-VTO orientations. 346 shows that the cowling is not just a box but really, all the way around, hollow with strut-vanes that direct air and support the fan. 347 and 348 are directed to the aforementioned scheme of using the telescoping shaft to hide or expose the fan. 347 is a slot through which the tip of 311 is passed during manufacture. It tapers to a neck at the end of the threaded portion and a knob is supplied such that the neck slides within the knob, but the knob and threaded portion limit the movement of the slot on the shaft. As the shaft 311 extends, the ramp of 314, now seated in slot 357 with its tip wrapping around the neck of the shaft, will cause the cowling to raise and pivot up. When the cowling becomes upright and the shaft is now completely extended (reference numeral 356), the shaft begins to turn and screws the threaded portion into the hub of the fan. After operation, the pump-motor 327 can be reversed to unscrew it. Then, upon retraction, the knob will pull the slot with it, collapsing the fan into the wing. 345 shows the ailerons in their relation to the flaps 353. 358 and 359 are mounting arrangements for the shaft.

Figure 20:
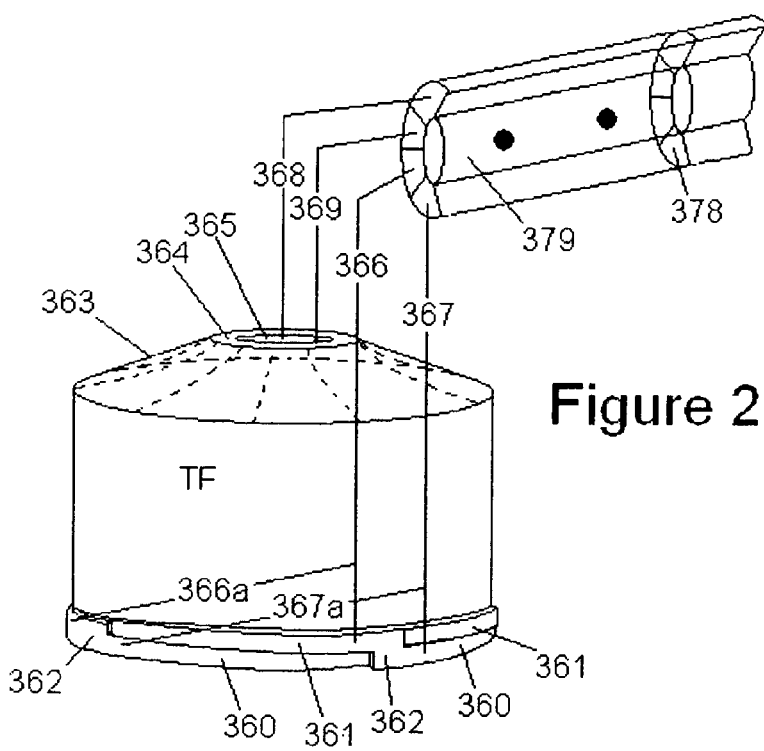
FIG. 20 is a view of the casing of the turbine flywheel and the gas transmission passage of the second embodiment.
Figure 21:
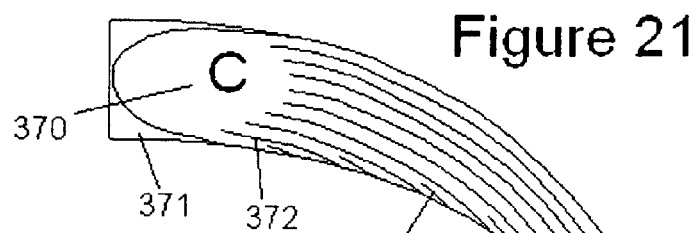
FIG. 21 is an above or below cross-section of the combustor of the turbine flywheel.
Figure 22:
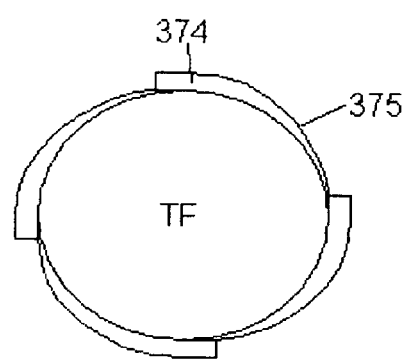
FIG. 22 is a bottom view of the turbine flywheel showing the spacing of the combustors around the turbine flywheel.

Inside the wing, the gas turbine engine reposes as shown in FIG. 20. FIGS. 20-22 serve to also show the different views of the combustor and will be nearly identical to how it will appear on the TF of FIG. 2. It is again here called TF because it is universal to the present application in all embodiments. TF has a top 363 of its housing which encases the centrifugal compressor and turbine, whose inlet and outlet are, respectively, 364 and 365. 361 corresponds to 33 in FIG. 2 and is the passage from the last compressor stage output into the combustor C or 362. 360 is the, guide structure for leading air from the combustion chamber C to strike the vanes of T1. This is shown in FIG. 21 and includes vanes 372 and 373. 371 is the space between the outer wall of 362 and the combustion chamber geometry 370, and assists in surrounding the chamber with air to be led into it. FIG. 22 shows four guide structures 375 leading to four combustion areas 374. It is noted that the combustor inlet 361 would appear like a mirror image of FIG. 21 if portrayed.

Figure 25:
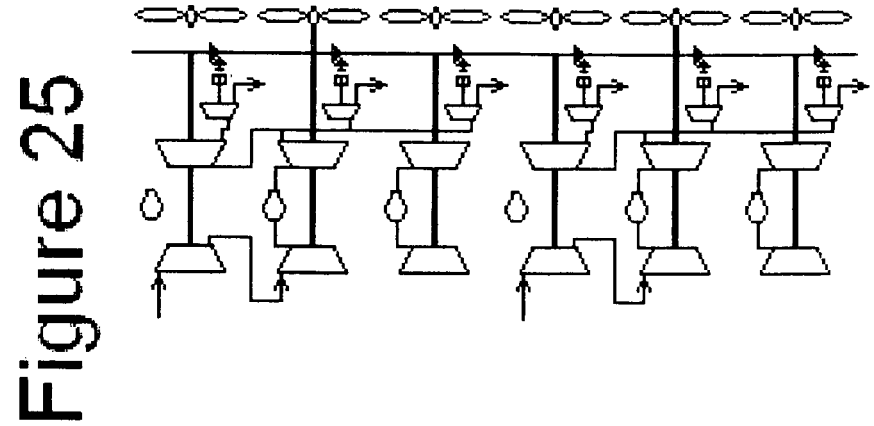
FIG. 25 is a schematic of the gas flow for a third mode of operation of the second embodiment.
Figure 24:
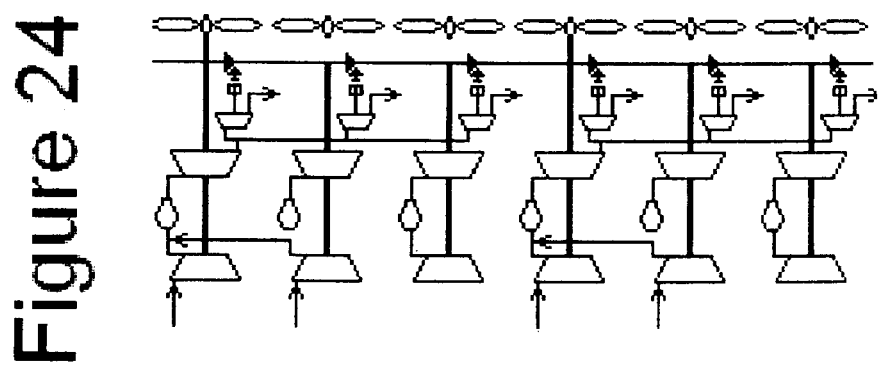
FIG. 24 is a schematic of the gas flow for a second mode of operation of the second embodiment.
Figure 23:
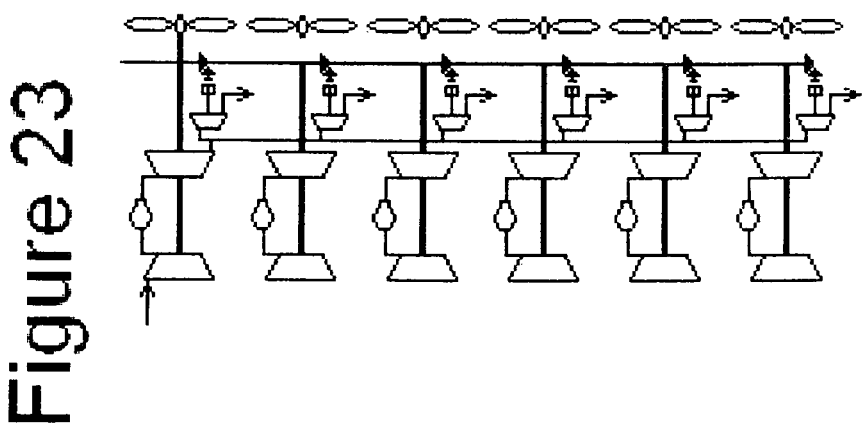
FIG. 23 is a schematic of the gas flow for a first mode of operation of the second embodiment.

At the top of FIG. 20 is an arrangement for placing all of the units within the wing in communication with each other. The inlet to the combustor communicates with this rail via path 369, as the turbine outlet does via 368. The combustor inlet 361 and outlet 360 communicate with the rail along path 366 and 367 and 366a and 367a, respectively. All four of these paths connect to the rail, which has a tube for each of the four airflows. 379 is a turreted, cylindrical valve with openings designed to transfer, at different degrees of rotation, the flow between any one passage and any other, and between any of them and, through the openings shown in the exposed portion of the rail, with the pressure accumulator. Each longitudinal zone of this valve will have a different set of borings, such that when the valve is turned a certain amount in one direction, the airflow seen in FIG. 23 becomes realized. Turning a little more would yield FIG. 24, and a little more would yield FIG. 25, and so on for further utilizations. The different schemes shown for driving different compressors with different turbines and different turbines or compressors with different pump-motors are by no means to be considered exhaustive. There are likely dozens of scenarios whereby the various compressors and turbines and pump-motors of the several units could be valved to enhance the efficiency. But to begin with, the maximum power output would be all units running full, with cowlings up and flaps down, for vertical take-off. The extra scenarios are envisioned for achieving different cruising speeds while minimizing fuel burn.

Figure 26:
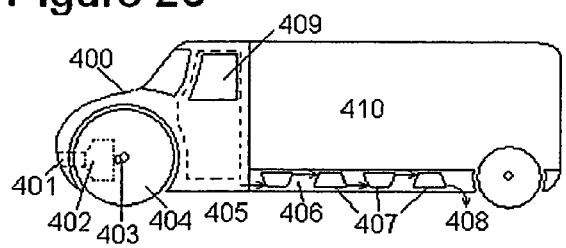
FIG. 26 is a side view of s vehicle utilized in implementing a third embodiment of the invention.
Figure 27:
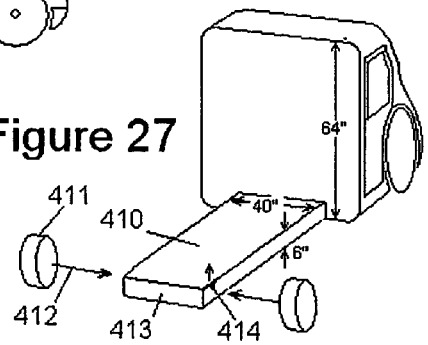
FIG. 27 is a rear elevational view of the vehicle utilized in implementing a third embodiment of the invention.
Figure 28:
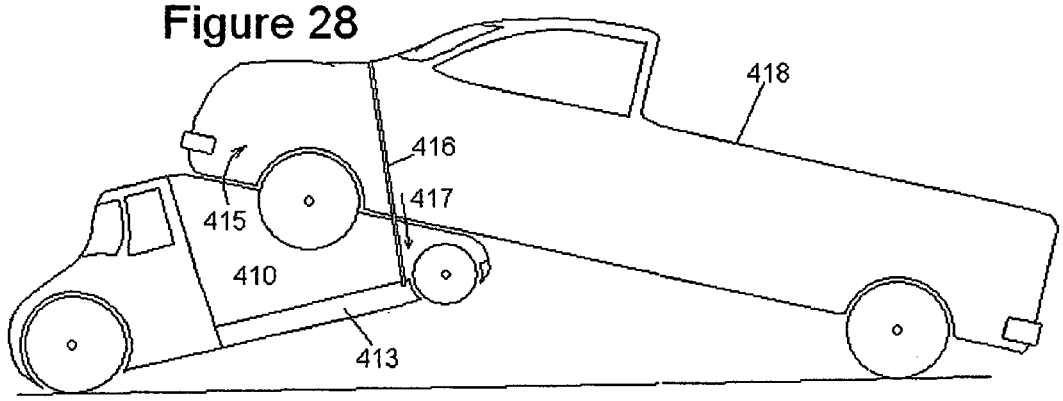
FIG. 28 is a side view of the vehicle utilized in implementing a third embodiment of the invention towing another vehicle.

FIG. 26-28 show a third embodiment of the invention. 402 is again the TF from the first embodiment. The inlet 401 has no special features and the turbine outlet could go anywhere into the body 400 which is a pressure accumulator except where the cabin resides. 403 is a drive arrangement and transmission for coupling the output shaft of the TF directly to the drive wheels of the vehicle, which is a little tow truck. It can hardly be considered a truck going by the dimensions shown in FIG. 27. 409 indicates the cabin and 405 indicates the airflow from the pressure accumulator to a bank of pump motors 407 stored in the tongue of the truck. The driven wheels are oversized relative to the truck because they must support the weight of a towed object, as described later. 410 is the bulk of the pressure accumulator. This is a collapsible chamber that when extended takes the form shown in FIG. 26 and when collapsed takes the shape shown in FIG. 27. The tongue 413, 406 is adapted to have its wheels 411 attached 412 and removed via a slide-up arrangement 414 which lets the axles slip up and out when a pin is pulled out.

In operation the truck drives around in hybrid mode, answering to a dispatch service. It should get the gas mileage of a very small car operating with the pressure accumulator 410 very large such that the TF pumps it full and it can drive around for a substantial time before requiring recharge. However, when the truck arrives at the scene of a vehicle 418 to be towed, the chamber collapses to the configuration shown in FIG. 27, and the tow truck assumes a position directly in front of the vehicle 418. The operator removes the wheels and the tongue sinks (any number of mechanisms can be used. to soften this and/or protect the tongue) to the road and the tow truck backs up, resulting in the tongue extending partway under the vehicle 418 and between its front wheels. The operator throws a strap 416 over the hood of the vehicle 418 and ratchets it down as per the arrow 417. The TF then commences combustion and charges the pressure accumulator 410 against the undercarriage of the vehicle 418. Once a pressure of 3 or 5 atmospheres has been reached (3 atmospheres is 2 atm over barometric, which will yield 28 psi in force, easily jacking even the largest vehicle and if not the pressure will reach many more atmospheres before the pump/motor is activated), the expanding chamber 410 causes a torque 415 about the back rim of the tongue and the configuration shown in FIG. 28 will be soon reached. The tow truck now operates as does the first embodiment during flight, with adjustments for the transmission and other requisite accoutrement. The TF will be very powerful compared to the tow truck's weight itself, but would be set to match the horsepower of a large truck, which is generally less than 500HP, such that the turbine should not have to be very large. The pump/motors will continue to operate in this condition but slightly differently from the first embodiment.

FIGS. 29-34 illustrate the VTOL flaps via a view along their cross sections. Those shown should be seen as at least one of the several that will be in use. Of course some could be different than others. An attempt is made at controlling the bending of each flap as a function of longitudinal distance from a fore end to a back end. The fan or impeller 210 is already described for the embodiments it serves. A device 434 should be provided to incrementally or synchronously drive. upwardly and downwardly the fore pivot pin 433 of the flap. A back pivot pin 442 is on the opposite end of the flap rides in a lateral channel which can be incorporated in the frame of the system. 211 represents the hub of the fan and 212 the flap intake area or fan outlet area, comprising any necessary guide structure.

The flap is composed of lamina 430, 431, 432, 440, 441 that allow various flexibilities along the various longitudinal extents along each flap. Main flap 430 will likely serve as the flap extent itself, and might not require other lamina, as shown, such as could be embodied in the main flap 430 being of variable stiffness along its longitudinal length (in the direction from the fore to the aft of the vehicle) and the other lamina are attached to it, including middle lamina 431 and 440 which can be separated by a longitudinal gap to allow main flap 430 to bend more at such gap. In the event that a compound radius is desired, a third (or more) set (or single) flap(s) can be added to control bend along the middle lamina. These are 432 and 441 and as shown, complete an end thickness of the structure thick enough to encompass the end pins 433, 442. Reference numerals 437 indicate the track that will guide the back end pin 442 fore and aft during the raising and lowering/flattening of the main flap 430. The flap is perhaps shown backward, as it might behoove a designer to have the minor lamina on the outside of the curvature of 430. 430 is the top lamina, and primary lamina, of each of FIGS. 30, 31, 33, and 34.

A series of guide vanes 438 is provided to deflect the air being directed toward it by the main flap 430 such that at high flap angles (downward thrust) increasing amounts of thrust are reversed, forwardly in the direction of the vehicle, to reverse the thrust somewhat, at least enough to offset an amount of the thrust that necessarily escapes rearwardly. FIGS. 31 and 33-34 represent alternative embodiments for the envisioned flaps.

434 depicts the possibility that the raising and lowering structure for the fore end-pin can best be served by a pulley (435) and cord/belt (434) system. The desired bend of 430 is an attempt to reduce turbulence during the direction of air flow downward for VTOL. 436 can be seen to represent the various hinges that need to be used in the system. It is possible that it will be advantageous that the track (437, 439) fold outward/downward first and then the main flap 430 rise along fore pin 433, and the guide plates 214 (from FIG. 7) pop up (in an arc motion), automatically or forced by the rising of fore pin 433 against a return bias, such that by returning the fore pin 433 to the bottom-most position, the track can be folded upward again to close the fan. The cord/belt could alternatively be used on back pin 442.

FIGS. 32, 32A, and 32B depict the skin of the vehicle, or the skin or overall thickness of the pressure-accumulator. It is clear that a bellow- or expansion-resistant mechanism is needed for at least part of the pressure accumulator, to maintain its shape, for various reasons. The simplest embodiment for this would be a metal canister somewhere within the machine or vehicle. However, as has been mentioned, the most efficient pressure accumulator would take up nearly all the volume or space taken up by the machine or vehicle, to store more gas, and the maximum gas storage embodiment would inherently be wherein the pressure accumulator walls are coextensive with the walls of the machine or vehicle, or wherein the accumulator walls are the walls or skin of the machine or vehicle. In this case, we move to the embodiments of FIGS. 32, 32A, and 32B.

1068 represents a segment of a panel, quarter-panel, or sub-module of the vehicle or pressure accumulator skin or outer shell, needing shaping, as is known in the art. 1068 is the panel, sub-module, or quarter-panel that represents some part of the outer of the pressure accumulator. Small panels 1051 are tiles or ceramic lamina or vacuum insulation lamina, such as the now-common plastic or resin panels with multiple vacuum-containing bubbles, creating a nearly perfect heat shield. However, the ceramic tiles would likely be best, since they would not decompose at even extremely elevated temperatures. The small panels or tiles 1051 array the inside or inner side of the sub-module, panel, or quarter-panel. 1066 represent the lines or spaces between the elements 1051. 1067 represent the longitudinal spaces between the panels/tiles 1051, and 1069 represents the perimeter or border of the sub-module, quarter-panel, or panel.

Said border should consist of an aluminum or otherwise light and thermodynamically useful meeting between junctions, albeit C-shaped, U-shaped, extruded, hydro-formed, or beam-shaped or in another way useful for attaching two units 1068 to each other, via bolt holes, welding, etc. The trick or gist of this configuration is shown in FIGS. 32 and 32A, wherein the contour, curvature, etc. of the skin/panel 1056 is controllable due to the side/end angle of each tile 1051. Where it is undercut, the skin is concave outward. Where it is beveled, the skin is concave inward. 1051 is still the tiles. 1050 is the underlying skin of the vehicle. A useful combination seems to be at the time ceramic for the tiles 1051 and an aramid or other inelastic carbon fiber or fiber reinforced resin or plastic for the skin 1050.

Following FIG. 32, the skin 1050 is coextensive, being of a heat-sensitive material, or not, and the tiles 1051, by their shape, give the skin 1050 its desired shape. As shown at 1052, the tiles 1051 are larger in extent near their inner portion than near their outer portion. As shown at 1054, the tiles 1051 are larger near the skin 1050 than near the interior of the pressure accumulator.

1060 depicts a gap between adjacent tiles, and it is here mentioned that the gap might be sprayed or coated with Nitrile, or another temperature-resistant elastomer, to allow the tiles, and their inner meeting points, to be substantially hermetically sealed and non-wearing or non-chipping, to allow skin 1050 to be comprised of whatever is most useful, temperature concerns now mitigated. Nonetheless, 1062 is an outwardly facing space defined by adjacent tiles being undercut, such that when pressurized the skin 1050 is pushed outwardly, as shown in the top portion of FIGS. 32, and 1053 shows a close-up of the assembly. 1057 is simply an end of all of the layers or lamina, where a border or perimeter, or leading up to where a border or perimeter 1069, should exist. 1051 again describes the tiles. 1073 defines a point where there is no curvature needed, and the sides/ends of the tiles are flat (i.e. orthogonal to the face). 1054 shows the beginning of curvature on a concave side of 1053, and it allows the skin to bend inwardly when the overall assembly is pressurized on the side shown as 1056. 1060 depicts a very large gap in the inner portion of the tiles, to allow for a highly concave-inwardly portion 1072 to accord with highly-curved aesthetic concerns. 1062 is a blow-up of a gap between the tiles to create a concave-outward manipulation of the panel, and 1062 depicts a more-pronounced embodiment of such. 1050 is again the skin, that which is visible from outside the vehicle, outside the pressure accumulator, or outside somehow of something. 1059 represent the several depictions of the lamina that spans the various drawings. 1058 is the opposite end, and reciprocal, of 1059. 1070 depicts the end of the shown portion of each panel, and only poses the end of what is describable in the instant endeavor. 1064 is the meeting of the skin 1050 and the tiles 151, and should be the subject of another discussion, as it is well known to laminate ceramic or otherwise incompressible tiles to an inelastic medium. What happens is that when the apparatus is pressurized with gases, the shape of the vehicle or pressure accumulator abides by a contour defined by the angle of the edge- and side-cuts of each tile, since the tiles have previously been permanently and immovably bonded to the skin. Assuming high precision or beauty is desired of the craft, machine, or accumulator, the tiles may be small. Assuming we are dealing with a prototype or utilitarian model, the tiles, gaps, etc. may be large or at least wieldy. 1063 is the primary surface of the skin, that which faces the environment, or an interior or exterior of the vehicle not subject to pressurization. 1055 is the interior space of the skin which is the high pressure area of the embodiment.

Condenser in the Sky

Turning next to FIGS. 35-40, what is proposed is an energy rendering system that can be termed initially a condenser in the sky, a water kite, a cloud mine, an atmospheric well, or a wind turbine electrolysis kit, the list goes on. The main idea was provided in the summary of invention (towards the end). Primarily, now referring to FIG. 35, a wind turbine 500 drives a condenser 504, 505 (with requisite refrigeration, expansion, condensation, compression cycles 614 [see FIG. 37], etc. as are well known in the arts) mechanically or electrically to condense moisture out of the air. The water drops into a tube 521 that delivers it to a chamber 519. The chamber is at a very low level (i.e. ground level) and the condenser 504 is at a very high altitude (1000 ft or cloud level or 5000 feet or some altitude currently (or permanently, or at the moment of concern) optimal for water gathering. The water in reservoir 519 is at a very high pressure because tube 521 is so tall. Tube 521 is preferably part of a cable, either a hollowed out center of the cable or attached to a cable, such that the cable holds down the condenser (which is buoyed) and serves as a support structure for the tube 521 and tube-to-accumulator valve 520. In fact, in a primary embodiment, tube 521 is a cable with a hollowed out core that collects water in stand-pipe fashion and the highest level 551 of water determines the pressure on reservoir 519. The water of reservoir 519 as it flows downwardly and into the reservoir, is charged against a plate or membrane 517 against a strong and rigid spring 516 with appropriate seals 524 isolating reservoir 519 from the area of the spring. The water from reservoir 519 feeds into a vessel 527 which serves as a manifold for passing the water into multiple passages. The first passage is along intakes 525 and 526, that are the intakes of an Oxygen-and-Hydrogen-from water electrolysis system 530. 529 represents the overall assemblage for dealing with the water for the electrolysis system, such as diverting it, storing it, or condensing it, as necessary. There is insufficient space in FIG. 35 to depict this further. The second passage is along a turbine or string of turbine stages (528) to provide temporal energy creation by the system. The turbine 528 comprises vanes or stages 536 which, stage after stage, remove the stored potential energy of the water at said high pressure, and with it drive shaft 533 to turn the rotor 534 of a generator to create electric energy at the stator 535. 544 represents possible downstream stages of the turbine set. The third outlet 537 of vessel 527 is a direct high-pressure feed to the water supply.

It is here mentioned, and not in a side note by any means, considering how ubiquitous are the representations of Francis Turbines in the hydroelectric arts, that turbine 528 would likely best be embodied by a Francis Turbine, or a series of Francis Turbines or a combination of a single or multiple Francis Turbines with other types of turbines, or a single Francis Turbine followed by a positive displacement means such as a piston expander or a peristaltic motor. The Francis Turbine boasts very high expansion ratios, such as upward of 90% hydrodynamic efficiency, but it is assumed that the extremely high pressures dealt with in the present invention could use some modification, such as other turbines or expanders, or serial Francis Turbines, or any combination that allows a Francis Turbine to extract the majority of the turbine energy absorption. The hydroelectric arts are represented by a myriad of expanders, and any or all should be considered in implementing the various embodiments of the present application.

The non-compliant portion 506 of the body of the buoyed assembly should contain the structure to hold and maintain in their effective orientations the shaft 502, bearings, stators 503, condenser 505 and other passages 504 and air exit 508. The remainder, specifically 507, is compliant and fills with hydrogen gas during operation.

Main bearings 518 of the spool 514 serve to rotate or reel or allow autorotation or forced rotation or reeling of the convoluted tube 515, 521 for vertical adjustment of the assembly 506, 507. This has been described in the summary of the invention. The end walls 514 of the reel of cable 515 axially constrain the cable/tube 515 and what passes from 519 to 527 and thence to turbine 528 is in this embodiment allowed to descend along passage 538 to create a buffer between the first and second turbine groups, to allow a high-pressure bleed to be available for direct water pressure use along 539, and along valve 540 is permitted to pass turbine stage 544 into duct 546 which is the standpipe of water tower 550, which holds water at a standard pressure as is known from municipal water tower arts. 538 shows a possible bend in the duct between turbine stages 536 and 544 to allow for the generator 534 to reside between the turbine stages in a convenient manner, but the structure of the turbines and ducts, water routing, and electrical systems are not of interest to the present application. 547 indicates the final output of the electrical bus 522 and should not be seen as limiting insofar as power output is concerned. For instance, it is conceivable that the system, during low wind, could borrow electricity from the grid to run the condenser and produce fuel, even when the wind turbine is relatively idle. Circuitry 545 is an element of the control scheme that allows the CPU to communicate with the valves 541, 542, 543, 540, 523, the electrical bus 522, and the wind turbine. In this embodiment, a reservoir 553 is provided to retain water at a desired pressure, and deliver it along duct 554 at the pressure determined by whether valve 541, 542, or 543 is opened. The output from duct 554 will be at a standard household pressure when 541 is open, at an elevated pressure when valve 543 is opened, and at a super-elevated pressure when valve 542 is open. The latter 543 would be useful for irrigation or industrial usage, etc. The others 543, 541 will be used as is known for various purposes.

Figure 35:
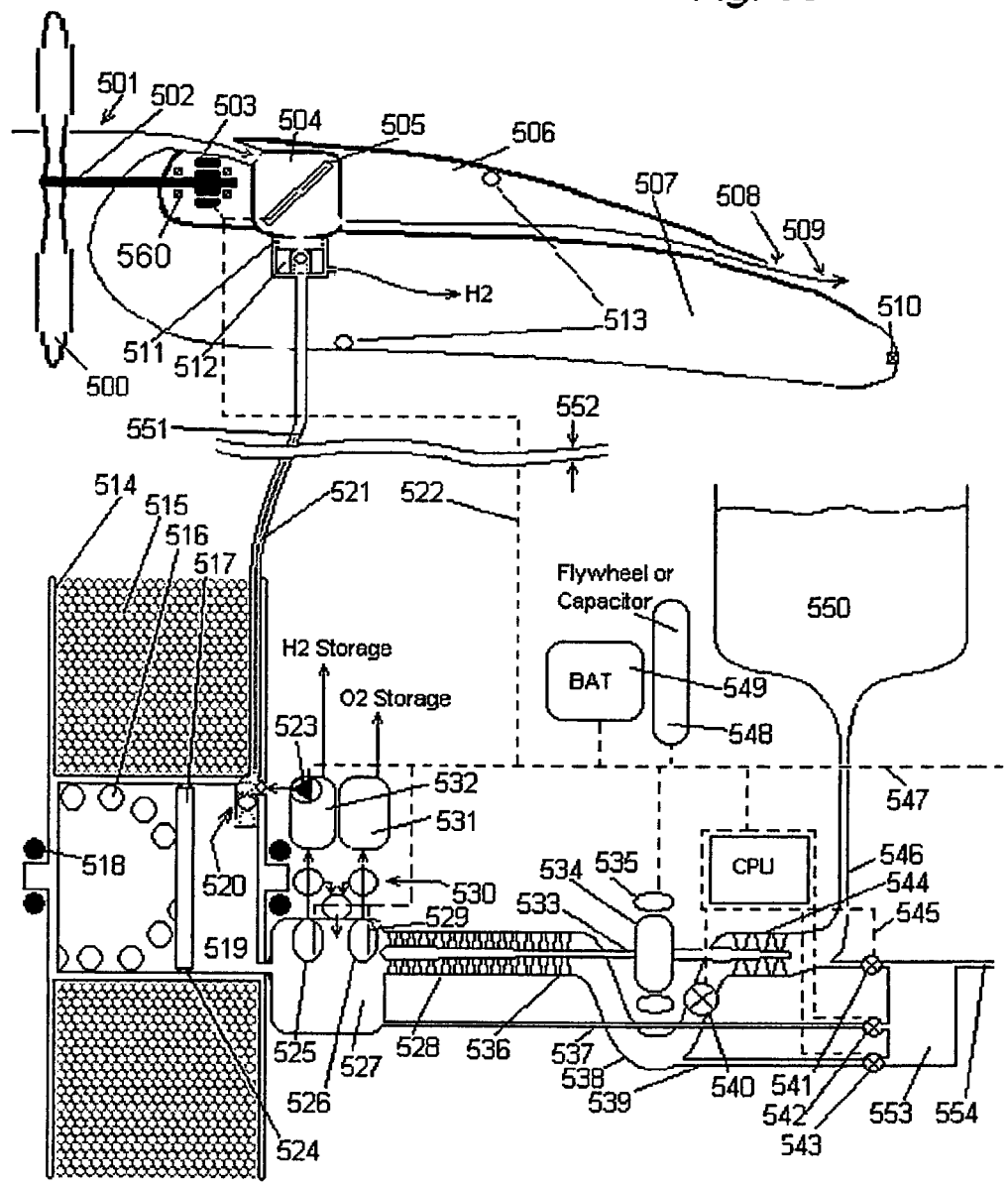
FIG. 35 is an overall schematic of the kite/dirigible/floatable and associated system for electrical power and fuel production.

The wind turbine drives a shaft 502 that drives a generator 503 of which only the stator is labeled 503 in FIG. 35. 501 depicts the airflow into the condenser 504. 505 depicts the condensation device and the various innards of the (prior art) condenser. Intake air comes in as shown by arrow 501. Water collects in chamber 511 and moves through valve 512 to fall onto the upper surface 551 of the water standing in tube 521. The valve is capable of, through a ball valve (shown but not labeled) dropping liquid from chamber 511, and rising upward into chamber 511, allowing gases in tube 521 to move along the arrow ending in H2 to deposit gaseous hydrogen (to be described later) into a pressurized chamber 507. The dewatered air passes along stream 509 through orifice 508 to leave the system. 507 is the dirigible element of the system and is filled like a dirigible with lighter-than-air gases (i.e. H2) to suspend the evaporator and wind turbine in the sky. 552 represents the separation of the bottom of the system and the top, and could be measurable by hundreds of meters, or thousands of meters. The wind turbine, besides driving the condenser, through generator 503, provides power along an electrical bus 522. The turbine set 528, 536, 544 as well provide electrical power through generator 534, 535 to said bus 522. Power can be stored via known means, such as a battery 549, a flywheel or capacitor 548, etc. to modulate or modulate the stored power or average stored power of the system. A CPU controls the bus, the valves (described hereafter), and the electrolysis system, not to mention the pumps and gearings not mentioned.

The prior art electrolysis means 531, 532 derives liquid hydrogen (at 532) and/or liquid oxygen (at 531) as a result of the pressures within the vessel 527, to be described later, and a minimal amount of electrical current. Bleed 523 from the hydrogen storage allows high-pressure hydrogen from H2 storage or the feed thereto to enter valve 520 which, although for only allowing water to flow into reservoir 519, allows hydrogen to flow into the tube 521. The hydrogen gasifies, and bubbles upward along the tube 521 (or if it does not bubble, it will saturate the water in tube 521 and 521's coiling 515, to pass the high water level 551 and press valve 512 upward to vent into the 507 via the stream shown as H2). 513 represent electrostatic devices which negatively charge the airborne segment of the system, in response to sensors, such that the device not be susceptible to lightning. These devices are well known in various arts. 510 shows an outlet valve that allows the gases within dirigible 507 to escape to the environment. 560 is the primary bearing of the wind turbine and generator, but is so well known in the arts, as are the hub, shaft, (502), etc. that discussion of them must be foregone. H2 in FIG. 35 is simply the representation of the hydrogen gas entering the system from the valve 512, when needed.

The reservoir 519 is a pressure-accumulator due to spring 516. All the incoming water from stand-pipe/tube 521 fills the reservoir at the pressure defined by the coefficient of the spring (or other means biasing plate 517 rightward as seen in FIG. 35, or in the event that plate 517 is another means, the coefficient of it) is likely proportional to the pressure of a water stood up against 300-10,000 feet, to be determined. Thus the pressure in vessel 527 and the water available to it can be discharged intermittently, to effect an optimal draw or rendering from the turbine 528.

Elements of the electrolysis system, including reference numerals 531, 532, 530, 525 and the labels H2 Storage and O2 Storage, are well known in the arts, and particularly from U.S. Pat. No. 4,490,232. Also known for their H2/O2 retrieval and/or storage, as well for pulling or coaxing moisture from the air, buoying wires and/or wind turbines, water turbines, motors, etc. or wind turbines themselves, and the other aspects associated with the condenser in the sky, are the following US patents and Pre-Grant Publications: U.S. Pat. Nos. 3,748,867, 8,028,527, 4,351,651, 4,092,827, 5,377,485, 4,757,687, 4,341,490, 4,284,899, 4,842,221, 4,490,232, 7,911,732, 7,795,748, 7,402,028, 5,295,625, 5,284,628, 2006/0112709, 2008/0314062, 7,000,410, 5,149,446, and 4,490,232.

The above are hereby, and later in this document, incorporated by reference in the present application, so that the important points of the present invention can be dealt with as succinctly as possible. Some of them are incorporated for their electrolysis methods, some of them for their condensers, some for their lumen-standing methods, and some for their rain-gathering or vaporization of water from gas, etc.

Figure 36:
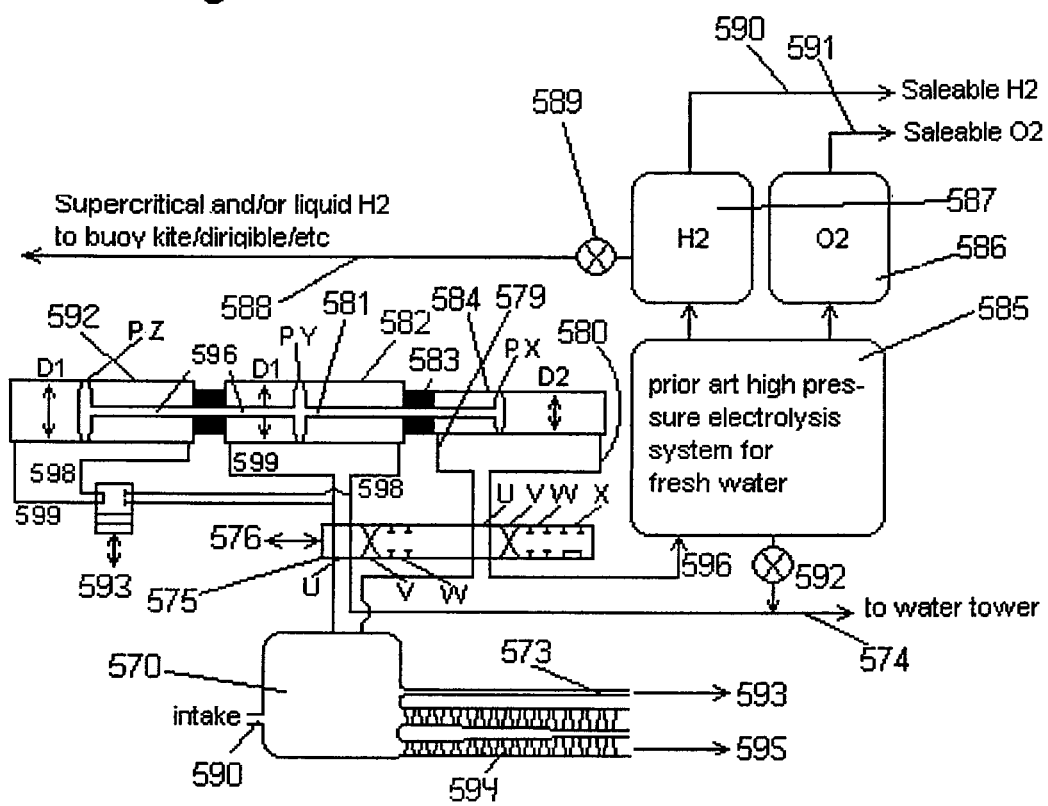
FIG. 36 is a diagram detailing the stages of a self-pressurizing system associated with the pressurized water system for providing liquid hydrogen and oxygen.

Referring now to FIG. 36, disclosed is a hydrostatic system that, without energy consumption, pumps, or other moving parts, converts water at a (base) static pressure (in this instance the pressure at the base of the system, due to the standing column of water in tube 521), into water at a significantly higher pressure. There is of course the redundant option of using energy from water passing through a turbine (i.e. turbine 594) to drive a pump to achieve the same result, but in light of the hydrostatic system invented by the inventor for implementation in the present embodiment, this option might be obviated or at worst a workable configuration of the system.

Several of the elements are reiterations from similar or identical components in FIG. 35, and this is not a mistake, nor it is incidental that they are shown in different configurations. It is the inventor's intention to utilize each figure to show alternative embodiments of previous embodiments, even if the intention of the figure is merely to disclose a new invention. So, now the junction chamber 570 (equivalent to 527 in FIG. 35) is the primary structure of FIG. 36, the upstream elements being omitted to concentrate and zoom in on the new items. In this embodiment, the turbine is shown at 594 and conducts water from the bottom of 570, instead of the top. This will be beneficial for cleaning and performing maintenance on the system, compared with the embodiment in FIG. 35, but may not be preferred, as it may require a trench be dug in the earth for handling it and its downstream accoutrement.

Moving on, another duct 573 shows a high-pressure output line. 595 and 574 represent water movement to utilization facilities, such as municipal water supply, etc. 593 in this embodiment shown could be water at very high pressure fed to an irrigation, long-distance piping, or for manufacturing or industrial high-pressure hydrostatic sources (pressure washers, spraying, hydraulics, etc.). There is an innate disincentive to expand it to the standard municipal water pressure and then have pumps to re-pressurize it.

Anyway, elements 573, 593, 595, and intake 590 are of rudimentary nature and are only dealt with summarily for disclosure. The gist of the invention of FIG. 36 begins at the reciprocating valve 575, which in FIG. 36 is shown in its fully extended position corresponding to maximum pressure achievement. 576 shows the directions of reciprocation of valve 575. Valve 575 will be described along with its functionality, which can only be described in a direct discussion of the pressure multiplier, comprised of first cylinder 584, second cylinder 582, third chamber 592, and plunger 581. Beginning with first cylinder 584, which has a diameter D2; on each end of first cylinder 584 is an inlet/outlet port 579 and an inlet/outlet port 580. In FIG. 35, the valve in its fully extended position U has port 579 receiving water directly from chamber 570 and port 580 pushing water via line 596 to the electrolysis system 585, already described as 530 in FIG. 35. The plunger 581 has a first piston PX within first cylinder 584 pushing the water to the right of it through port 580 along line 596 into electrolysis system 585 at a magnified pressure relative to the base pressure within chamber 570, as will become apparent during the discussion. The pressure to the left of piston PX and within port 579 is also at the base pressure of chamber 570. Such that the pressure of the left of PX and the pressure to the right of PX both push in opposite directions and at equal pressures to each other on piston PX.

Importantly, plunger 581 extends through a seal 583 into second cylinder 582, which has a diameter D1. Inside cylinder 582, the plunger 581 has another piston PY. Second cylinder 582 has input/output ports 599 leading, as shown in FIG. 36 with valve 575 in position U, to chamber 570. In said position U, the other input/output port 598 leads along a line 574 to the water usage facility, such as a water tower or reservoir. This means that the port 598, 599 that is connected to the line 574 is at a pressure near atmospheric pressure. This further means that the water to the left of piston PY is pushing rightward on piston PY at the base pressure while the water to the right of piston PY is pushing leftward on the piston at near-atmospheric pressure, for all intents and purposes in the present application, at zero pressure, or simply enough to keep it from emptying automatically. This does have significance, but will not be dealt with except to say that it is convenient, at least enough to stick with the arrangement shown.

What happens is, the water to the left of piston PY in second cylinder 582, or base pressure, pushes piston PY to the right at a force equal to the base pressure times the square of D1 times π. The water to the left of piston PX in first cylinder 584 pushes piston PX to the right at a force equal to the base pressure times the square of D2 times π. These forces both act on the plunger assembly 581 and are countered by the water to the right of piston PX in first cylinder 584 pushing piston PX to the left at a force equal to the base pressure times the square of D2 times π. Also, it must be mentioned, a negligible force pushes the piston PY to the left via the small pressure to the right of piston PY in second cylinder PY. The resultant force on the plunger 581 is such that the water to the right of piston PX in first cylinder 584 is forced out port 580 at a pressure equal to the base pressure + the base pressure times D2. In the event that D1=D2, this will mean that the pressure multiplier system shown in FIG. 36 (not accounting for other features) doubles the pressure from chamber 570 to line 596, while discarding one cylinder volume of water for each stroke. In essence the system works like a syringe, the pressurized side of second cylinder pushing the plunger and thus piston PX, to force the water in first cylinder 584 out the port 580, as if the water pressure on the left side of piston PY were the syringe operator's thumb. However, the way it is shown in FIG. 36, a make-up pressure is available on the left side of the piston PX, coming directly from the chamber 570 and at base pressure, to act as a "second thumb" for driving the pressure into the electrolysis system 585.

To reduce the number of moving parts, the valve 575 is capable of movement to a second position V whereby, at the end of a full stroke rightward, as shown in FIG. 36, the inlets and outlets to the ports 580, 579, 598, and 599 are reversed by a cross-over arrangement, such that now port 580, and thus the water to the right side of piston PX in the first cylinder 584, charges the piston PX to the left, while port 598, and thus water in to the right side of piston PY in the second cylinder, charges the piston PY to the left, 599 now the relief side of the second cylinder, such that the water to the left of piston PX in the first cylinder out port 579 at the same pressure as described for the rightward-acting cycle mentioned above. Put forth thus, there is no re-charge or re-set stroke of the plunger required. The system provides uninterrupted steady pressure for the electrolysis system. Valve 575 has a third position W for stopping the system altogether, as well as a fourth position X for allowing the chamber (base) pressure in 570 to run directly through 596 into 585 on its own. It is unforeseen at the moment why position X would be desirable, but it is likely further embodiments will see it as useful. PZ is literally the third piston, with shaft 596 connecting it to plunger 581, and D1 is or is near its diameter. 593 should be a valve that brings the third chamber online, or cuts it out. It will be timed with chamber 282 in a best embodiment, and has been depicted in FIG. 36 accordingly. 588 is line 523 from FIG. 35, and lets hydrogen back to the lumen/tube so that it can make its way to the buoying/kite/dirigible device. Valve 598 opens or closes to control hydrogen passage from H2 storage 587 to the lumen/tube 521.

Reference numerals 590 and 591 are clearly marked for what they are in FIG. 36. Namely, they represent the outward movement of energy and/or liquid from these embodiments in the way of compressed or liquid fuel, saleable H2 and/or saleable O2. As mentioned already, the sale or distribution of these should outweigh in incentives the obstacles innate in this system. The primary modules of the system could include H2 storage 587 and O2 storage 586. This storage could be small, or simply a duct to permanent storage, or transportation storage (tanks), or a manifold, or any other thing relevant to the herein disclosed or proposed, or simply a very large storage, with prior art dispensation means.

To increase the multiplication factor of the pressure multiplier shown in FIG. 36, or to increase its compression ratio in other words, the diameter D1 of the second cylinder could be increased as necessary. As described in the summary of invention, if one wished to derive a pressure multiplication of four (a compression ratio of 4:1 such that the pressure at the base is equivalent to the condenser in the sky being four times higher than it really is), D1 should be made to be three times the diameter D2 of the first cylinder.

As the pistons must have seals around their circumference for sealing against the inner diameter of the wall of the cylinder, and the piston itself will experience thrust and/or other forces that restrict its size, the pistons and cylinders can only be made of a certain diameter before cost becomes of issue. In this event, a third cylinder 592 could be provided at a diameter (shown here as D1 but it could be any diameter) to complement the second cylinder, with an extension 596 of the plunger allowing for a third piston PZ, which operate's like piston PY, utilizing ports 598 and 599. In the event that it is beneficial, the third cylinder could be run automatically in parallel with second cylinder 582, but in the event it is not, an additional valve 593 is shown in FIG. 36 to cut in or out the third cylinder 592 and third piston PZ, for instance in an environment where the condenser is subject to altitude changes that require variable compression ratios from a single device. In other words, when the condenser/kite/dirigible/etc. is very high, the third cylinder would be inoperative, but when the condenser/kite/dirigible/etc. drops below a threshold altitude, the third cylinder would be operative via valve 593. Valve 593 should be, self-describing and is not further discussed here. Suffice it to say that it does nothing to the flow of water except open up the third cylinder to the same cycle and phase as the second cylinder experiences.

It should be obvious to one of ordinary skill in the art that the pressure multiplier herein described has infinite uses outside of the domain of the present application. It is also likely that many equivalent prior art systems exist for utilization in its stead, also, or even pertaining to the present embodiment. It is further likely that this system may obviate some of those prior art systems in their own domains. It is believed by the inventor that there are few known alternatives to provide a system that results in such a drastic output pressure without significant moving parts and/or energy input as the present embodiment. Of course, this system has not been researched or shown to be novel in its own right at the moment, thus it is not claimed in the present application except insofar as it addresses several requirements of the present application. However, it is here disclosed and in the event that a patentability search shows it to have potential novelty, it might be pursued in further continuation applications, and for that reason no rights are waived by this paragraph.

The inventor believes that there is a high likelihood that the electrolysis systems for producing hydrogen fuel will greatly benefit from having the incoming liquid at a pressure higher than or almost equivalent to the pressure required to store hydrogen in its liquid or condensed phase, such that a hydrogen compressor or cryogenic storage can be foregone. In the event this is true, the pressure multiplier described herein above via the law of physics suffices for best mode in realizing any claims that deal with it or require it.

In the event alternative approaches are simpler or less costly, such as typical compressors on the liquid side or on the hydrogen output side, such is not pivotal in the present application for the claims that it includes. A method and device have been proposed for magnifying the pressure of a standing system using its own pressure. This is probably not a useless phenomenon. However, the remainder of the invention, and embodiments, must be pursued even though there is more to be said on this, now that a first-to-file law system is in place. So, the application will move now toward the condenser side of the system, once a few peripheral items in FIG. 36 have been quickly described.

596 is the input of the prior art electrolysis system for fresh or distilled water. 585 is said system itself, comprising parts described elsewhere within this application and invoked by reference from a few US patents described also in this application. 587 is the output for hydrogen from the electrolysis system and 586 is the output for oxygen also a product the electrolysis system 585. 590 and 591 are end-use outputs for the useful side of the oxygen and hydrogen production. 590 and 591 could include storage systems, including tanks, cryogenic systems, compressors, pipelines, valves, etc. All this depends on the user or environment of endeavor.

589 is a valve that allows the hydrogen, either in its high-pressure liquefied state or a superfluidic state to pass back to the buoying means for the condenser, wind-turbine, kite, dirigible, or other raised system. The hydrogen should pass into the system at a higher pressure than other liquids, such that it bubbles upward to the buoyed apparatus, or saturates the liquid of the liquid in. tube 521 to the point that at its upper extent, the hydrogen dissolves out of the top surface of the standing liquid (water). A valve will be provided to divert it to the buoyancy means, but this will be described later. The valve 589 controls an output means of the hydrogen storage/delivery means 587 and the hydrogen should, despite the loss the inventor is at to illustrate them all, end up levitating the compressor. 590 is the intake of the junction chamber 570 and should come from the base of the stood water.

Continuing to FIG. 37, the condenser and drive mechanism for it, and the wind turbine and the transmissions, both mechanical and electrical, are shown in cross-section along their midsection, from a laterally extending view. High-altitude air and water vapor enter the system from the left, as shown in the figure. Some parts in FIG. 37 are shared with FIG. 35 but have been renumbered here and described again for continuity and understanding.

The primary component and source of energy is the wind turbine or windmill 623, of sufficient build but not overly extensive in any direction. A large wind turbine would be the optimal arrangement but weight will be an issue in this embodiment. The wind turbine blades or vanes 640 provide motive force, as is known in the arts, to hub 600, which drives a shaft and it and the shaft ride on bearings 618, 619, and 622. The hub/shaft drives a transmission 620 which through clutches 621 selectively actuates multiple gears to drive multiple other gears 642 as is also known in the power transmission arts. 642 will have clutches too. The clutches should be classic lamellar packs actuated by hydraulic means. 617 is a gear assembly to pass rotational force, along releasable clutch and/or torque converter 616, to a refrigeration cycle 604-615. An intake 634 accepts air from the environment and an impeller 601 charges the air for its passage through tunnel 632. Condenser 605 removes as much vapor from the air as possible, and the water derived therefrom collects in tray 629 for passage to vertical tube 631. 605 should be the most efficient condenser in the arts, because it will be doing the brunt of the burden since the output of almost everything else, excepting the wind turbine, relies on it. However, simple standard condensers could be the most appealing to start, especially for prototyping. This also goes for the refrigeration cycles. It should be obvious to one of ordinary skill in the art that various types of condensers and/or refrigeration cycles could arise from implementation in the present embodiment. 606 is the body of the device, and could also comprise the outer material or shell or bladder, within a casing, of the dirigible nature of the embodiment, otherwise known as balloon or blimp.

The space 626 within the outer 606 is filled with lighter-than-air gas. 632 is the outlet tunnel having a casing 633, see FIG. 38, and plates 624 within it, cooled by a heat exchanger means, such as the refrigeration cycle, and, as mentioned, dripping onto tray 629. 638 is where the air forced into tunnel 632 by impeller 601 leaves the system. 610 and 630 are the electrical system, likely a bus, for feeding electricity to and from every or some of the driving and driven elements of the system. 639 is the interface with the bottom-end of the system, as shown in FIGS. 35 and 36. This will not be described again. 627 is the valve that was valve 512 in FIG. 35. It lets water drip down through a ball/check valve into the vertical passage 631, but when pressurized from below lifts to allow lighter-than-air to enter the inflatable portion 626.

The refrigeration cycle 604 through 615 needs further improvement, but refrigeration cycles are well known in the art, have some tens of thousands of patents and documents devoted to refrigeration cycles, some good fraction of which are for transferring a coolant to a heat exchanger. Any of these could be used. The current application does not pretend to deal with refrigeration cycles. As it is, what will follow is a summary description, meant to encompass the most common mechanisms of a working fluid, coolant, refrigeration, or heat exchange cycle. 604 depicts a manifold for feeding coolant to heat exchangers or fins or plates 635. Another manifold 607 collects the various heat exchanger outputs and directs them to a vaporization chamber 636 where they serve as the cooling or heat-accepting liquid, and are expanded via a valve or nozzle to liquifact or vaporize, and in their super-cooled state deprive the liquid in the copper coil, part of closed circuit 614, described below, of its heat very rapidly. Said vaporized and recollected liquid passes through the bottom of 636 to a line 612 where it enters a compressor 608 for recirculation to manifold 604.

This is a typical closed circuit for the coolant on the heat dissipation side. On the heat accepting side, another closed circuit 614 takes coolant to a compressor 615 where it is charged and pressed upwardly through the heat-conductive coil, shown as a zigzag line within vaporization chamber, where it is cooled. Thence it passes upward to a manifold that distributes it into condenser 605. It is clear to the inventor that a few aspects of the cycle herein described are missing or out of order, but the intention is to include them, and invoke the refrigeration arts for help in rectifying the omission. There is no reason to believe any of the best methods for providing cooling fluid to a heat exchanger are not to be realized in combination with the disclosure herein provided. A motor/generator 609 is provided for driving the refrigeration cycle when the wind turbine is dormant, and thus will by default be considered for power consumption as a generator when the wind turbine 623, 600, 640 is driving at superfluous rates, or rates above which the condenser performance approaches a theoretical limit.

As shown in FIG. 37, 614 is the main generator and is a standard wind-turbine electrical generator, and could be placed directly on or around the hub 600 or shaft. It is shown here accepting the power of a rotor that is part of transmission 642, assuming that this will be more efficient. Such might not be the case. Anyway, it is most important to mention that the wind turbine 623 rotates a rotor that produces electrical power in a generator and/or mechanical power in a condenser. The electrical power passes down line 630 to the electrolysis system and grid. 637 provides the basis for the cross-sectional view in FIGS. 39 and 638 provides the basis for the cross-sectional view in FIG. 38.

FIG. 38, taken along cross-section 636 in FIG. 37, shows the body 633 of the condenser disposed within the body of the dirigible 628. A strut and/or frame 625 supports one with respect to the other. 624 shows the cooling plates of the condenser, which will in a preferred embodiment have cooling fluid flowing through them from circuit 614, and will condense water vapor from passing air, forced in by impeller 601. 626 is the chamber itself, filled with lighter-than-air fluid. In FIG. 38 as well as in FIG. 37, tray 629 collects the condensed water for delivery to valve 627. 623 in FIG. 39 is the exit of the tunnel, and goes out at 638 to join the air downstream of the wind turbine. 628 is the skin of the kite/dirigible.

As shown in FIG. 38, the chamber 625 and its housing 628 will be laterally elongated, compared with its height. This is so that the airfoil shape of 606 and 628 and 625 might be airfoil shaped as shown, to allow a sailing effect when the product is originally launched. However, it is foreseen that the product might be pushed, via helicopter or other means, already buoyed by a lighter-than-air fluid from the manufacturer, to its destined site and then connected with the lower half of the system. This would preclude the necessity of having to provide hydrogen at startup, but in the event this is unfruitful, and it really might be, the initial launch of the system would be via a cartridge of lighter-than-air fluid, or the addition, during initial assembly, of a minimally-charged hydrogen storage system (part of the electrolysis kit) having enough lighter-than-air fluid to get the thing up for its first run. Subsequent charges of lighter-than-air fluid will be available from the electrolysis system. It is unlikely, therefore, that the airfoil shape would be necessary for the outer shell or body 606, unless it is deemed optimal for providing an upward pull on the cable and for elevation achieving requirements. In FIG. 37, it is further recited that 641 represents another motor/generator of the electrical type, passing electrical energy to or from the impeller 601 or the hub.

FIG. 40 illustrates a concept design of the system shown in FIG. 35-39. The wind turbine 640 drives a shaft 665 that drives a geared transmission 620. The shaft, turbine, and transmission rotate on bearings 619 and 622. The air and vapor enter the system at 634, which for all intents and purposes should be a double bell mouth shape or venturi, although the shape is probably not of importance so long as it constricts the flow.

The condenser 605 and the water collection tray 666 have already been described. 626 is again the chamber filled with lighter-than-air fluid as described in conjunction with FIGS. 35-39. 655 is a journal or slide that allows the cable or vertical tube 631 to pass through and into body 606 without 626 losing fluid from either, and to provide a durable, flexible system, although the intersection of 606 and 631 could be fixed and permanent. In any case, the refrigeration cycle comprises circuit 614 that feeds coolant from condenser 605 to evaporator 636 and through pump 608 back to condenser 605. The heat dissipation stage in this figure comprises fins 651 disposed on the top or bottom of body or chassis 606 for releasing heat via convection. Pump 601 is driven, preferably through transmission(s) and shaft(s) from wind turbine 623, or without transmission, to drive coolant through circuit 614, while compressor 672 provides circulation through line 607 and into fins 651 to sink heat into the passing air. 609 is the same motor/generator from FIG. 37.

In this embodiment, the air and vapor are drawn into intake 634 by a centrifugal or mixed-flow compressor 601, capable of reducing the pressure within 605 by a considerable amount. This causes the air in intake 634 to accelerate and pass, as in a venturi, through the bell mouth 634. A throttle or butterfly valve 670 or some other valve capable of choking flow, can be placed at the intake 634, but it is unknown if this is advantageous or necessary. Regardless, the working pressure within the condenser should be roughly ¼ to ½ of the pressure outside. This will slow down flow, allowing for a more thorough passage of air through the condenser. It will also lower the pressure within the condenser.

The intention of this is to "knock" the vapor out of the air, since the air will already at times be near the vaporization point, permitting a reduction in the amount of apparatus and/or mass for the refrigeration and heat exchange cycles or circuits. Throttle 670 or butterfly valve or choke 670 could partially evacuate the condenser, by driving the compressor 601 at high speed while restricting the amount of air flowing into the condenser. This will allow more vapor to be liquefied per weight/cost of condenser.

A valve conducts air from the compressor 601 to be expelled to the environment or injected into the dirigible/balloon volume 626. In this embodiment, it might be advantageous to push the air into the chamber 606 to expel the lighter-than-air fluid via outlet 656, to ballast the balloon/dirigible/etc. downward, to get into more vapor, so to speak. This was described in the summary of invention.

Check valves 671 can be selectively actuated in conjunction with operation of the valve 654 to control the mass or weight of the system to move the latter up and down, by simply passing air at an upper, and lower, altitude, as shown. With means 601, 654 to pump air into the dirigible/balloon volume 626, means 627 to inject lighter-than-air gas, and upper and lower outlet valves 671, the volume 626 can be operated like a ballast tank on a submarine, to raise and lower the system.

630 again shows the electrical bus that passes downward to the grid and electrolysis system. 639 depicts the break in continuity necessary for the upper and lower extents of the system to be discussed in the same drawing. 664 shows the electrical bus 630 going off to its various destinations/sources. 660 is the bottom of the vertical tube, where the base pressure is present. 657 is the entrance to the electrolysis and/or turbine and/or grid and/or accumulator systems shown in FIGS. 35-36. This will not be described again. However, in this embodiment, the peristaltic motor 659 is shown, having rollers 661 or equivalent means to be pushed by the static pressure in 660 around an axis, driving mechanically or electrically along 658 the other means. 659 is an arm or hub of the peristaltic motor that connects the rollers 661 to the transmission means 658 that feeds the system 662, again, already described. Duct 663 carries the final flow 668 to a water usage system, or waste. 669 is a replication of the condenser from the other embodiments. 423 is the main portion of the wind turbine blades 640. 678 is the rear end of the dirigible/kite/etc. 676 depicts the bearings and shaft end associated with the downwind end of the refrigeration cycle, or another fluid moving system of the overall embodiment. 650 is a space surrounding the transmission 620 and upstream of pump 601, just to show that the air can move along the transmission 620 without being baffled by it. The passage will still continue around 80 percent of the diameter of this duct. The shown transmission 620 will only take up a portion of the bottom of it. 673 is a passage from the pump 601 to the heat exchange area 651, via passage 652, and 677 is a passage of the air from the pump 601 into valve 650. 674 is another bearing for stabilizing and restraining compressor/pump 601 and refrigeration cycle 636 as well as motor 609. 626 is yet another mysterious character. Perhaps he is in atonement. 667 depicts the hydrogen gas flowing from valve 627 when the controller wishes to move lighter-than-air gases from the base and/or along the lumen to the dirigible/kite. 675 shows where the shaft 685 passes past the outlet of the condenser. The shaft is known. Therefore the condenser is more important to the present discussion.

Surprisingly, there is prior art teaching peristaltic motors. Two excellent examples are U.S. Pat. No. 4,997,347 to Roos and U.S. Pat. No. 4,309,150 to Payne, both of which are incorporated by reference in the present application, in their entirety. Either of them, or any other peristaltic motor, could be substituted for motor 659. It is the inventor's belief that this will extract the pressure energy stored in the vertical tube at nearly 100% hydrodynamic efficiency, with a small, inexpensive device, apparently one that is already in use, somewhere, and whose specifications and limitations are already known, even if they must be extrapolated to deal with the pressures we are dealing with. The only drawback to the prior-art peristaltic motors would be the gearing or belt/pulley or equivalent step-down device required to turn the generator, as the peristaltic motor would operate slowly, and the generator should rotate rapidly, in order to reduce the size and mass of the generator itself. In a simplest embodiment, the peristaltic motor could be a reversed peristaltic pump, with an arcuate deformable tube pinched by rollers that are supported by spokes or arms around a center of rotation. The water would push the rollers and drive a generator.

The operation and parts of the embodiments of FIGS. 35-40 are very similar to that shown in U.S. Pat. No. 4,490,232 to Lapeyre, which can be seen as a foundational document in the present discussion, and is also incorporated by reference in its entirety in the present application. Any questions or objections to the system or the claims, particularly concerning enablement and/or the electrolysis system, can be answered by the content, or the existence itself, of this patent.

In fact, the Inventor found this document while researching whether the far-fetched capabilities that seem to arise from the current invention were even real, or possible. Clearly they are. For all its merit, Lapeyre omits the steps of utilizing a condenser (it requires rainwater and therefore a spacious collection system), utilizing the hydrogen within the system, floating the water collector, etc., and because the environment surrounding the electrolysis system is at the same pressure as that within the electrolysis system, it cannot enjoy the use of an adjacent turbine for energy. It instead relies on a turbine which, judging by the disclosure of Lapeyre, will be at least 1000 meters away. Also, the pressure energy of the hydrogen and oxygen captured by Lapeyre is wasted just to get it back up to sea level. Although it does stand the water at great pressure, it relies on a pipe that will be so costly (perhaps miles long, and buried or anchored in the sea bed) to implement that it makes the cable of the present application much less far-fetched. Also, the inventor does not mean to disparage Lapeyre for its deficiencies. When he saw Lapeyre during said research, he realized he had seen it a few years ago, and this invention only came to his mind one year ago. So, in the event that something useful comes of the present application, Lapeyre deserves some credit. However, there is no prima facie evidence to suggest that the enormous leap of rectifying those omissions of Lapeyre, listed above, is obvious in light of the prior art, also found during the research and listed below, for combining to create the present invention.

The following references were found during a research project which also will serve as the patentability search on the inventor's part and therefore are provided in an information disclosure statement, to follow. However, they are being utilized to fill the gaps in the inventor's knowledge and expertise when it comes to the several facets of the present invention that are too involved to be gone into here. Thus, they are incorporated by reference in their entirety, for teaching condensation, electrolysis, hydroelectric, dirigible, hydrogen usage, water storage, and wind turbine devices and methods which assist in an understanding, and best mode, of the present invention.

The documents incorporated by reference are:

| | |
|---|---|
| US 20100326101 | US 20080314062 |
| US 20060112709 | U.S. Pat. No. 8,247,912 |
| U.S. Pat. No. 8,166,710 | U.S. Pat. No. 8,028,527 |
| U.S. Pat. No. 7,911,073 | U.S. Pat. No. 7,895,847 |
| U.S. Pat. No. 7,854,119 | U.S. Pat. No. 7,795,748 |
| U.S. Pat. No. 7,402,028 | U.S. Pat. No. 7,000,410 |
| U.S. Pat. No. 6,861,766 | U.S. Pat. No. 5,377,485 |
| U.S. Pat. No. 5,295,625 | U.S. Pat. No. 5,284,628 |
| U.S. Pat. No. 5,149,446 | U.S. Pat. No. 4,842,221 |
| U.S. Pat. No. 4,757,687 | U.S. Pat. No. 4,726,817 |
| U.S. Pat. No. 4,490,232 | U.S. Pat. No. 4,351,651 |
| U.S. Pat. No. 4,341,490 | U.S. Pat. No. 4,284,899 |
| U.S. Pat. No. 4,092,827 | U.S. Pat. No. 3,748,867 |

It is mentioned here that the list of documents incorporated in the foregoing paragraph is incomplete, and another prior art search, to come, will provide other references for patentability purposes. Those references will be provided in an upcoming Information Disclosure Statement, which will be provided before the first Office Action is expected to be undertaken.

Operation of the Condenser-in-the-Sky

A kite, airfoil, balloon, or dirigible suspends a cable. The hollow core of the cable is a tube or is attached to a tube, and in a preferred embodiment drains into the interior volume of a hydrostatic accumulator, hydrodyamic motor, hydrostatic motor, or another type of accumulator in combination with a motor. The accumulator will be charged to a pressure commensurate with the pressure resulting from the height of the cable/tube, and will be charged by such pressure against an energy storage means or motor, in the shown embodiment the energy storage means is in the form of a metal spring. But the pressurized water can work directly on a motor. The output of the accumulator connects to either or both of:

1) A turbine and/or a fuel-cell creation device, or other means that utilizes electricity to turn $H_2O$ at high pressure into $H_2$ and $O_2$;
2) A water utilization system.

Or, the motor has associated therewith a pre-storage means or other turbines/motors or is a lone turbine or a series of accumulators and turbines or motors and turbines or accumulators and turbines and motors and other energy rendering devices . . . this continues as far as the disclosure is obvious and provocative of further systems.

In one embodiment, the $H_2$ gas stored in the hydrogen tank of the fuel-cell creation device will at times be bled into the vertical passage (the standing water pipe that stretches from the accumulator to the desired vapor accumulation altitude) and the $H_2$ bubbles or molecules will travel the entire length of the vertical passage, through the water, and will be diverted by a valve to pressurize, with gaseous $H_2$, an inflatable portion of the kite. The cable must be controlled via some means, and several have been put forth in this document.

The essence of the invention is that the pressure due to a change in altitude, being so great, combined with the diameter of the core of a cable, being so small, compound to reveal myriad uses. The laws of hydrostatics state that given a significant vertical rise, the pressure will be great. The problem was getting the water there. The way of getting the water there is a condenser. In the sky. In a system already known in the art (a tethered wind turbine).

The means by which the high-pressure water at the base or bottom of the tube or lumen has several potential manifestations. Several have been disclosed here. They typically resemble motor/expansion stages and subsequent storage or usage, as water, of water. The water is pure water, and if a filter were properly placed the water should be as pure as is required by a water electrolysis device.

The condenser should be placed in a common sense, environment-appropriate system. It could be run by a turbine, motor, or other system, either directly or electrically. The accoutrements to typical condensers would also, if used, find their proper place in the same system. It is possible that the condenser could be a set of passive energy-lowering devices (such as a venturi or equivalent) or used in combination therewith. This meaning, there is a simple embodiment that is not driven, that uses pressure or temperature decreases or increases to liquefy the vapor into water.

The cable will be the subject of further thought and/or research. It is likely that a very light and strong cable can be or has already been developed, halving the total buoyed mass of the system, increasing its feasibility.

There is no need to dwell on the total number of configurations for utilizing the fresh water provided as an overflow from the systems. It could be sold, used for irrigation or brewing, industrial or laboratory use, etc. The inventor is not a civil engineer and these opportunities will be tailored to use by civil or other engineers. The production by the system of water should be seen, simply, as a spring. What we do with it is not overly important. As long as we get energy out of it first.

There are attempts being made to store wind turbine output in the form of hydrogen fuel already. It is also true that the persons active in these arts have indicated that the point at which the concept will become economically viable comes down to some dozen cents per unit of energy, with an expected arrival forecast of 2025. The inventor is certain that the pressurization of inherently pure water, and energy creation, will account for a few of those cents.

What is claimed is:

1. An aircraft comprising at least a primary module, a secondary module, and a fan or propeller; wherein:
   said primary module comprises a first turbine and a first compressor;
   said secondary module comprises a second turbine and a second compressor;
   said primary module is coupled to said fan or propeller and at least one of said first turbine and
   said second turbine emits an exhaust and said exhaust is vectored downwardly relative to the aircraft;
   wherein said primary module and said secondary module are electrically connected to each other and electrical energy is transferred from said secondary module to said primary module.

2. The aircraft of claim 1, wherein thrust from at least one of the fan and exhaust is utilized by the aircraft to take off vertically or land vertically.

3. The aircraft of claim 1, wherein said first turbine is locked for rotation with said second compressor.

4. The aircraft of claim 1, wherein said second turbine is locked for rotation with said first compressor.

5. The aircraft of claim 1, wherein said first turbine rotates in an opposite rotational direction from said second turbine.

6. The aircraft of claim 1 wherein said second module comprises at least two said second modules.

* * * * *